(12) United States Patent
Lin et al.

(10) Patent No.: US 10,634,880 B2
(45) Date of Patent: *Apr. 28, 2020

(54) IMAGING LENS MODULE AND MOBILE TERMINAL

(71) Applicant: LARGAN PRECISION CO., LTD., Taichung (TW)

(72) Inventors: Cheng-Feng Lin, Taichung (TW); Chun-Hua Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,291

(22) Filed: Jan. 18, 2019

(65) Prior Publication Data

US 2019/0154995 A1  May 23, 2019

Related U.S. Application Data

(63) Continuation of application No. 15/786,691, filed on Oct. 18, 2017, now Pat. No. 10,222,586, which is a continuation of application No. 15/331,966, filed on Oct. 24, 2016, now Pat. No. 9,823,447, which is a continuation of application No. 15/098,467, filed on Apr. 14, 2016, now Pat. No. 9,513,454, which is a
(Continued)

(30) Foreign Application Priority Data

Nov. 19, 2014 (TW) .............................. 103220539 U

(51) Int. Cl.
*G02B 13/00* (2006.01)
*G02B 9/04* (2006.01)
*G02B 9/60* (2006.01)
*G02B 7/02* (2006.01)
*G02B 1/04* (2006.01)
*G02B 5/00* (2006.01)

(52) U.S. Cl.
CPC ......... *G02B 13/0045* (2013.01); *G02B 1/041* (2013.01); *G02B 5/005* (2013.01); *G02B 7/021* (2013.01); *G02B 7/022* (2013.01); *G02B 9/04* (2013.01); *G02B 9/60* (2013.01)

(58) Field of Classification Search
CPC .... G02B 13/0045; G02B 1/041; G02B 5/005; G02B 7/021; G02B 7/022; G02B 9/04; G02B 9/60
USPC ....................................................... 359/793
See application file for complete search history.

(56) References Cited

U.S. PATENT DOCUMENTS 6,791,763 B2  9/2004  Hattori et al.
6,947,230 B2  9/2005  Sawagami et al.
7,151,640 B2  12/2006  Sawagami et al.
(Continued)

*Primary Examiner* — James R Greece
(74) *Attorney, Agent, or Firm* — McClure, Qualey & Rodack, LLP

(57) ABSTRACT

An imaging lens module includes an imaging lens assembly and a first optical component. The imaging lens assembly has an optical axis and includes a lens element. The lens element includes an effective optical portion, which is non-circular and disposed on a center of the lens element. The first optical component has a non-circular opening hole. The effective optical portion of the lens element of the imaging lens assembly is corresponded to the non-circular opening hole of the first optical component.

14 Claims, 49 Drawing Sheets

Related U.S. Application Data continuation of application No. 14/592,949, filed on Jan. 9, 2015, now Pat. No. 9,341,813.

(56) References Cited

U.S. PATENT DOCUMENTS 8,670,659 B2 * 3/2014 Haruguchi ............... G03B 3/10
    396/133
2014/0368723 A1   12/2014 Jung et al.

* cited by examiner

US 10,634,880 B2

IMAGING LENS MODULE AND MOBILE TERMINAL

RELATED APPLICATIONS

The present application is a continuation of the application Ser. No. 15/786,691, filed on Oct. 18, 2017, which is a continuation of the application Ser. No. 15/331,966, filed on Oct. 24, 2016, U.S. Pat. No. 9,823,447 issued on Nov. 21, 2017, which is a continuation of the application Ser. No. 15/098,467, filed on Apr. 14, 2016, U.S. Pat. No. 9,513,454 issued on Dec. 6, 2016, which is a continuation of the application Ser. No. 14/592,949, filed on Jan. 9, 2015, U.S. Pat. No. 9,341,813 issued on May 17, 2016, and claims priority to Taiwan application serial number 103220539, filed on Nov. 19, 2014, the entire contents of which are hereby incorporated herein by reference.

BACKGROUND

Technical Field

The present disclosure relates to an imaging lens module. More particularly, the present disclosure relates to an imaging lens module applicable to mobile terminals.

Description of Related Art

For the conventional optical lens modules used in the mobile terminals, the appearance of the lens element is mostly disc-shaped, and the appearance of the optical component is mostly annular or cylindrical for the advantages of manufacturing. When the pixels of the optical lens module are increased, the volume and the outer diameter of the lens element and the optical component should be enlarged, and it results in problems of non-imaging light and poor image quality. Hence, the technique of volume shrinkage for the optical lens modules is developed.

The conventional way to shrink the volume of the optical lens modules is cutting the outer diameters of the lens elements and the optical components, however, the assembly strength between the lens elements and the optical components would be decreased. Moreover, the optical quality and manufacturing yield rate would also be reduced. For the optical lens modules with greater outer diameter, the excessive stray light cannot be effectively suppressed.

Therefore, the optical lens modules with properties of volume shrinkage, stray light effectively suppressed and stable quality are urgently required to the markets.

SUMMARY

According to one aspect of the present disclosure, an imaging lens module includes an imaging lens assembly and a first optical component. The imaging lens assembly has an optical axis and includes at least one lens element. The lens element includes at least one effective optical portion, which is non-circular and disposed on a center of the lens element. The first optical component has a non-circular opening hole, wherein the effective optical portion of the lens element of the imaging lens assembly is corresponded to the non-circular opening hole of the first optical component. When a line distance between any two points of a peripheral edge of the effective optical portion of the lens element through the center of the lens element is $l_{AA'}$, a minimum line distance between two points of the peripheral edge of the effective optical portion of the lens element through the center of the lens element is $l_{BB'}$, a maximum line distance between two points of the peripheral edge of the effective optical portion of the lens element through the center of the lens element is $l_{CC'}$, an angle between the line distance $l_{AA'}$ of the lens element and the minimum line distance $l_{BB'}$ of the lens element is $\theta_{AB}$, an angle between the maximum line distance $l_{CC'}$ of the lens element and the minimum line distance $l_{BB'}$ of the lens element is $\theta_{CB}$, a line distance between any two points of a peripheral edge of the non-circular opening hole of the first optical component through a center of the non-circular opening hole of the first optical component is $m_{1AA'}$, a minimum line distance between two points of the peripheral edge of the non-circular opening hole of the first optical component through the center of the non-circular opening hole of the first optical component is $m_{1BB'}$, a maximum line distance between two points of the peripheral edge of the non-circular opening hole of the first optical component through the center of the non-circular opening hole of the first optical component is $m_{1CC'}$, an angle between the line distance $m_{1AA'}$ of the first optical component and the minimum line distance $m_{1BB'}$ of the first optical component is $\kappa_{1AB}$, and an angle between the maximum line distance $m_{1CC'}$ of the first optical component and the minimum line distance $m_{1BB'}$ of the first optical component is $\kappa_{1CB}$, the following conditions are satisfied:

$$l_{BB'} \leq l_{AA'} < l_{CC'},$$

$$|\theta_{AB}| > |\theta_{CB}|,$$

wherein $|\theta_{AB}|$ and $|\theta_{CB}|$ are both smaller than or equal to 90 degrees;

$$m_{1BB'} \leq m_{1AA'} < m_{1CC'}, \text{ and}$$

$$|\kappa_{1AB}| \geq |\kappa_{1CB}|,$$

wherein $|\kappa_{1AB}|$ and $|\kappa_{1CB}|$ are both smaller than or equal to 90 degrees.

According to another aspect of the present disclosure, a mobile terminal has communication function and includes the imaging lens module according to the aforementioned aspect.

According to still another aspect of the present disclosure, an imaging lens module includes an imaging lens assembly. The imaging lens assembly has an optical axis and includes at least one lens element. The lens element includes a first effective optical portion and a second effective optical portion. The first effective optical portion is non-circular and disposed on a center of the lens element. The second effective optical portion and the first effective optical portion are separately disposed on two surfaces of the lens element. When a line distance between any two points of a peripheral edge of the first effective optical portion of the lens element through the center of the lens element is $l_{AA'}$, a minimum line distance between two points of the peripheral edge of the first effective optical portion of the lens element through the center of the lens element is $l_{BB'}$, a maximum line distance between two points of the peripheral edge of the first effective optical portion of the lens element through the center of the lens element is $l_{CC'}$, and an angle between the line distance $l_{AA'}$ of the lens element and the minimum line distance $l_{BB'}$ of the lens element is $\theta_{AB}$, the following conditions are satisfied:

$$l_{BB'} \leq l_{AA'} < l_{CC'}, \text{ and}$$

$$50 \text{ degrees} < |\theta_{AB}| \leq 90 \text{ degrees}.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
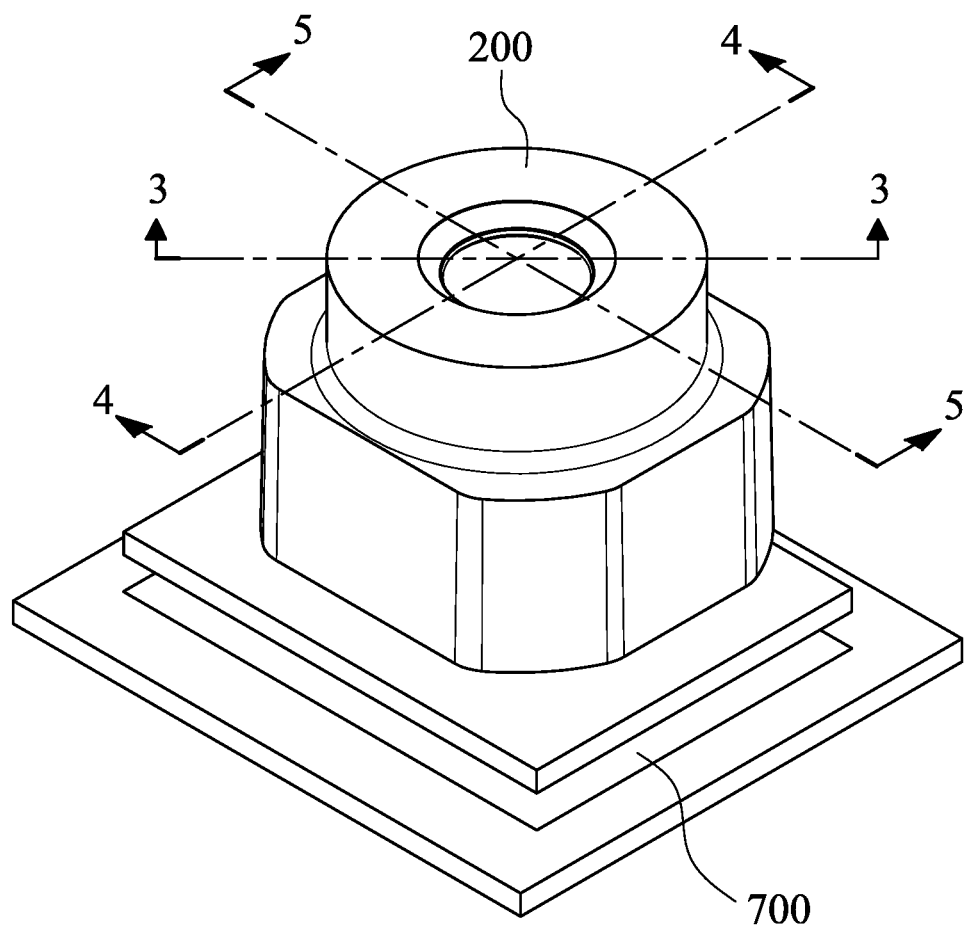
FIG. 1 shows an external schematic view of an imaging lens module according to one embodiment of the present disclosure.
Figure 2:
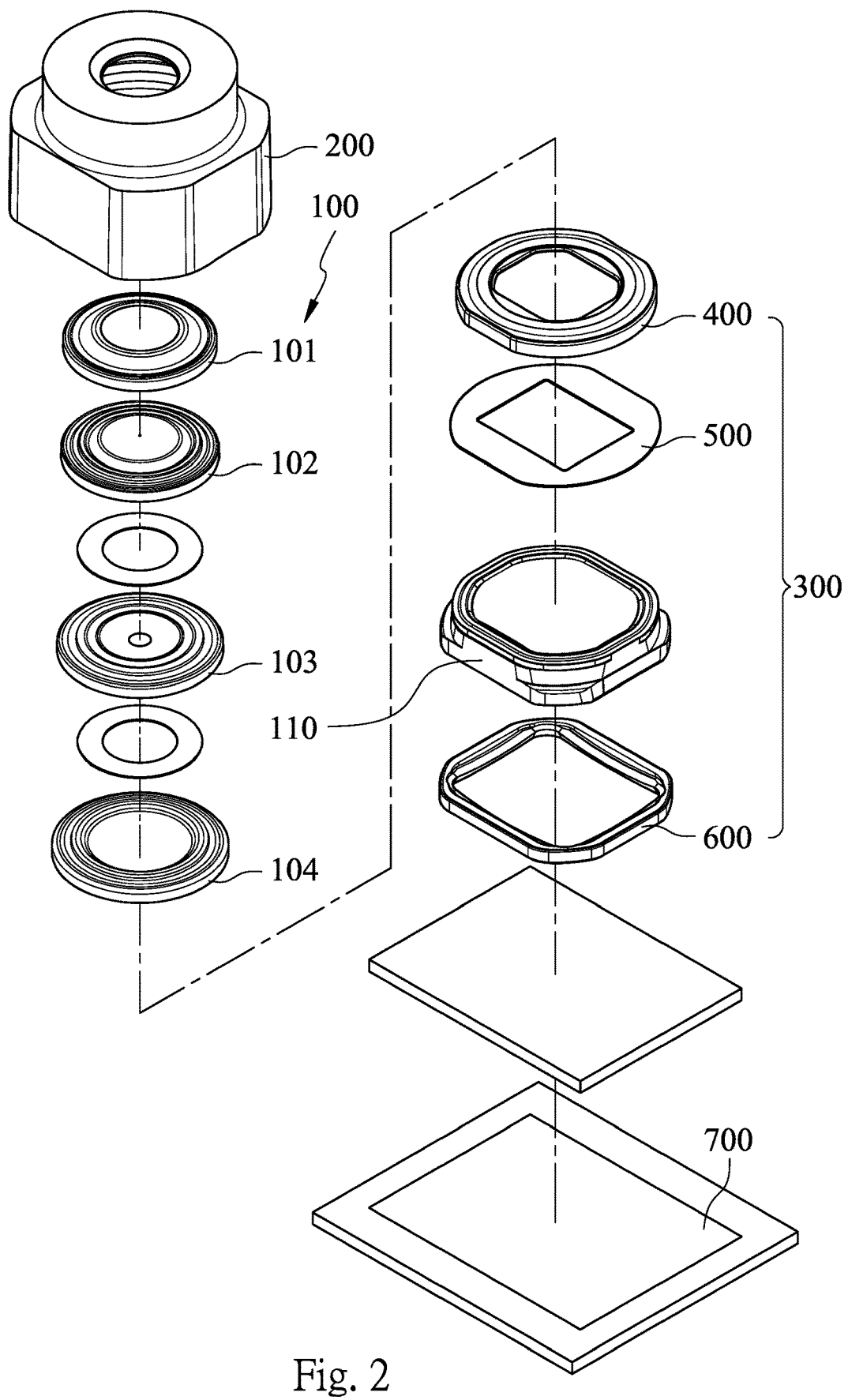
FIG. 2 shows an explode view of the imaging lens module according to the embodiment of FIG. 1.

FIG. 1 shows an external schematic view of an imaging lens module according to one embodiment of the present disclosure. FIG. 2 shows an explode view of the imaging lens module according to the embodiment of FIG. 1. The imaging lens module includes an imaging lens assembly 100 and a first optical component 200.

Figure 3:
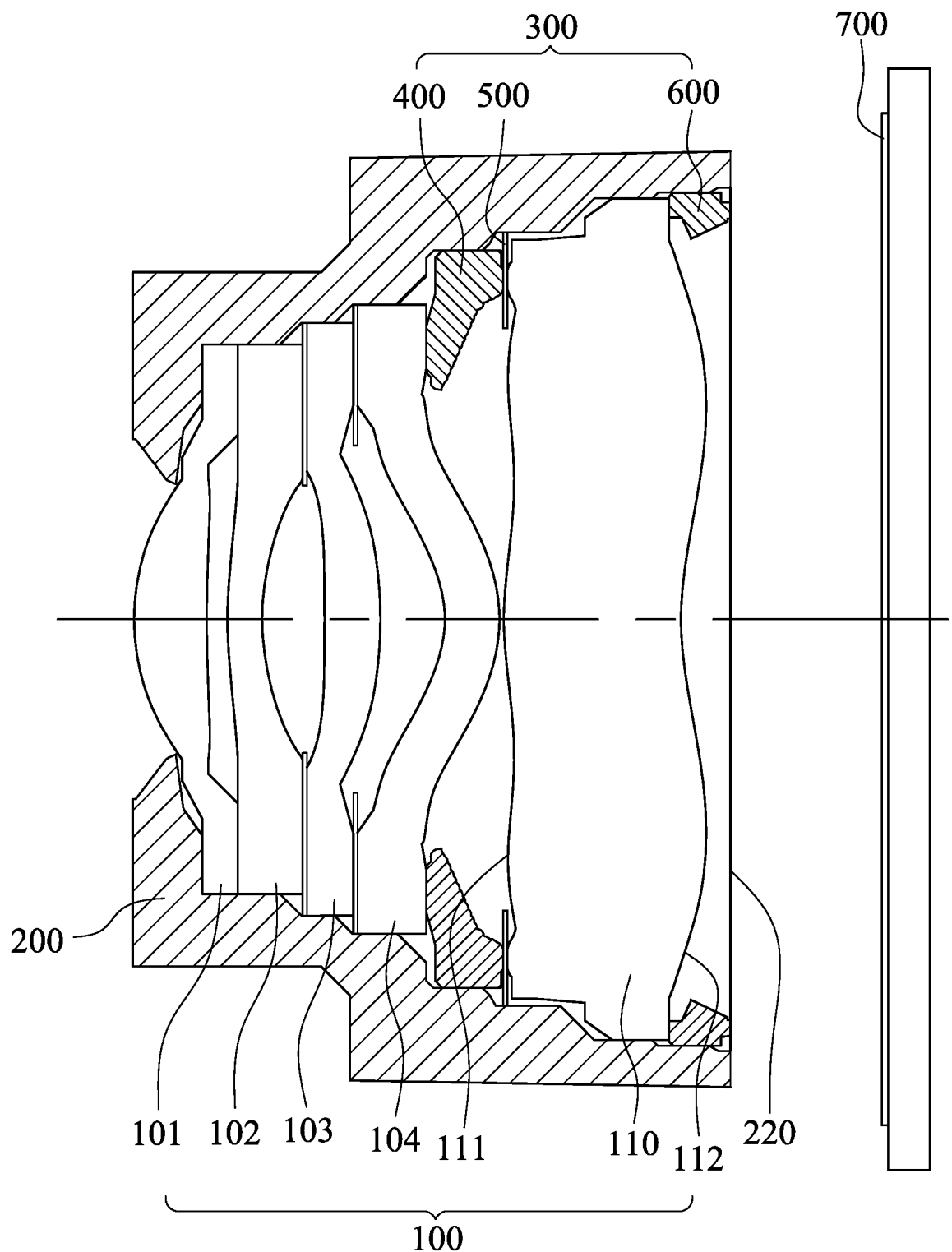
FIG. 3 shows a sectional view of the imaging lens module along line 3-3 of FIG. 1.
Figure 4:
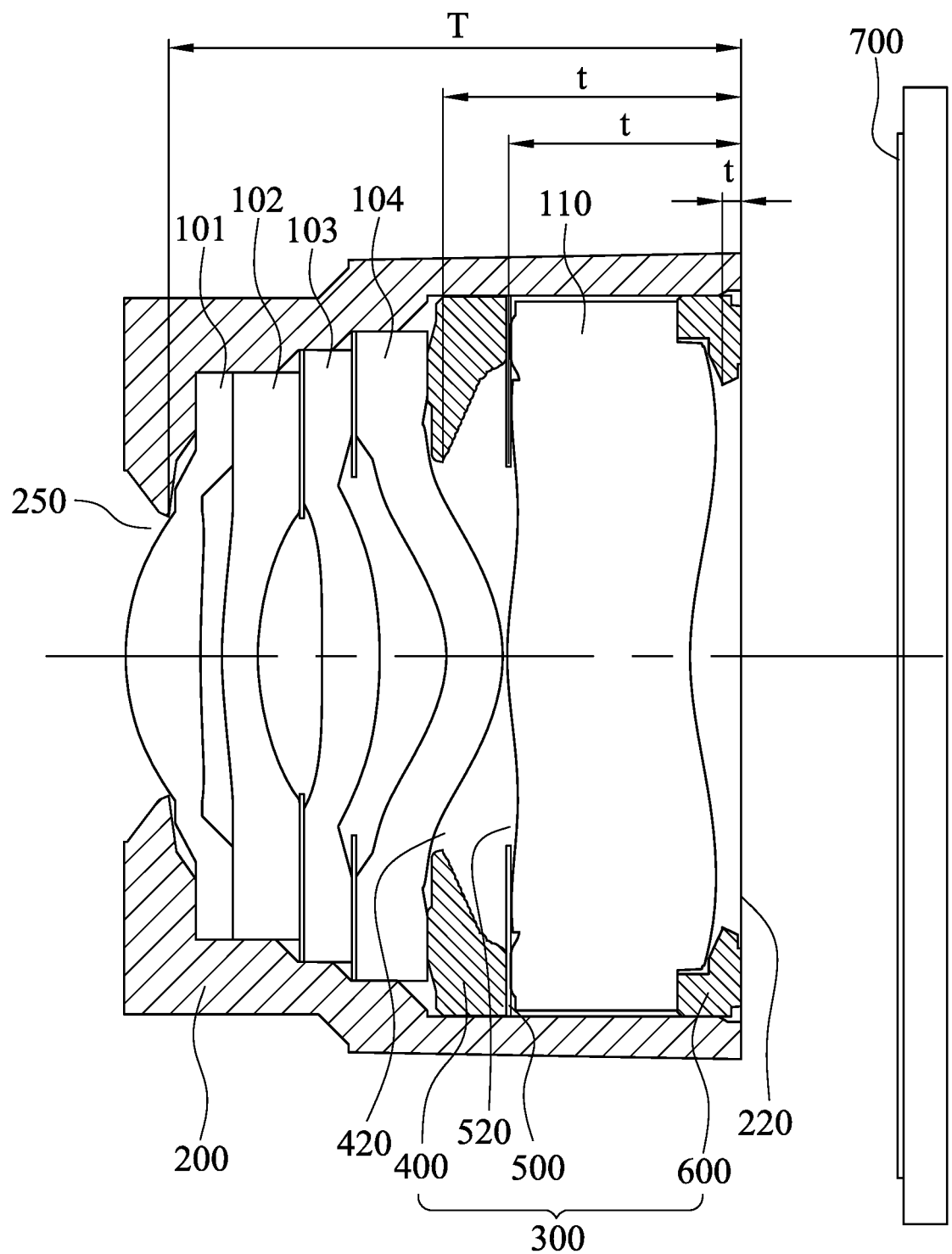
FIG. 4 shows a sectional view of the imaging lens module along line 4-4 of FIG. 1.
Figure 5:
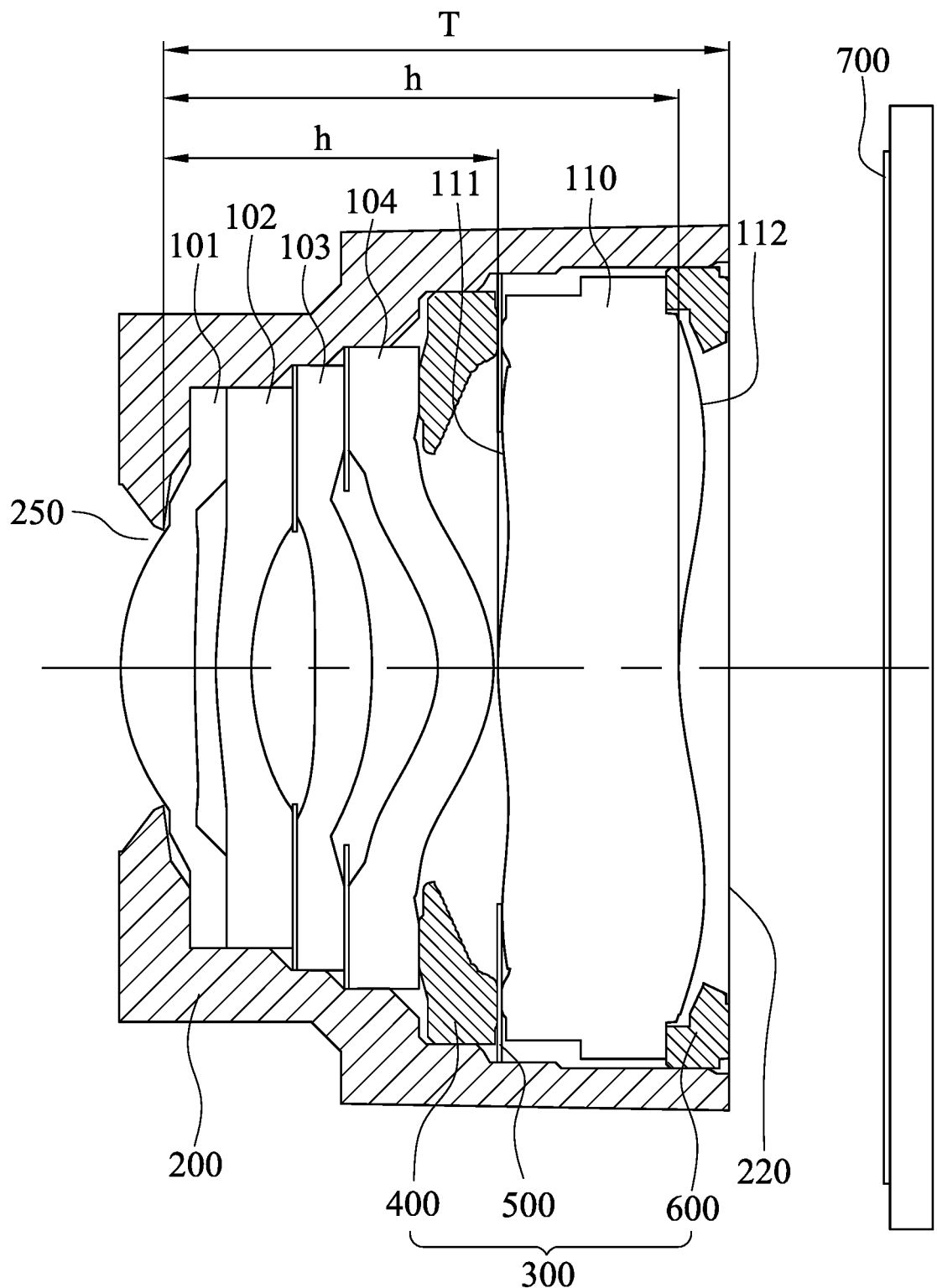
FIG. 5 shows a sectional view of the imaging lens module along line 5-5 of FIG. 1.

FIG. 3 shows a sectional view of the imaging lens module along line 3-3 of FIG. 1. FIG. 4 shows a sectional view of the imaging lens module along line 4-4 of FIG. 1. FIG. 5 shows a sectional view of the imaging lens module along line 5-5 of FIG. 1. The imaging lens assembly 100 has an optical axis and includes at least one lens element 110. The lens element 110 includes at least one effective optical portion, which is non-circular and disposed on a center of the lens element 110. The non-circular effective optical portion has several different outer diameters and is for reducing the stray light comparing to the conventional circular effective optical portion. In detail, the lens element 110 of the embodiment of FIG. 3 can be made of plastic material and include two effective optical portions, which are a first effective optical portion 111 disposed on a surface toward the object side of the lens element 110, and a second effective optical portion 112 disposed on a surface toward the image side of the lens element 110. At least one of the first effective optical portion 111 and the second effective optical portion 112 is non-circular. (In the embodiment of the present disclosure, the first effective optical portion 111 and the second effective optical portion 112 are both non-circular.) The first effective optical portion 111 and the second effective optical portion 112 are both disposed on the center of the lens element 110.

The first optical component 200 has a non-circular opening hole 220. The non-circular opening hole 220 has several different diameters. Comparing to the conventional circular opening hole, the non-circular opening hole 220 of the first optical component 200 can reduce the stray light and maintain the structural strength of the imaging lens module. The imaging lens assembly 100 is disposed in the first optical component 200. The first effective optical portion 111 and the second effective optical portion 112 of the lens element 110 of the imaging lens assembly 100 are corresponded to the non-circular opening hole 220 of the first optical component 200. That is, the light of the imaging lens assembly 100 passes through the first effective optical portion 111 and the second effective optical portion 112 of the lens element 110, and the non-circular opening hole 220 of the first optical component 200.

Figure 6A:
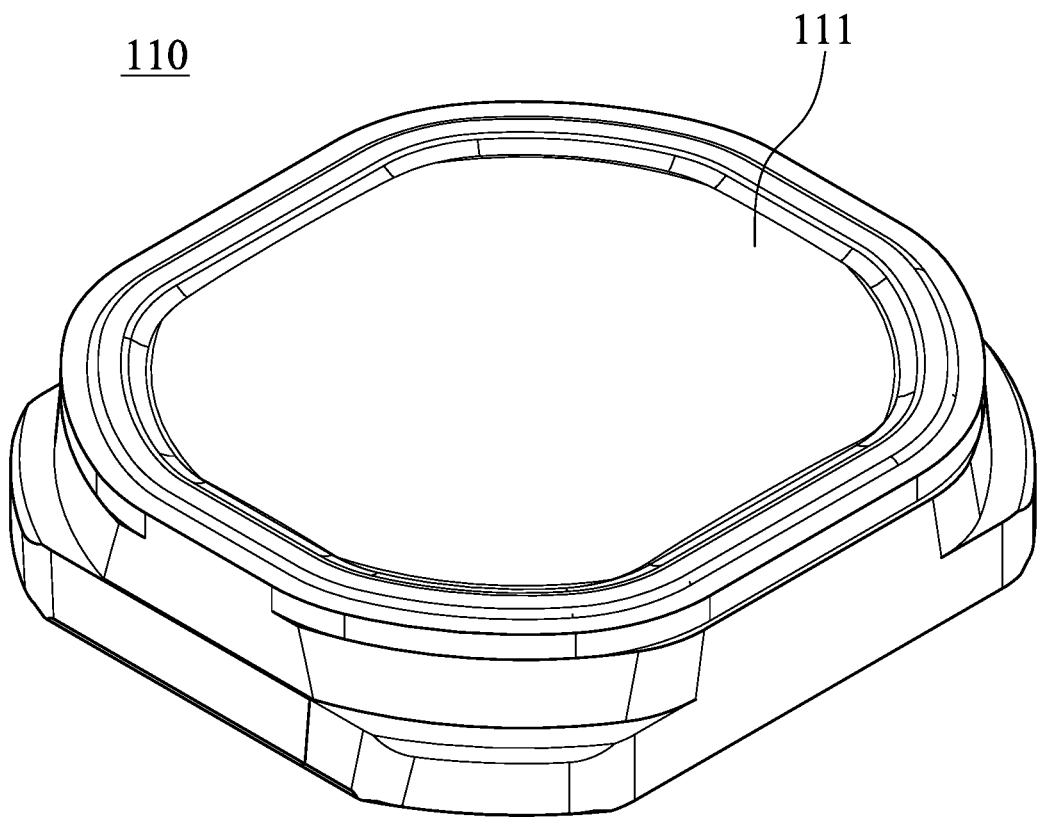
FIG. 6A shows a schematic view of the first effective optical portion of the lens element of the imaging lens module according to the embodiment of FIG. 1.
Figure 6B:
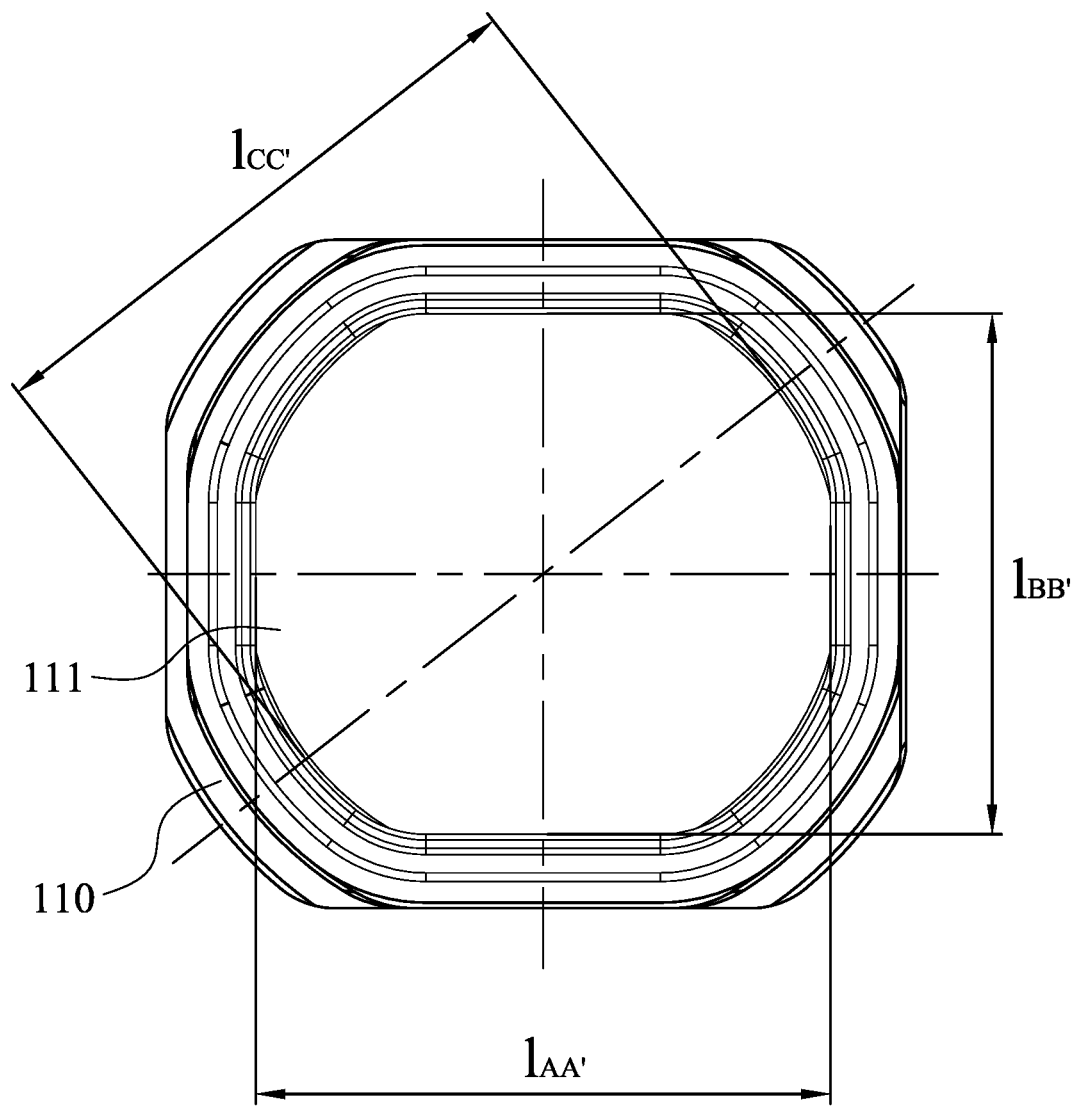
FIG. 6B shows a schematic view of the parameters $l_{AA'}$, $l_{BB'}$ and $l_{CC'}$ of the first effective optical portion of the lens element of the imaging lens module according to the embodiment of FIG. 1.
Figure 6C:
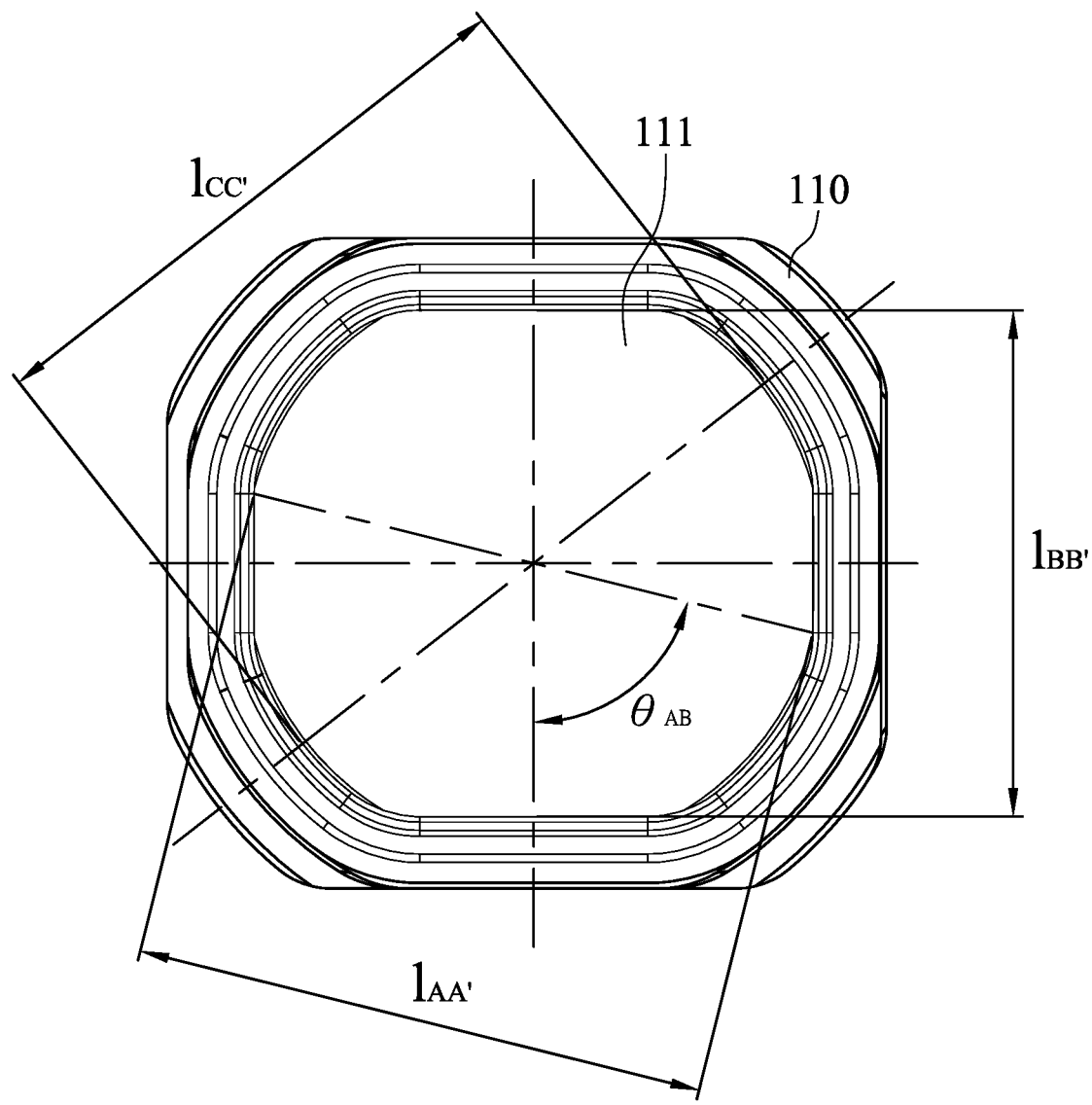
FIG. 6C shows a schematic view of the parameters $l_{AA'}$ and $\theta_{AB}$ of the first effective optical portion of the lens element of the imaging lens module according to the embodiment of FIG. 1.

FIG. 6A shows a schematic view of the first effective optical portion 111 of the lens element 110 of the imaging lens module according to the embodiment of FIG. 1. FIG. 6B shows a schematic view of the parameters $l_{AA'}$, $l_{BB'}$ and $l_{CC'}$ of the first effective optical portion 111 of the lens element 110 of the imaging lens module according to the embodiment of FIG. 1. FIG. 6C shows a schematic view of the parameters $l_{AA'}$ and $\theta_{AB}$ of the first effective optical portion 111 of the lens element 110 of the imaging lens module according to the embodiment of FIG. 1. In FIG. 6B, a minimum line distance between two points of a peripheral edge of the first effective optical portion 111 of the lens element 110 through the center of the lens element 110 is $l_{BB'}$, and a maximum line distance between two points of the peripheral edge of the first effective optical portion 111 of the lens element 110 through the center of the lens element 110 is $l_{CC'}$. In FIG. 6B and FIG. 6C, a line distance between any two points of the peripheral edge of the first effective optical portion 111 of the lens element 110 through the center of the lens element 110 is $l_{AA'}$, wherein the minimum value of the line distance $l_{AA'}$ of the first effective optical portion 111 of the lens element 110 is shown in FIG. 6B, and the maximum value of the line distance $l_{AA'}$ of the first effective optical portion 111 of the lens element 110 is shown in FIG. 6C.

Figure 6D:
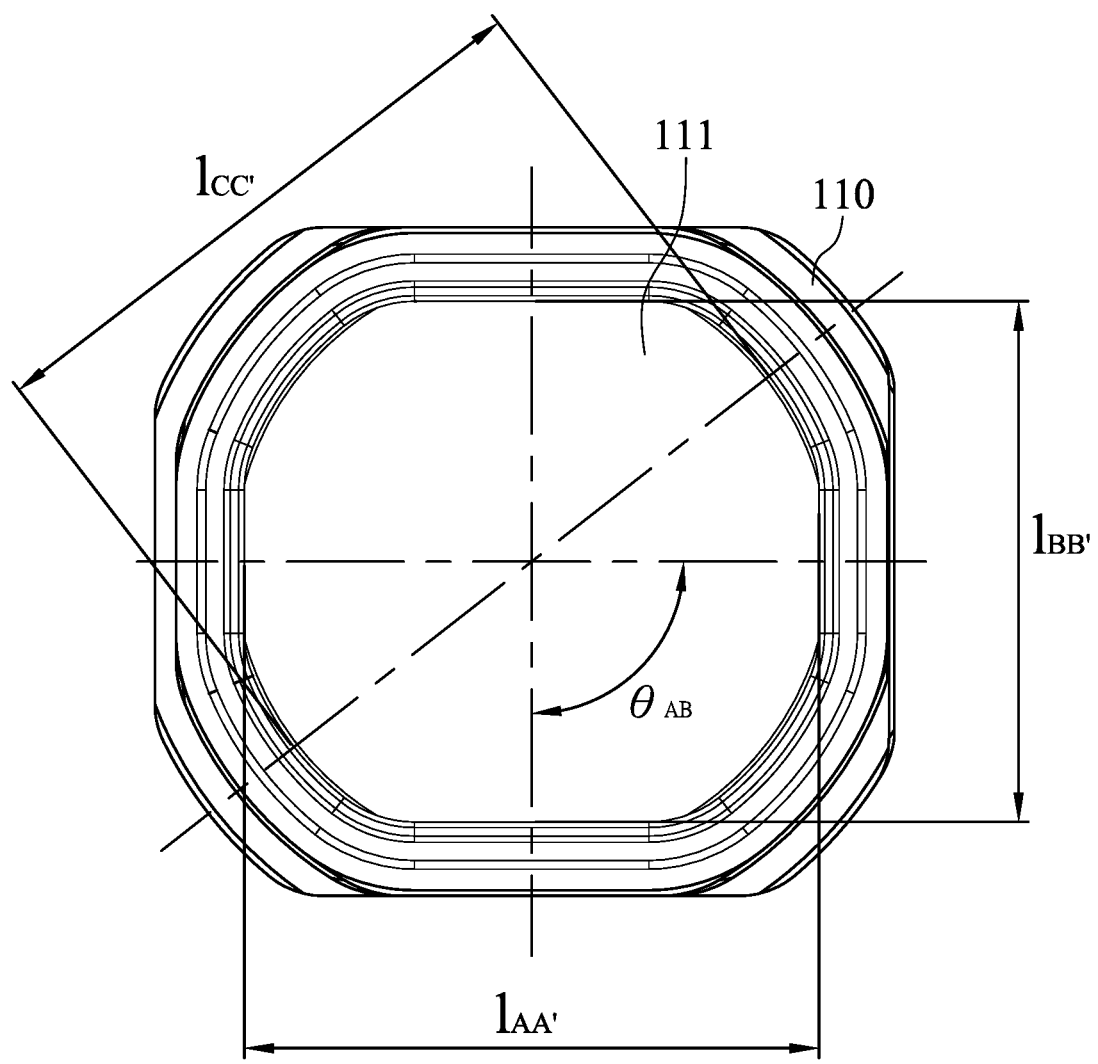
FIG. 6D shows a schematic view of the parameter $\theta_{AB}$ of the first effective optical portion of the lens element of the imaging lens module according to the embodiment of FIG. 1.
Figure 6E:
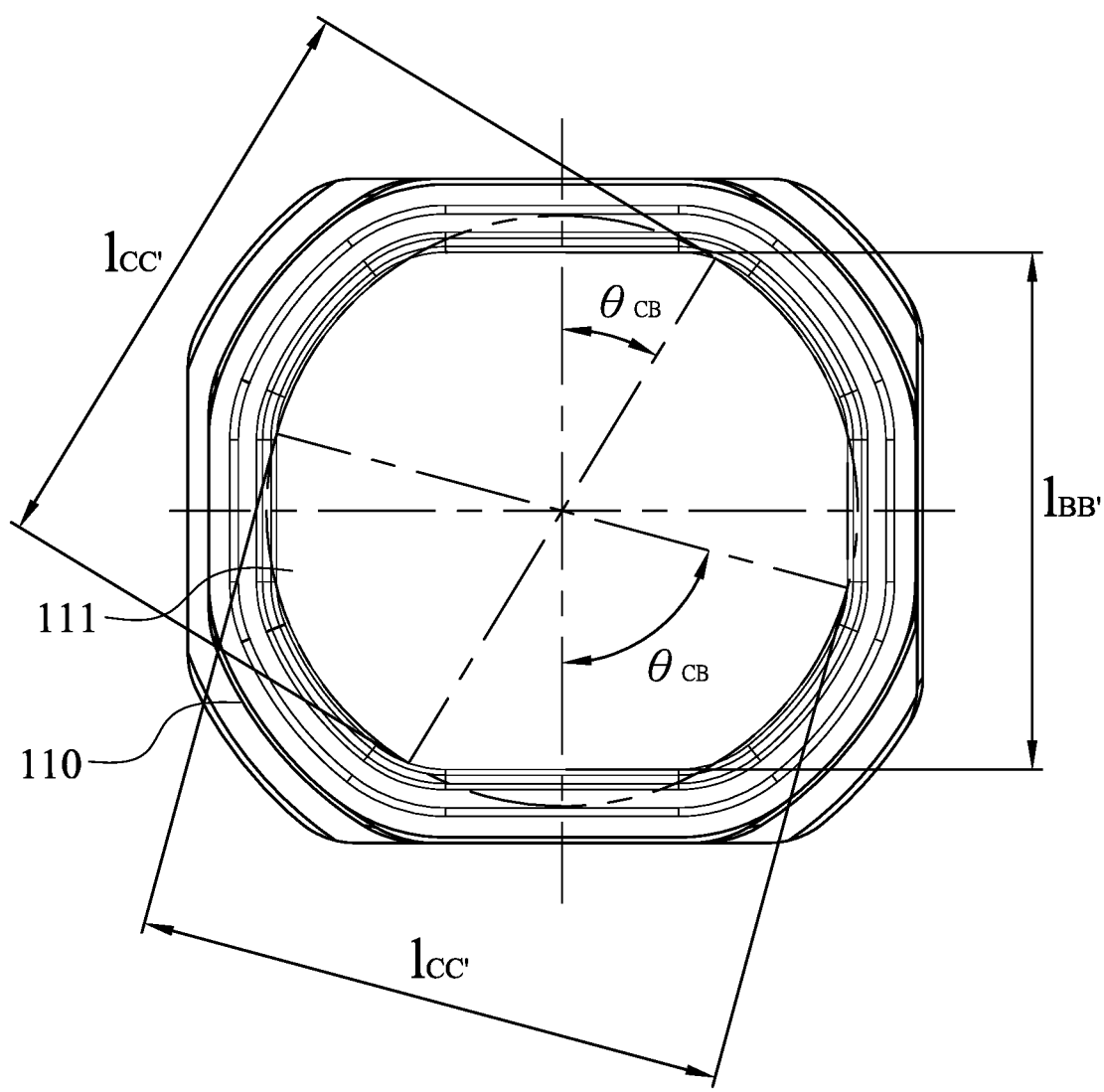
FIG. 6E shows a schematic view of the parameter $\theta_{CB}$ of the first effective optical portion of the lens element of the imaging lens module according to the embodiment of FIG. 1.

FIG. 6D shows a schematic view of the parameter $\theta_{AB}$ of the first effective optical portion 111 of the lens element 110 of the imaging lens module according to the embodiment of FIG. 1. FIG. 6E shows a schematic view of the parameter $\theta_{CB}$ of the first effective optical portion 111 of the lens element 110 of the imaging lens module according to the embodiment of FIG. 1. In FIG. 6C and FIG. 6D, an angle between the line distance $l_{AA'}$ of the first effective optical portion 111 of the lens element 110 and the minimum line distance $l_{BB'}$ of the first effective optical portion 111 of the lens element 110 is $\theta_{AB}$, wherein the minimum value of the angle $\theta_{AB}$ of the first effective optical portion 111 of the lens element 110 is shown in FIG. 6C, and the maximum value of the angle $\theta_{AB}$ of the first effective optical portion 111 of the lens element 110 is shown in FIG. 6D. In FIG. 6E, an angle between the maximum line distance $l_{CC'}$ of the first effective optical portion 111 of the lens element 110 and the minimum line distance $l_{BB'}$ of the first effective optical portion 111 of the lens element 110 is $\theta_{CB}$, wherein the minimum value and the maximum value of the angle $\theta_{CB}$ of the first effective optical portion 111 of the lens element 110 are shown in FIG. 6E. The following conditions of the aforementioned parameters $l_{AA'}$, $l_{BB'}$, $\theta_{AB}$ and $\theta_{CB}$ are satisfied: $l_{BB'} \leq l_{AA'} < l_{CC'}$, and $|\theta_{AB}| > |\theta_{CB}|$, wherein $|\theta_{AB}|$ and $|\theta_{CB}|$ are both smaller than or equal to 90 degrees. Therefore, the first effective optical portion 111 would not be excessively centralized after volume minimized so as to maintain the optical quality and reduce the stray light. Preferably, the following condition is satisfied: 50 degrees<|θ$_{AB}$|≤90 degrees. Preferably, the following condition is satisfied: 0.80<l$_{AA'}$/l$_{CC'}$<0.98. Preferably, the following condition is satisfied: 0.55<l$_{BB'}$/l$_{CC'}$<0.95. More preferably, the following condition is satisfied: 50 degrees<|θ$_{CB}$|<75 degrees.

Figure 7A:
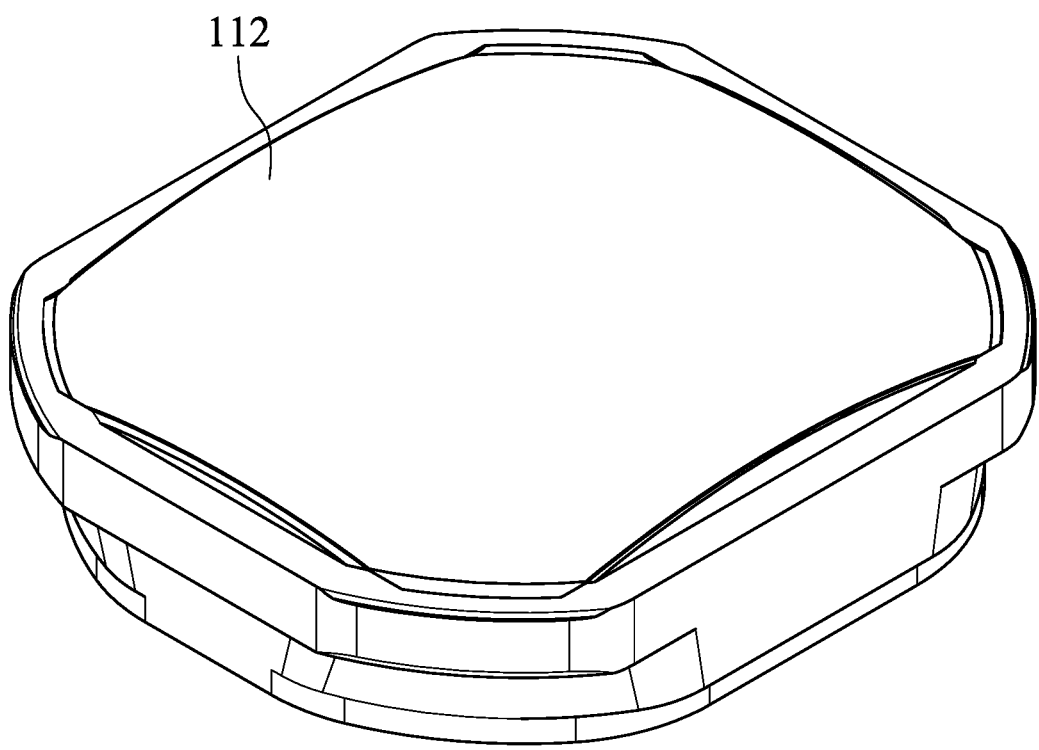
FIG. 7A shows a schematic view of the second effective optical portion of the lens element of the imaging lens module according to the embodiment of FIG. 1.
Figure 7B:
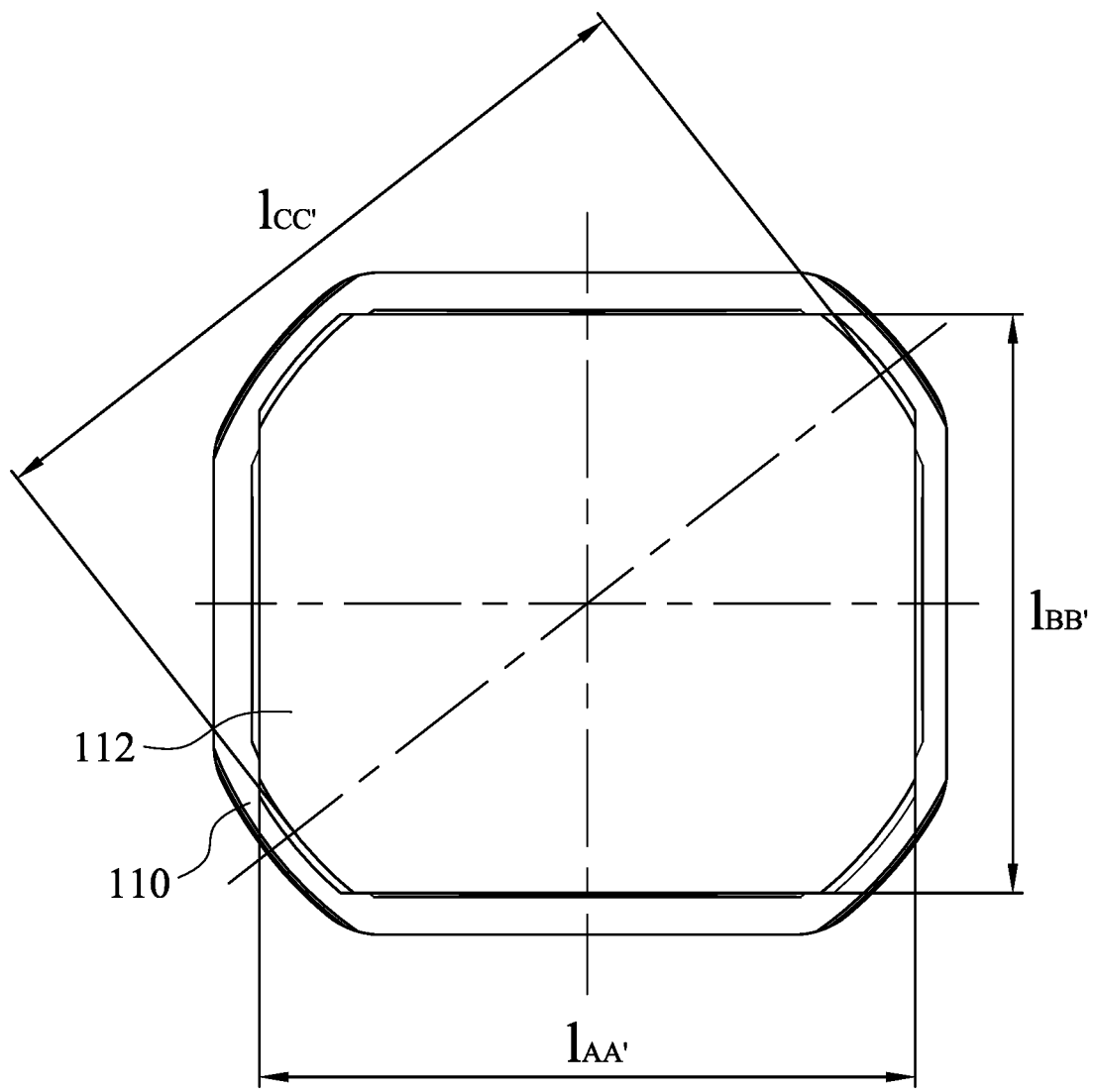
FIG. 7B shows a schematic view of the parameters $l_{AA'}$, $l_{BB'}$, and $l_{CC'}$ of the second effective optical portion of the lens element of the imaging lens module according to the embodiment of FIG. 1.
Figure 7C:
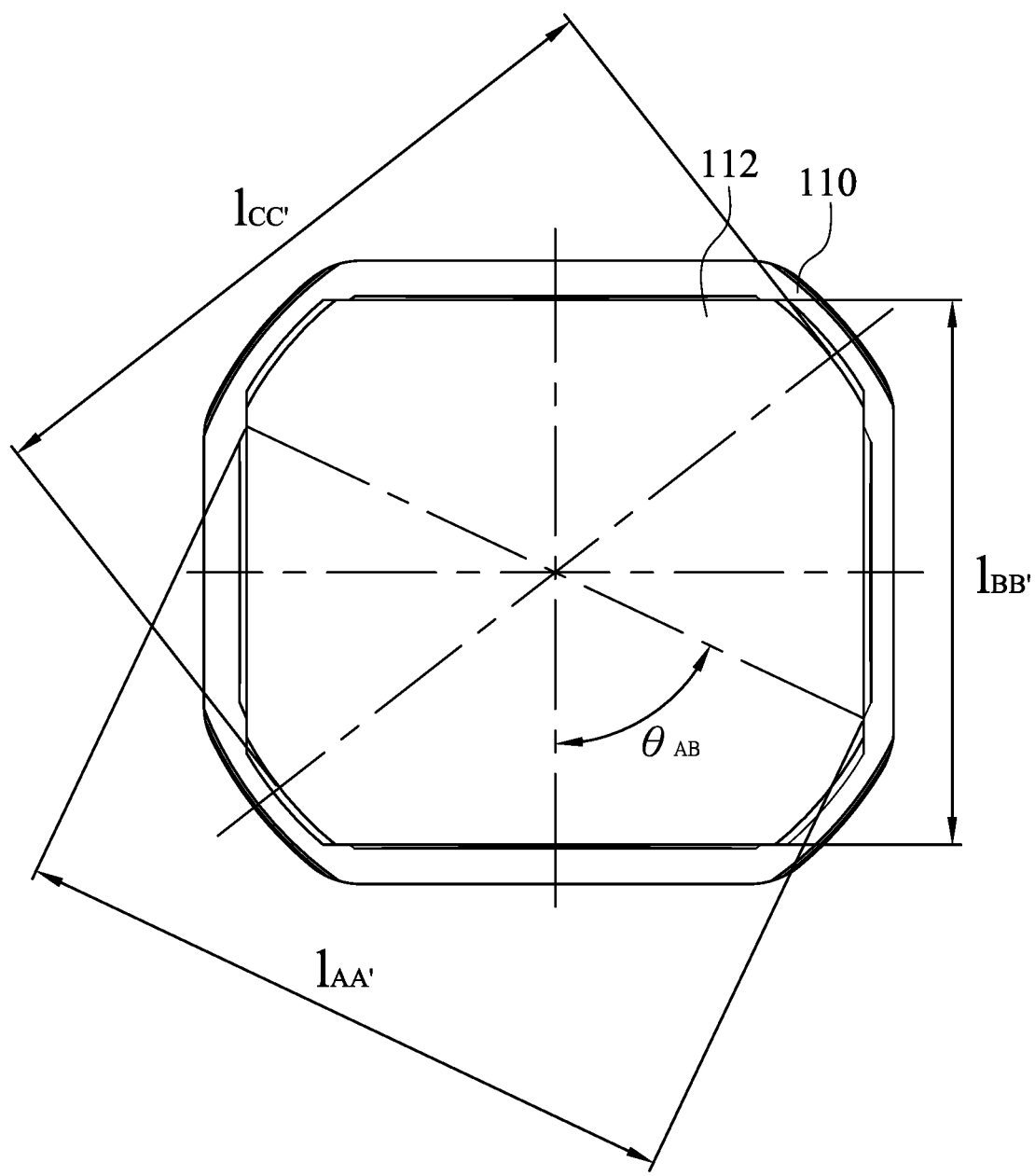
FIG. 7C shows a schematic view of the parameters $l_{AA'}$ and $\theta_{AB}$ of the second effective optical portion of the lens element of the imaging lens module according to the embodiment of FIG. 1.

FIG. 7A shows a schematic view of the second effective optical portion 112 of the lens element 110 of the imaging lens module according to the embodiment of FIG. 1. FIG. 7B shows a schematic view of the parameters l$_{AA'}$, l$_{BB'}$, and l$_{CC'}$ of the second effective optical portion 112 of the lens element 110 of the imaging lens module according to the embodiment of FIG. 1. FIG. 7C shows a schematic view of the parameters l$_{AA'}$ and θ$_{AB}$ of the second effective optical portion 112 of the lens element 110 of the imaging lens module according to the embodiment of FIG. 1. In FIG. 7B, the second effective optical portion 112 is non-circular, a minimum line distance between two points of a peripheral edge of the second effective optical portion 112 of the lens element 110 through the center of the lens element 110 is l$_{BB'}$, and a maximum line distance between two points of the peripheral edge of the second effective optical portion 112 of the lens element 110 through the center of the lens element 110 is l$_{CC'}$. In FIG. 7B and FIG. 7C, a line distance between any two points of the peripheral edge of the second effective optical portion 112 of the lens element 110 through the center of the lens element 110 is l$_{AA'}$, wherein the minimum value of the line distance l$_{AA'}$ of the second effective optical portion 112 of the lens element 110 is shown in FIG. 7B, and the maximum value of the line distance l$_{AA'}$ of the second effective optical portion 112 of the lens element 110 is shown in FIG. 7C.

Figure 7D:
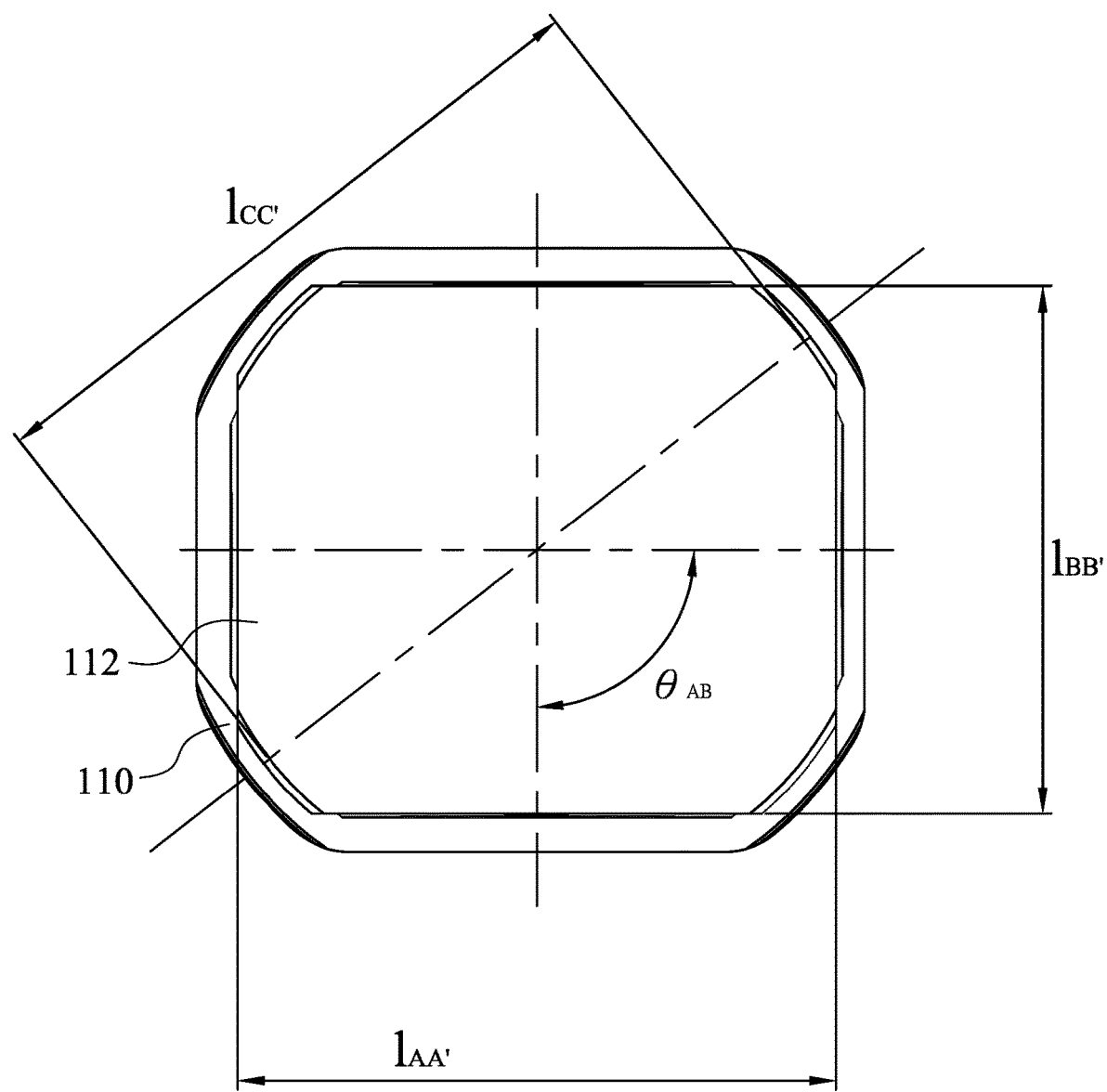
FIG. 7D shows a schematic view of the parameter $\theta_{AB}$ of the second effective optical portion of the lens element of the imaging lens module according to the embodiment of FIG. 1.
Figure 7E:
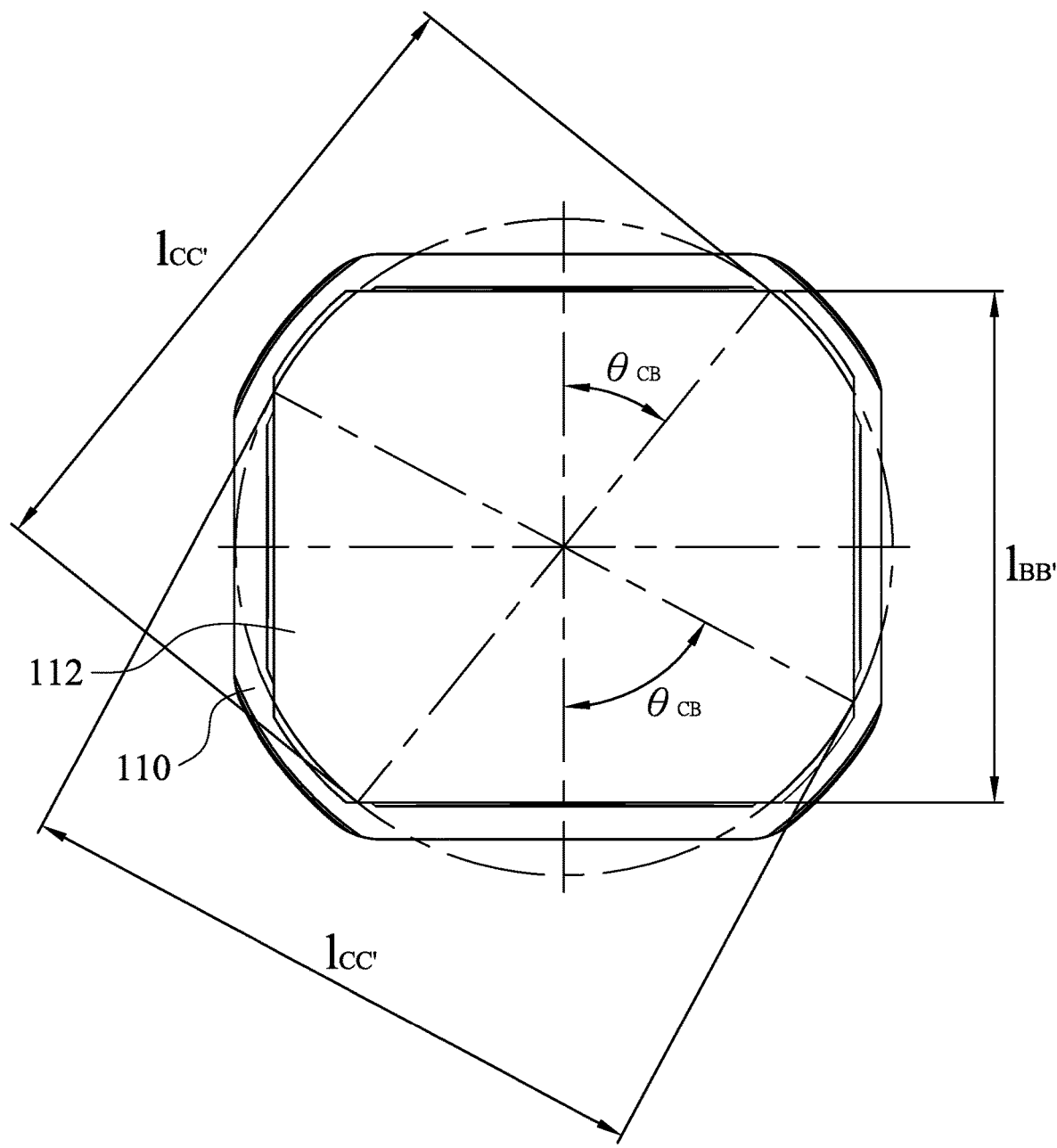
FIG. 7E shows a schematic view of the parameter $\theta_{CB}$ of the second effective optical portion of the lens element of the imaging lens module according to the embodiment of FIG. 1.

FIG. 7D shows a schematic view of the parameter θ$_{AB}$ of the second effective optical portion 112 of the lens element 110 of the imaging lens module according to the embodiment of FIG. 1. FIG. 7E shows a schematic view of the parameter θ$_{CB}$ of the second effective optical portion 112 of the lens element 110 of the imaging lens module according to the embodiment of FIG. 1. In FIG. 7C and FIG. 7D, an angle between the line distance l$_{AA'}$ of the second effective optical portion 112 of the lens element 110 and the minimum line distance l$_{BB'}$ of the second effective optical portion 112 of the lens element 110 is θ$_{AB}$, wherein the minimum value of the angle θ$_{AB}$ of the second effective optical portion 112 of the lens element 110 is shown in FIG. 7C, and the maximum value of the angle θ$_{AB}$ of the second effective optical portion 112 of the lens element 110 is shown in FIG. 7D. In FIG. 7E, an angle between the maximum line distance l$_{CC'}$ of the second effective optical portion 112 of the lens element 110 and the minimum line distance l$_{BB'}$ of the second effective optical portion 112 of the lens element 110 is θ$_{CB}$, wherein the minimum value and the maximum value of the angle θ$_{CB}$ of the second effective optical portion 112 of the lens element 110 are shown in FIG. 7E. The following conditions of the aforementioned parameters l$_{AA'}$, l$_{BB'}$, l$_{CC'}$, θ$_{AB}$ and θ$_{CB}$ are satisfied: l$_{BB'}$≤l$_{CC'}$; and |θ$_{AB}$|>|θ$_{CB}$|, wherein |θ$_{AB}$| and |θ$_{CB}$| are both smaller than or equal to 90 degrees. Therefore, the second effective optical portion 112 would not be excessively centralized after volume minimized so as to maintain the optical quality and reduce the stray light. Preferably, the following condition is satisfied: 50 degrees<|θ$_{AB}$|≤90 degrees. Preferably, the following condition is satisfied: 0.80<l$_{AA'}$/l$_{CC'}$<0.98. Preferably, the following condition is satisfied: 0.55<l$_{BB'}$/l$_{CC'}$<0.95. More preferably, the following condition is satisfied: 50 degrees<|θ$_{CB}$|<75 degrees.

Figure 8A:
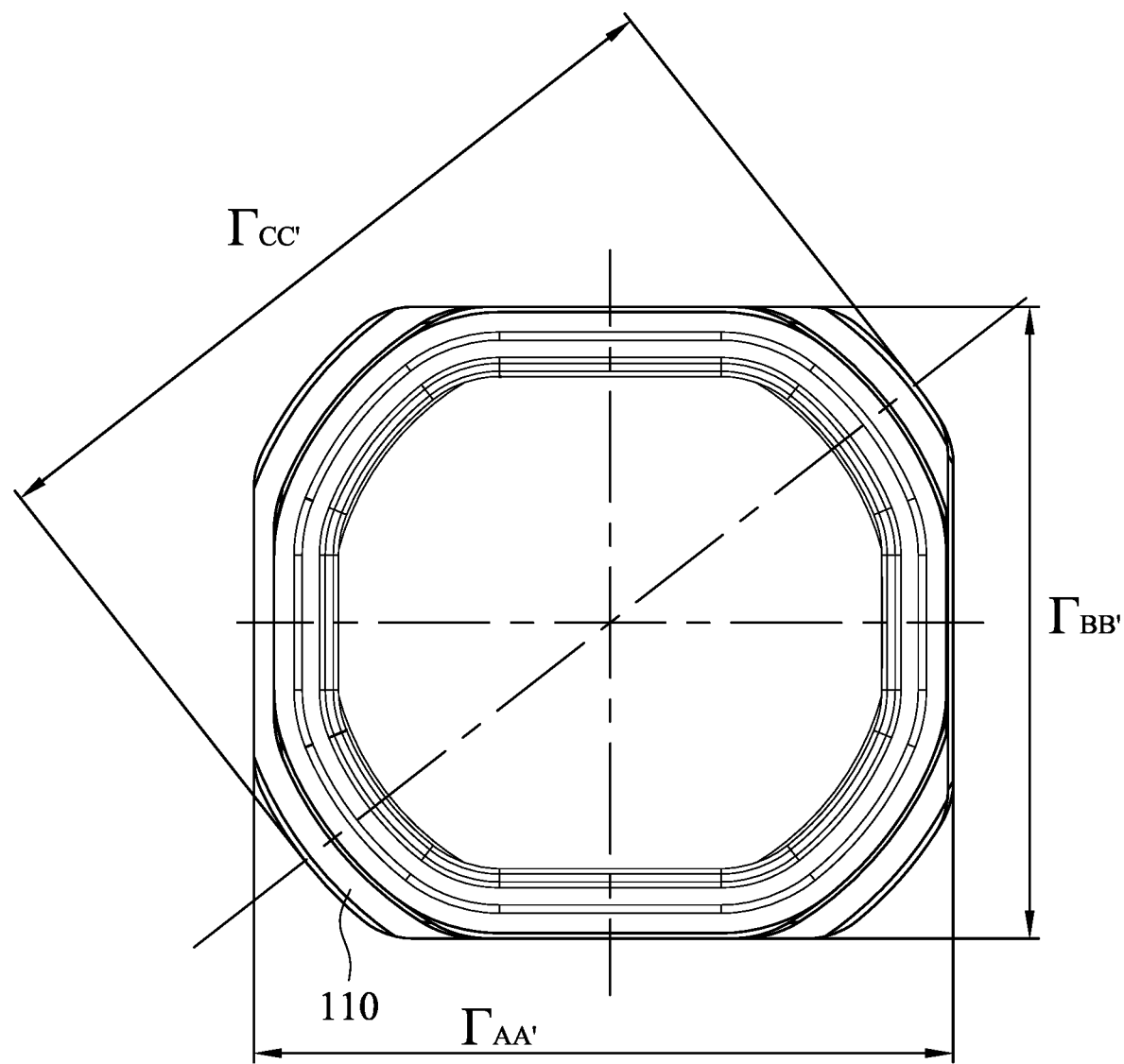
FIG. 8A shows a schematic view of the parameters $\Gamma_{AA'}$, $\Gamma_{BB'}$ and $\Gamma_{CC'}$ of the lens element of the imaging lens module according to the embodiment of FIG. 1.
Figure 8B:
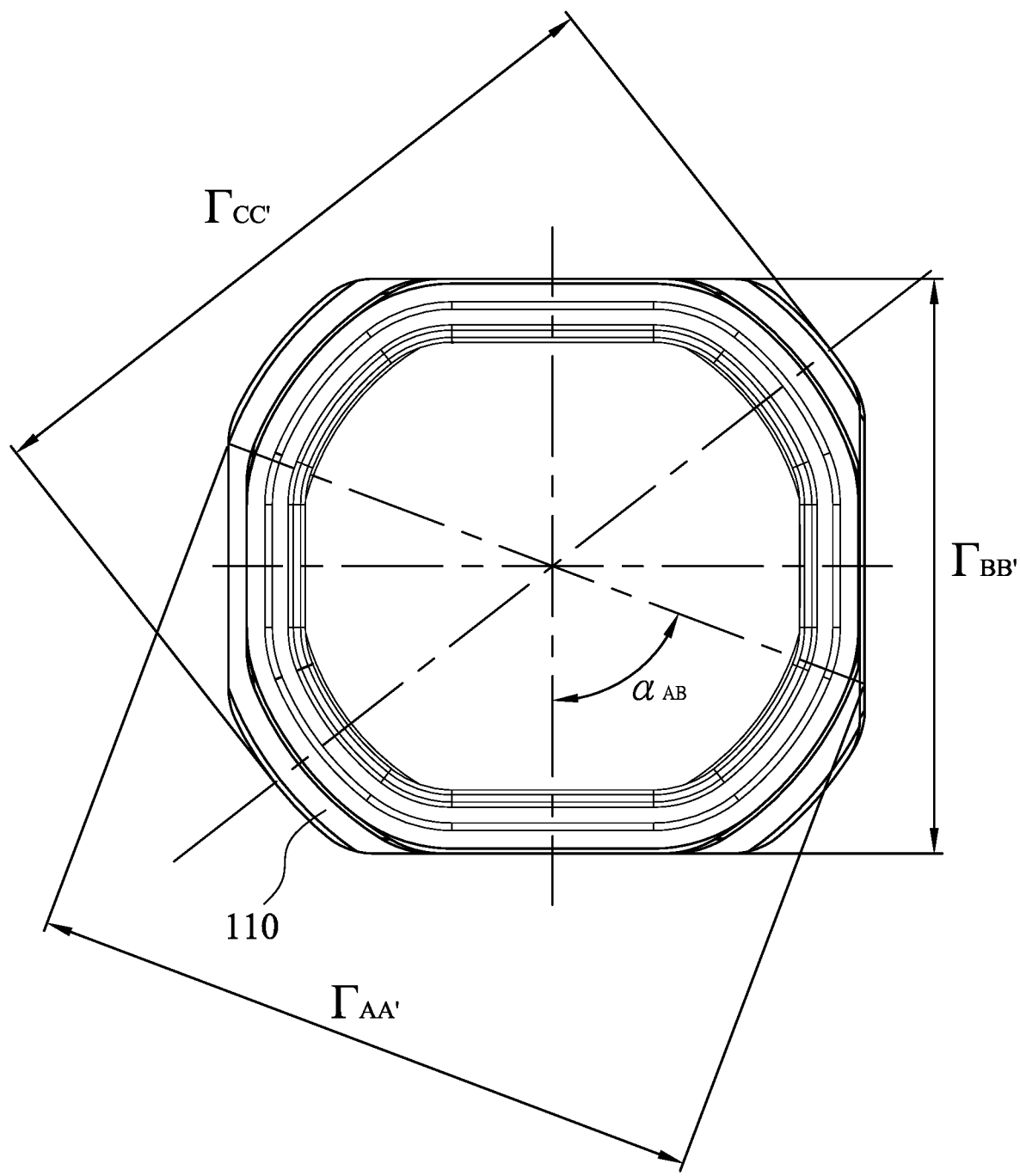
FIG. 8B shows a schematic view of the parameters $\Gamma_{AA'}$ and $\alpha_{AB}$ of the lens element of the imaging lens module according to the embodiment of FIG. 1.

FIG. 8A shows a schematic view of the parameters Γ$_{AA'}$, Γ$_{BB'}$ and Γ$_{CC'}$ of the lens element 110 of the imaging lens module according to the embodiment of FIG. 1. FIG. 8B shows a schematic view of the parameters Γ$_{AA'}$ and α$_{AB}$ of the lens element 110 of the imaging lens module according to the embodiment of FIG. 1. In FIG. 8A, the lens element 110 can be a non-circular lens element, a maximum outer diameter of the lens element 110 is Γ$_{CC'}$, a minimum outer diameter of the lens element 110 is Γ$_{BB'}$, and a lens outer diameter of the lens element 110 is Γ$_{AA'}$, which excludes the maximum outer diameter Γ$_{CC'}$ of the lens element 110 and the minimum outer diameter Γ$_{BB'}$ of the lens element 110.

Figure 8C:
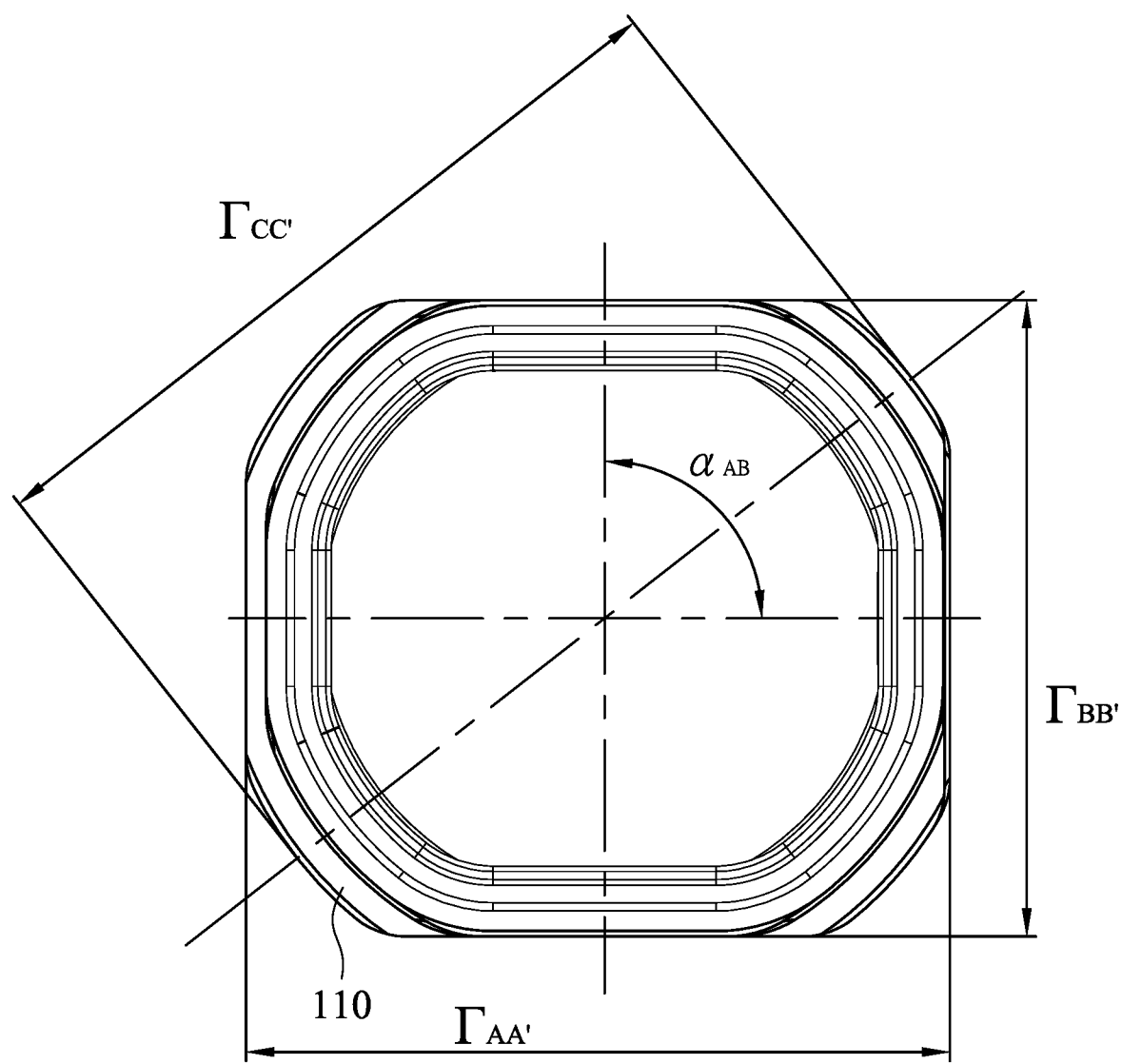
FIG. 8C shows a schematic view of the parameter $\alpha_{AB}$ of the lens element of the imaging lens module according to the embodiment of FIG. 1.
Figure 8D:
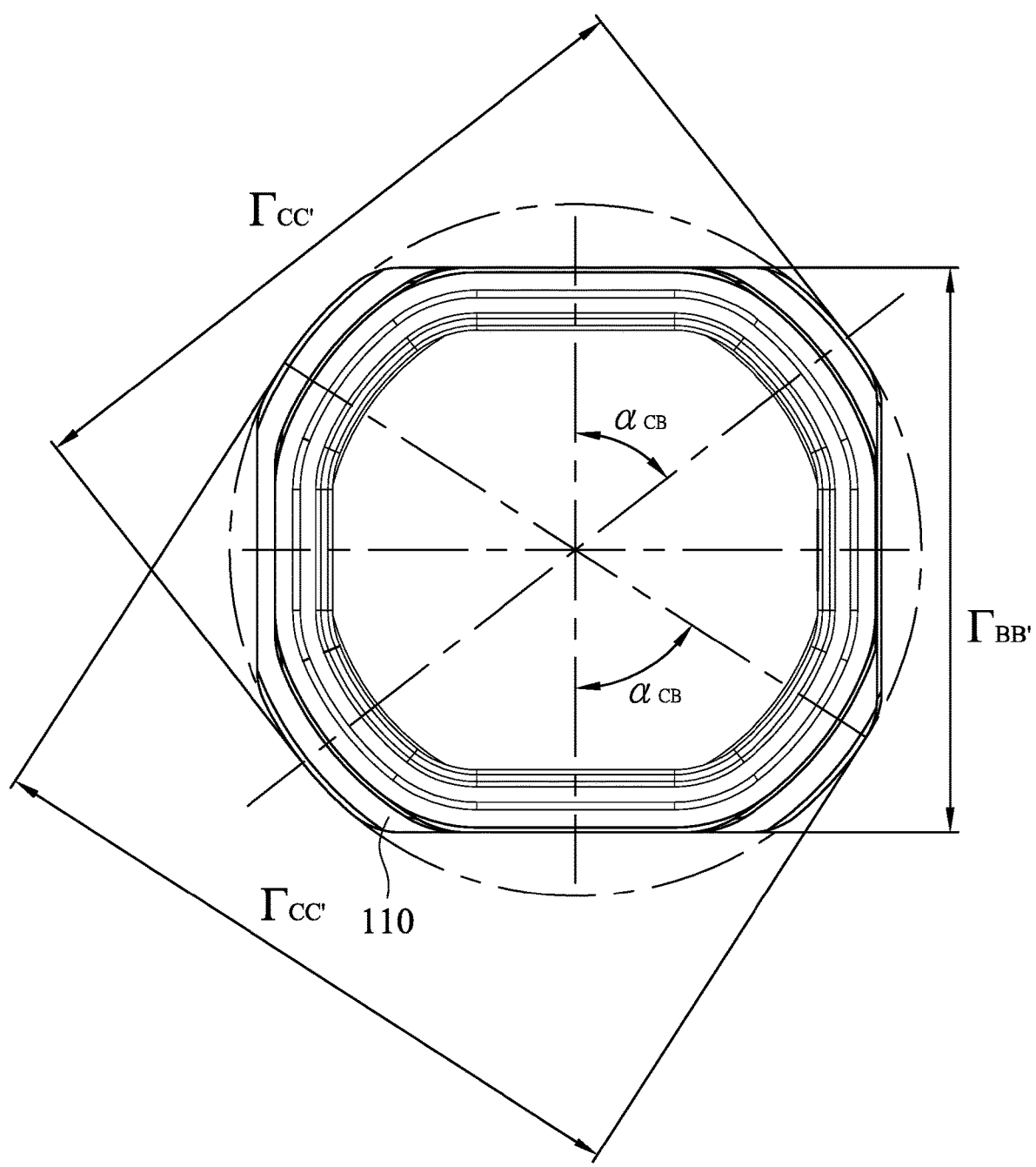
FIG. 8D shows a schematic view of the parameter $\alpha_{CB}$ of the lens element of the imaging lens module according to the embodiment of FIG. 1.

FIG. 8C shows a schematic view of the parameter α$_{AB}$ of the lens element 110 of the imaging lens module according to the embodiment of FIG. 1. FIG. 8D shows a schematic view of the parameter α$_{CB}$ of the lens element 110 of the imaging lens module according to the embodiment of FIG. 1. In FIG. 8B and FIG. 8C, an angle between the lens outer diameter Γ$_{AA'}$ of the lens element 110 and the minimum outer diameter Γ$_{BB'}$ of the lens element 110 is α$_{AB}$, wherein the minimum value of the angle α$_{AB}$ of the lens element 110 is shown in FIG. 8B, and the maximum value of the angle α$_{AB}$ of the lens element 110 is shown in FIG. 8C. In FIG. 8D, an angle between the maximum outer diameter Γ$_{CC'}$ of the lens element 110 and the minimum outer diameter Γ$_{BB'}$ of the lens element 110 is α$_{CB}$, wherein the minimum value and the maximum value of the angle α$_{CB}$ of the lens element 110 are shown in FIG. 8D. The following conditions are satisfied: Γ$_{BB'}$≥Γ$_{AA'}$<Γ$_{CC'}$; and |α$_{AB}$|>|α$_{CB}$|, wherein |α$_{AB}$| and |α$_{CB}$| are both smaller than or equal to 90 degrees. Therefore, it is favorable for maintaining the overall stability and the image quality of the imaging lens module. Preferably, the following condition is satisfied: 35 degrees<|α$_{CB}$|<65 degrees.

Figure 9A:
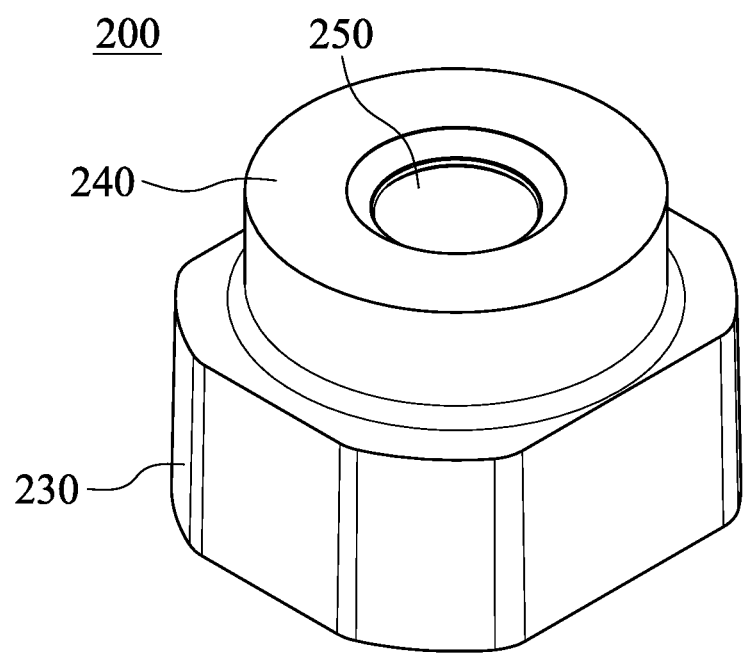
FIG. 9A shows a schematic view of the object side of the first optical component of the imaging lens module according to the embodiment of FIG. 1.
Figure 9B:
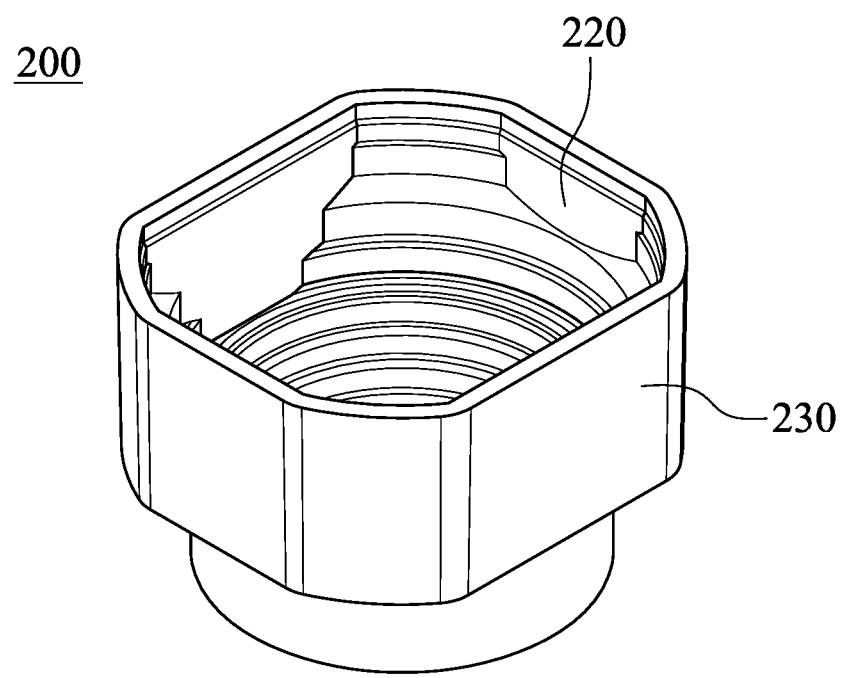
FIG. 9B shows a schematic view of the image side of the first optical component of the imaging lens module according to the embodiment of FIG. 1.

FIG. 9A shows a schematic view of the object side of the first optical component 200 of the imaging lens module according to the embodiment of FIG. 1. FIG. 9B shows a schematic view of the image side of the first optical component 200 of the imaging lens module according to the embodiment of FIG. 1. In detail, the first optical component 200 can be a barrel, wherein a side wall 230 is closed-shape, and the non-circular opening hole 220 connected to the side wall 230 is disposed in the image side of the first optical component 200. An end wall 240 connected to one end of the side wall 230 is disposed in the object side of the first optical component 200 and has a circular opening hole 250 thereon, wherein the circular opening hole 250 is corresponded to the non-circular opening hole 220 for disposing the imaging lens assembly 100 into the first optical component 200. The circular opening hole 250 can be an aperture stop of the imaging lens assembly 100, and the first optical components 200, the circular opening hole 250 and the non-circular opening hole 220 can be formed integrally. Therefore, the first optical components 200 can suppress a light by the non-circular opening hole 220, which is shrunk from a circular opening hole with a fixed diameter. The shrunk portion can block the parts of the non-imaging light and the stray light. Moreover, the surface of the first optical components 200 can be processed to be coated or obtain a matte or sandblasted appearance so as to reduce the reflection of the light. Hence, the first optical component 200 can have the effects of eliminating the stray light, reducing the deflected light and blocking the non-imaging light. In other words, the first optical component 200 has a light suppression property, which can include the effects of eliminating the stray light, reducing the deflected light and blocking the non-imaging light.

Figure 9C:
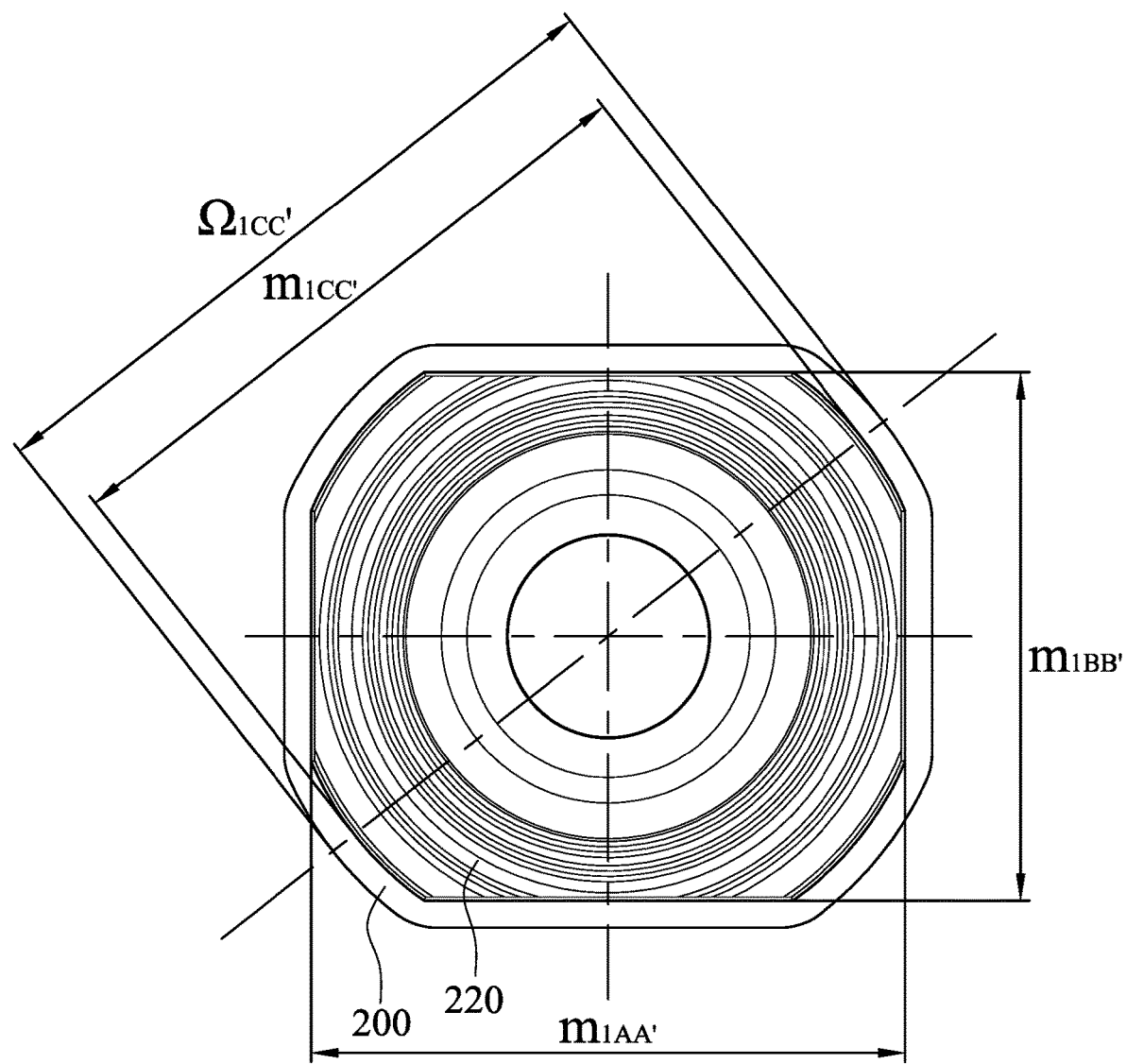
FIG. 9C shows a schematic view of the parameters $m_{1AA'}$, $m_{1BB'}$, $m_{1CC'}$ and $\Omega_{1CC'}$ of the first optical component of the imaging lens module according to the embodiment of FIG. 1.
Figure 9D:
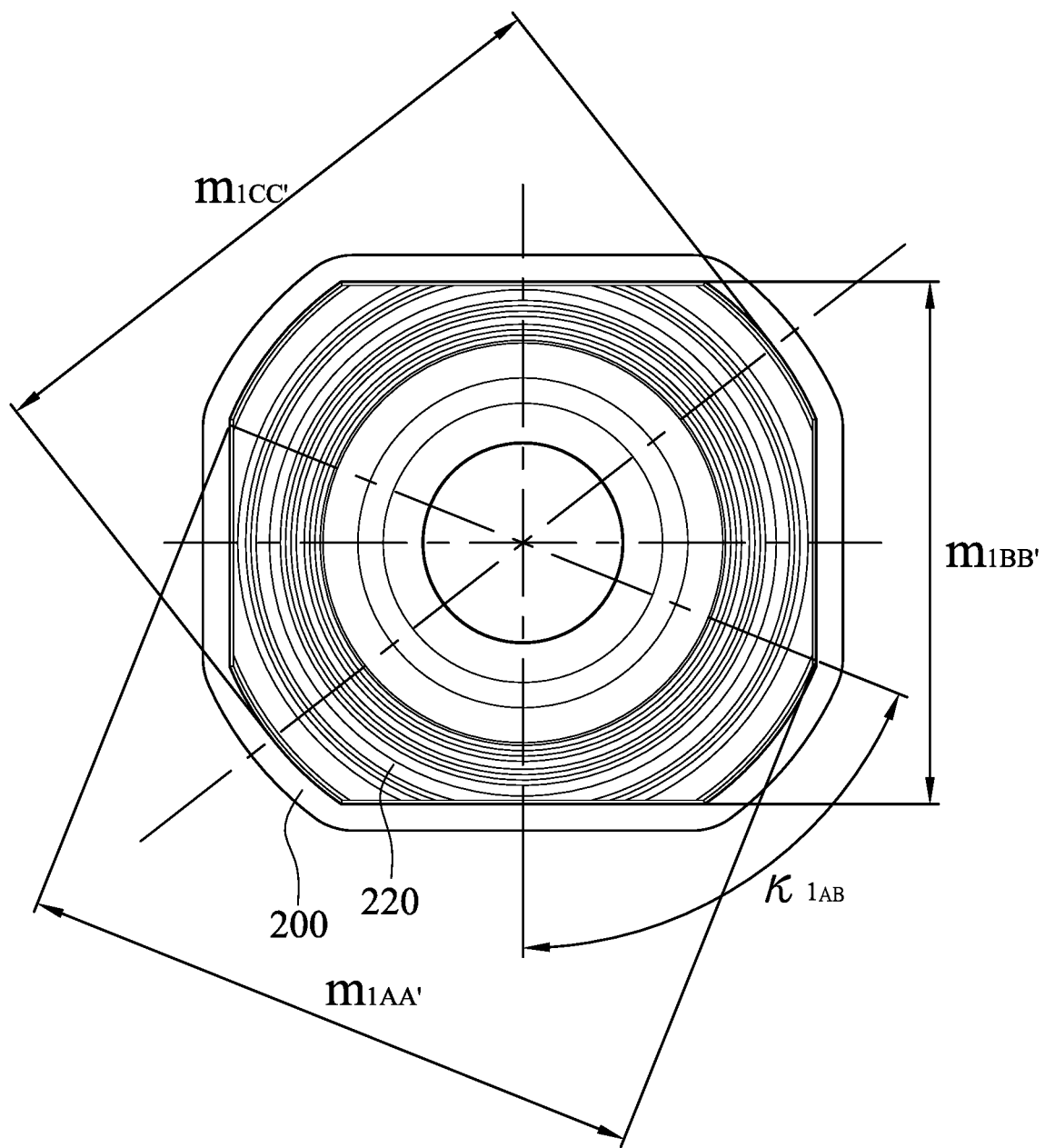
FIG. 9D shows a schematic view of the parameters $m_{1AA'}$ and $\kappa_{1AB}$ of the first optical component of the imaging lens module according to the embodiment of FIG. 1.

FIG. 9C shows a schematic view of the parameters $m_{1AA'}$, $m_{1BB'}$, $m_{1CC'}$ and $\Omega_{1CC'}$ of the first optical component 200 of the imaging lens module according to the embodiment of FIG. 1. FIG. 9D shows a schematic view of the parameters $m_{1AA'}$ and $\kappa_{1AB}$ of the first optical component 200 of the imaging lens module according to the embodiment of FIG. 1. In FIG. 9C, a minimum line distance between two points of a peripheral edge of the non-circular opening hole 220 of the first optical component 200 through the center of the non-circular opening hole 220 of the first optical component 200 is $m_{1BB'}$, and a maximum line distance between two points of the peripheral edge of the non-circular opening hole 220 of the first optical component 200 through the center of the non-circular opening hole 220 of the first optical component 200 is $m_{1CC'}$. In FIG. 9C and FIG. 9D, a line distance between any two points of the peripheral edge of the non-circular opening hole 220 of the first optical component 200 through a center of the non-circular opening hole 220 of the first optical component 200 is $m_{1AA'}$, wherein the minimum value of the line distance $m_{1AA'}$ of the first optical component 200 is shown in FIG. 9C, and the maximum value of the line distance $m_{1AA'}$ of the first optical component 200 is shown in FIG. 9D.

Figure 9E:
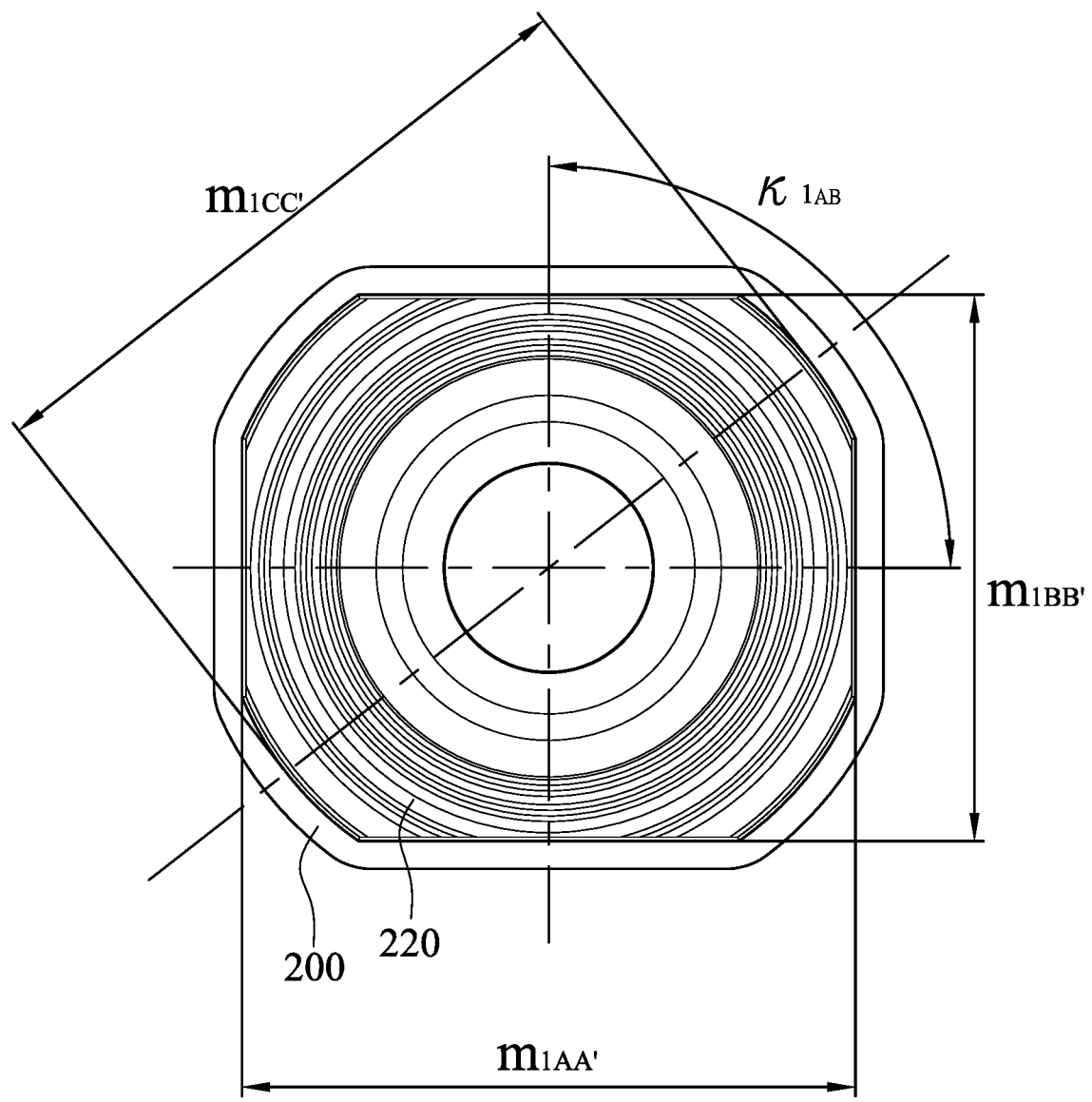
FIG. 9E shows a schematic view of the parameter $\kappa_{1AB}$ of the first optical component of the imaging lens module according to the embodiment of FIG. 1.
Figure 9F:
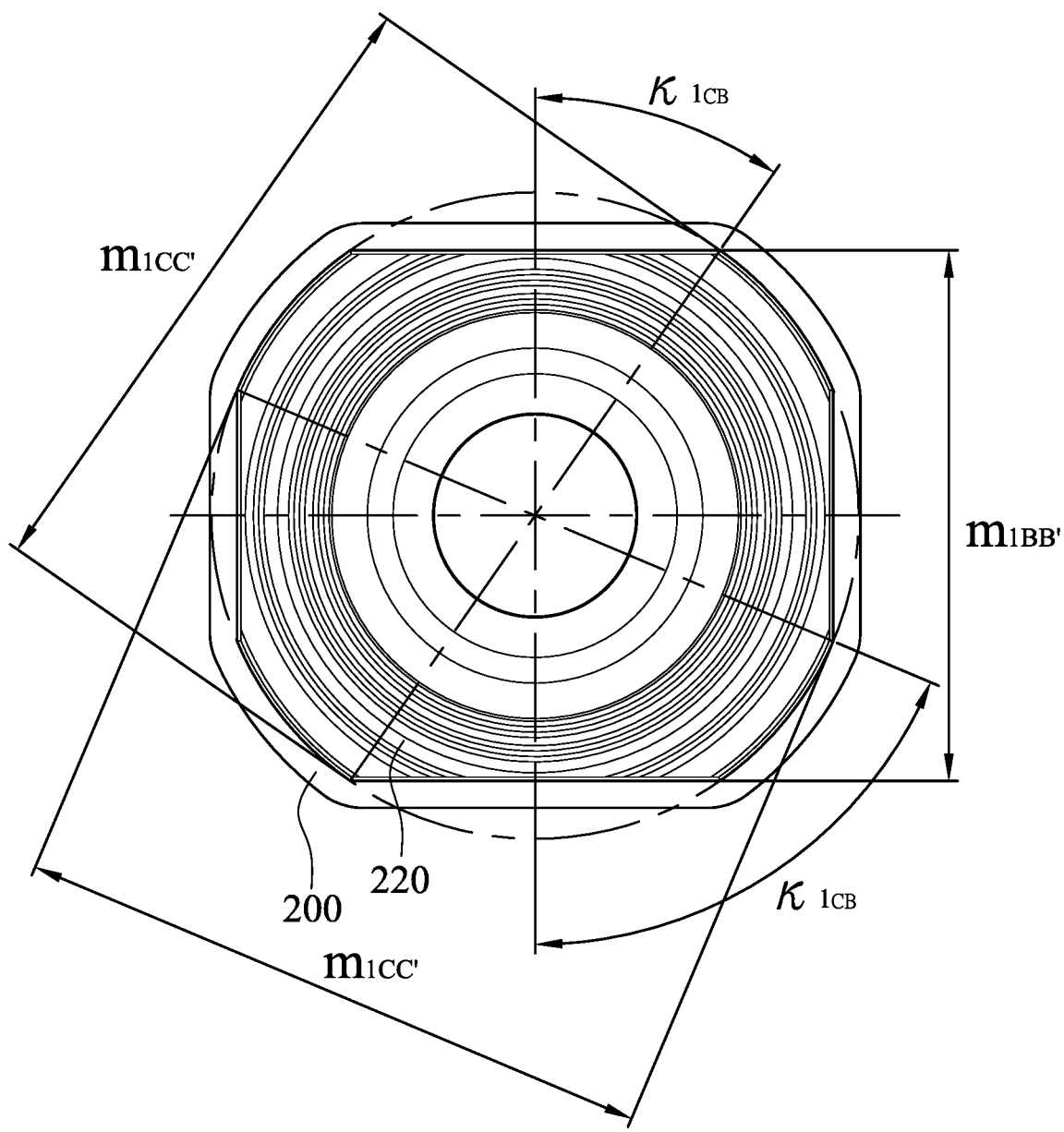
FIG. 9F shows a schematic view of the parameter $\kappa_{1CB}$ of the first optical component of the imaging lens module according to the embodiment of FIG. 1.

FIG. 9E shows a schematic view of the parameter $\kappa_{1AB}$ of the first optical component 200 of the imaging lens module according to the embodiment of FIG. 1. FIG. 9F shows a schematic view of the parameter $\kappa_{1CB}$ of the first optical component 200 of the imaging lens module according to the embodiment of FIG. 1. In FIG. 9D and FIG. 9E, an angle between the line distance $m_{1AA'}$ of the first optical component 200 and the minimum line distance $m_{1BB'}$ of the first optical component 200 is $\kappa_{1AB}$, wherein the minimum value of the angle $\kappa_{1AB}$ of the first optical component 200 is shown in FIG. 9D, and the maximum value of the angle $\kappa_{1AB}$ of the first optical component 200 is shown in FIG. 9E. In FIG. 9F, an angle between the maximum line distance $m_{1CC'}$ of the first optical component 200 and the minimum line distance $m_{1BB'}$ of the first optical component 200 is $\kappa_{1CB}$, wherein the minimum value and the maximum value of the angle $\kappa_{1CB}$ of the first optical component 200 are shown in FIG. 9F. The following conditions are satisfied: $m_{1BB'} \leq m_{1AA'} \leq m_{1CC'}$; and $|\kappa_{1AB}| > |\kappa_{1CB}|$, wherein $|\kappa_{1AB}|$ and $|\kappa_{1CB}|$ are both smaller than or equal to 90 degrees. Therefore, it is favorable for maintaining the structural strength of the first optical component 200 after volume shrinkage and reducing the stray light effectively.

Furthermore, FIG. 6B indicates the maximum line distance $l_{CC'}$ of the first effective optical portion 111 of the lens element 110, and the following condition is satisfied: 2.5 mm<$l_{CC'}$<9.0 mm. FIG. 7B indicates the maximum line distance $l_{CC'}$ of the second effective optical portion 112 of the lens element 110, and the following condition is satisfied: 2.5 mm<$l_{CC'}$<9.0 mm. FIG. 9C indicates the maximum line distance $m_{1CC'}$ of the first optical component 200, and the following condition is satisfied: 2.5 mm<$m_{1CC'}$<9.0 mm. Therefore, it is favorable for maintaining the compact size and the image quality of the imaging lens module.

FIG. 8A indicates the maximum outer diameter $\Gamma_{CC'}$ of the lens element 110, FIG. 9C indicates the maximum outer diameter $\Omega_{1CC'}$ of the first optical component 200, and the following conditions are satisfied: 3.9 mm<$\Gamma_{CC'}$<12.0 mm; and 3.9 mm<$\Omega_{1CC'}$<12.0 mm. Therefore, it is favorable for maintaining the compact size and the structural strength of the imaging lens module.

FIG. 6B indicates the maximum line distance $l_{CC'}$ of the first effective optical portion 111 of the lens element 110, FIG. 8A indicates the maximum outer diameter $\Gamma_{CC'}$ of the lens element 110, and the following condition is satisfied: 0.6<$l_{CC'}/\Gamma_{CC'}$<1. Preferably, the following condition is satisfied: 0.8<$l_{CC'}/\Gamma_{CC'}$<0.98. FIG. 6B indicates the minimum line distance $l_{BB'}$ of the first effective optical portion 111 of the lens element 110, FIG. 8A indicates the minimum outer diameter $\Gamma_{BB'}$ of the lens element 110, and the following condition is satisfied: 0.65<$l_{BB'}/\Gamma_{BB'}$<1.0. Therefore, it is favorable for reducing the stray light and assembling difficulties of the imaging lens module.

FIG. 7B indicates the maximum line distance $l_{CC'}$ of the second effective optical portion 112 of the lens element 110, FIG. 8A indicates the maximum outer diameter $\Gamma_{CC'}$ of the lens element 110, and the following condition is satisfied: 0.6<$l_{CC'}/\Gamma_{CC'}$<1. Preferably, the following condition is satisfied: 0.8<$l_{CC'}/\Gamma_{CC'}$<0.98. FIG. 6B indicates the minimum line distance $l_{BB'}$ of the second effective optical portion 112 of the lens element 110, FIG. 8A indicates the minimum outer diameter $\Gamma_{BB'}$ of the lens element 110, and the following condition is satisfied: 0.65<$l_{BB'}/\Gamma_{BB'}$<1.0. Therefore, it is favorable for reducing the stray light and assembling difficulties of the imaging lens module.

FIG. 9C indicates the maximum line distance $m_{1CC'}$ of the first optical component 200, the maximum outer diameter $\Omega_{1CC'}$ of the first optical component 200, and the following conditions are satisfied: 0.5<$m_{1CC'}/\Omega_{1CC'}$<1. Therefore, it is favorable for reducing the stray light and maintaining the structural strength of the imaging lens module. Preferably, the following condition is satisfied: 0.8<$m_{1CC'}/\Omega_{1CC'}$<0.98.

In FIG. 5, a distance parallel to the optical axis between an optical axial intersection of the first effective optical portion 111 of the lens element 110 and the circular opening hole 250 of the first optical component 200 is h, a distance parallel to the optical axis between the non-circular opening hole 220 of the first optical component 200 and the circular opening hole 250 of the first optical component 200 is T, and the following condition is satisfied: 0.45<h/T<1.20. Therefore, it is favorable for reducing the defect rate and the stray light of the imaging lens module.

In FIG. 5, a distance parallel to the optical axis between an optical axial intersection of the second effective optical portion 112 of the lens element 110 and the circular opening hole 250 of the first optical component 200 is h, a distance parallel to the optical axis between the non-circular opening hole 220 of the first optical component 200 and the circular opening hole 250 of the first optical component 200 is T, and the following condition is satisfied: 0.45<h/T<1.20. Therefore, it is favorable for reducing the defect rate and the stray light of the imaging lens module.

The data of the aforementioned parameters of the lens element 110 and the first optical component 200 are listed in the following Table 1 and Table 2 respectively.

TABLE 1

Data of the lens element 110

|  | The first effective optical portion 111 (Object side) | The second effective optical portion 112 (Image side) |
|---|---|---|
| $\theta_{AB}$ (deg.) | 76-90 | 65-90 |
| $\theta_{CB}$ (deg.) | 31-75 | 39-62 |
| $l_{AA'}$ (mm) | 4.08-4.2 | 4.7-5.2 |
| $l_{BB'}$ (mm) | 3.70 | 4.15 |
| $l_{CC'}$ (mm) | 4.28 | 5.33 |
| $l_{BB'}/l_{CC'}$ | 0.86 | 0.78 |
| $l_{CC'}/\Gamma_{CC'}$ | 0.74 | 0.92 |
| $l_{BB'}/\Gamma_{BB'}$ | 0.78 | 0.87 |
| h/T | 0.590 | 0.910 |

TABLE 1-continued

Data of the lens element 110

| | The first effective optical portion 111 (Object side) | The second effective optical portion 112 (Image side) |
|---|---|---|
| $\Gamma_{AA'}$ (mm) | 5.32-5.61 | |
| $\Gamma_{BB'}$ (mm) | 4.75 | |
| $\Gamma_{CC'}$ (mm) | 5.82 | |
| $\alpha_{AB}$ (deg.) | 69-90 | |
| $\alpha_{CB}$ (deg.) | 40-57 | |

TABLE 2

Data of the first optical component 200

| | | | |
|---|---|---|---|
| $K_{1AB}$ (deg.) | 68-90 | $m_{1CC'}$ (mm) | 5.97 |
| $K_{1CB}$ (deg.) | 35-67 | $\Omega_{1CC'}$ (mm) | 6.47 |
| $m_{1AA'}$ (mm) | 5.5-5.93 | $m_{1BB'}/m_{1CC'}$ | 0.82 |
| $m_{1BB'}$ (mm) | 4.90 | $m_{1CC'}/\Omega_{1CC}$ | 0.92 |

Furthermore, in FIG. 1 and FIG. 2, the imaging lens module can further include an image surface 700 disposed on the image side of the imaging lens module. The imaging lens assembly can include five lens elements, those are the lens element 110 and other four lens elements (101-104), wherein the lens element 110 is adjacent to the image surface 700. That is, the lens element which is closest to the image surface 700 of the imaging lens assembly 100 is the lens element 110. The imaging lens module can further include a second optical component 300. The second optical component 300 can include a spacer 400, a light blocking plate 500, and a retainer 600. Each of the spacer 400, the light blocking plate 500, and the retainer 600 of the second optical component 300 is disposed in the first optical component 200 and has at least a non-circular hole. The non-circular hole of the second optical component 300 is shrunk from a circular opening hole with a fixed diameter. The shrunk portion can be for blocking the parts of the non-imaging light and the stray light. The specific surface of the second optical component 300 can be processed to be coated or obtain a matte or sandblasted appearance so as to reduce the reflection of the light. The specific surface of the spacer 400 or the retainer 600 can further be designed a plurality of coaxially arranged annular projection structure so as to reduce the light diffusing. Therefore, each of the spacer 400, the light blocking plate 500, and the retainer 600 has the light suppression property. Moreover, the second optical component 300 can be closer to the non-circular opening hole 220 of the first optical component 200 than the circular opening hole 250 of the first optical component 200. The appearance of the imaging lens module includes, in order from the object side to the image side, the first optical component 200 and the image surface 700, wherein an inside of the first optical component 200 includes, in order from the object side to the image side, the other four lens elements (101-104), the spacer 400, the light blocking plate 500, the lens element 110, and the retainer 600. Therefore, it is favorable for maintaining the structural strength and the image quality of the imaging lens module.

Figure 10A:
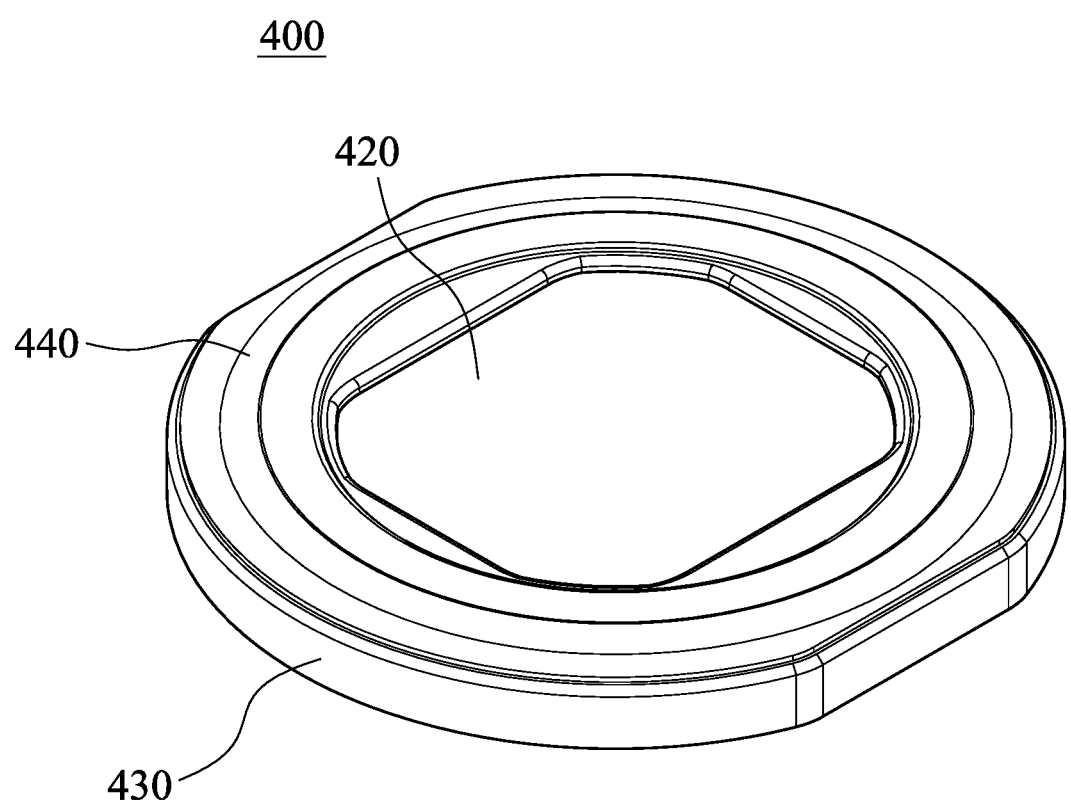
FIG. 10A shows a schematic view of the object side of the spacer of the imaging lens module according to the embodiment of FIG. 1.
Figure 11A:
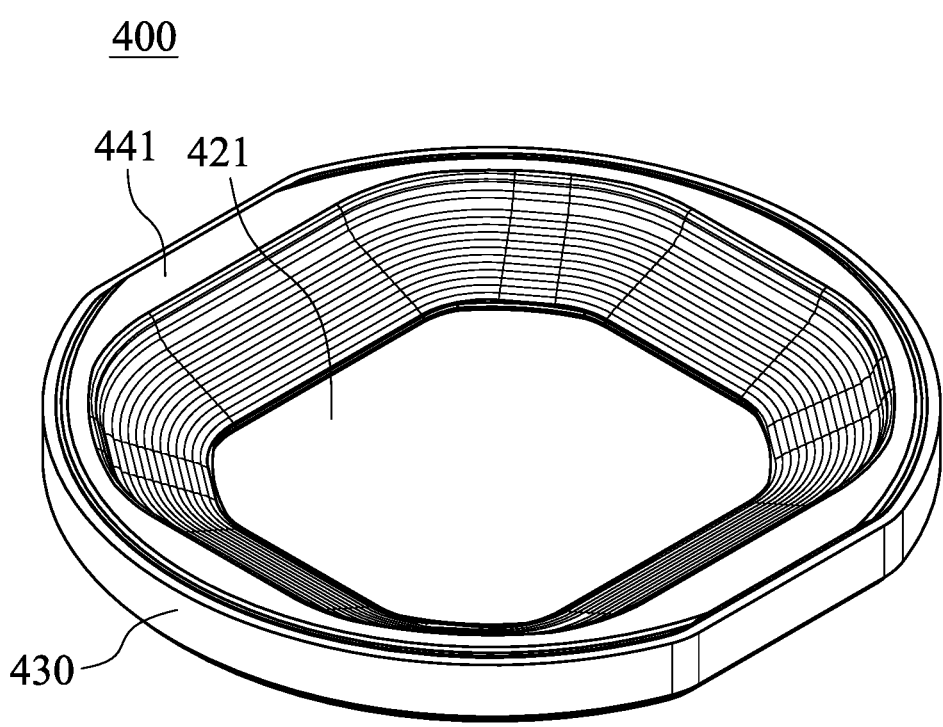
FIG. 11A shows a schematic view of the image side of the spacer of the imaging lens module according to the embodiment of FIG. 1.

FIG. 10A shows a schematic view of the object side of the spacer 400 of the imaging lens module according to the embodiment of FIG. 1. FIG. 11A shows a schematic view of the image side of the spacer 400 of the imaging lens module according to the embodiment of FIG. 1. The spacer 400 includes a side wall 430, an end wall 440 and an end wall 441. The side wall 430 is closed-shape, wherein each of the end wall 440 and the end wall 441 is connected to each of two ends of the side wall 430 separately. The end wall 440 having a non-circular opening hole 420 is disposed on the object side of the imaging lens module, and the end wall 441 having a non-circular opening hole 421 is disposed on the image side of the imaging lens module.

Figure 10B:
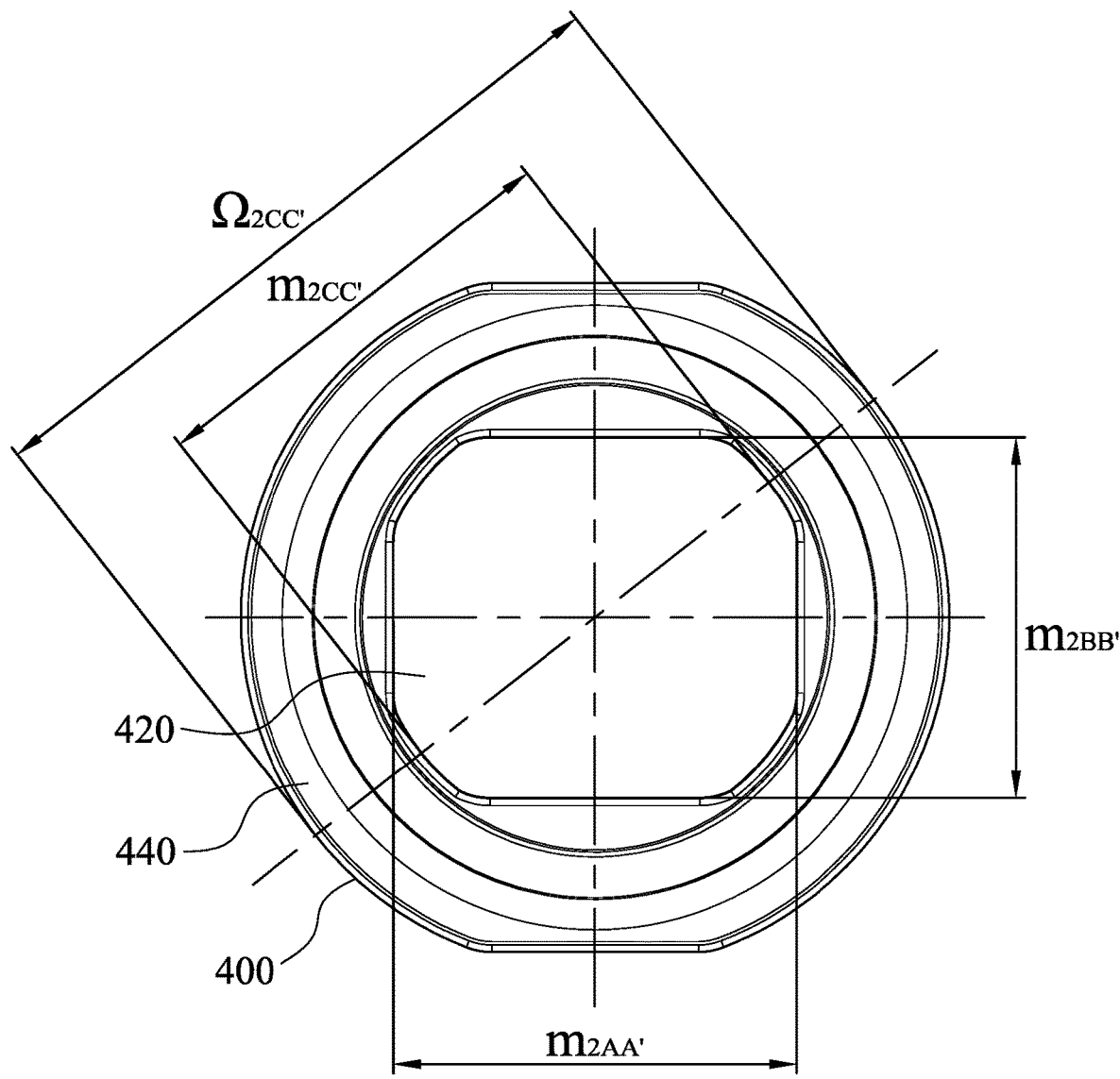
FIG. 10B shows a schematic view of the parameters $m_{2AA'}$, $m_{2BB'}$, and $m_{2CC'}$ of the object side and $\Omega_{2CC'}$ of the spacer of the imaging lens module according to the embodiment of FIG. 1.
Figure 10C:
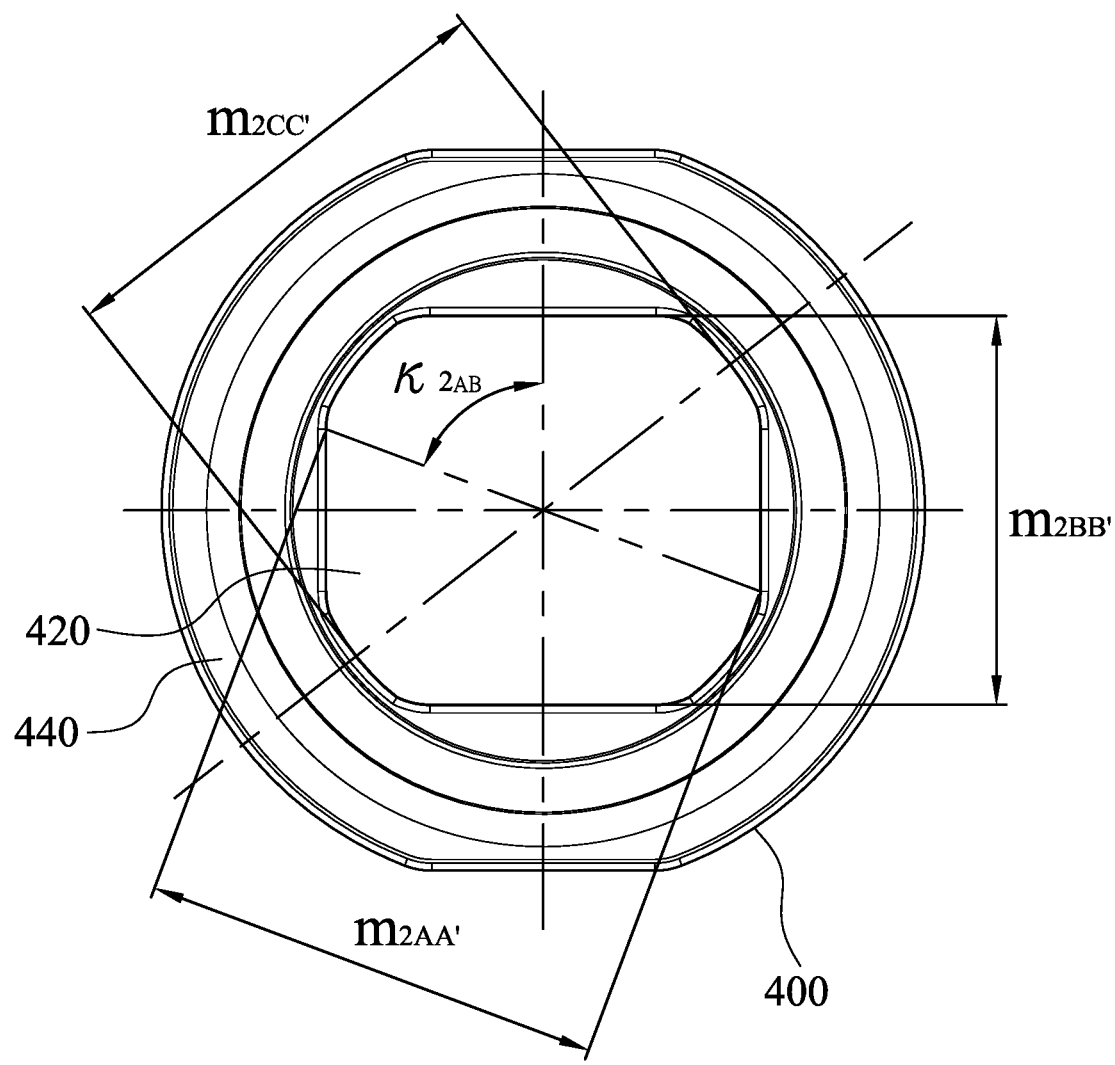
FIG. 10C shows a schematic view of the parameters $m_{2AA'}$ and $\kappa_{2AB}$ of the object side of the spacer of the imaging lens module according to the embodiment of FIG. 1.

FIG. 10B shows a schematic view of the parameters $m_{2AA'}$, $m_{2BB'}$ and $m_{2CC'}$ of the object side and $\Omega_{2CC'}$ of the spacer 400 of the imaging lens module according to the embodiment of FIG. 1. FIG. 100 shows a schematic view of the parameters $m_{2AA'}$ and $\kappa_{2AB}$ of the object side of the spacer 400 of the imaging lens module according to the embodiment of FIG. 1. In FIG. 10B, a maximum outer diameter of the spacer 400 is $\Omega_{2CC'}$, a minimum line distance between two points of a peripheral edge of the non-circular opening hole 420 of the object side of the spacer 400 through a center of the non-circular opening hole 420 of the object side of the spacer 400 is $m_{2BB'}$, and a maximum line distance between two points of the peripheral edge of the non-circular opening hole 420 of the object side of the spacer 400 through the center of the non-circular opening hole 420 of the object side of the spacer 400 is $m_{2CC'}$. In FIG. 10B and FIG. 100, a line distance between any two points of the peripheral edge of the non-circular opening hole 420 of the object side of the spacer 400 through the center of the non-circular opening hole 420 of the object side of the spacer 400 is $m_{2AA'}$, wherein the minimum value of the line distance $m_{2AA'}$ of the object side of the spacer 400 is shown in FIG. 10B, and the maximum value of the line distance $m_{2AA'}$ of the object side of the spacer 400 is shown in FIG. 100. The following condition is satisfied: $0.50 < m_{2BB'}/m_{2CC'} < 0.95$. Therefore, it is favorable for maintaining the structural strength of the object side of the spacer 400 after volume shrinkage and reducing the stray light effectively.

Figure 10D:
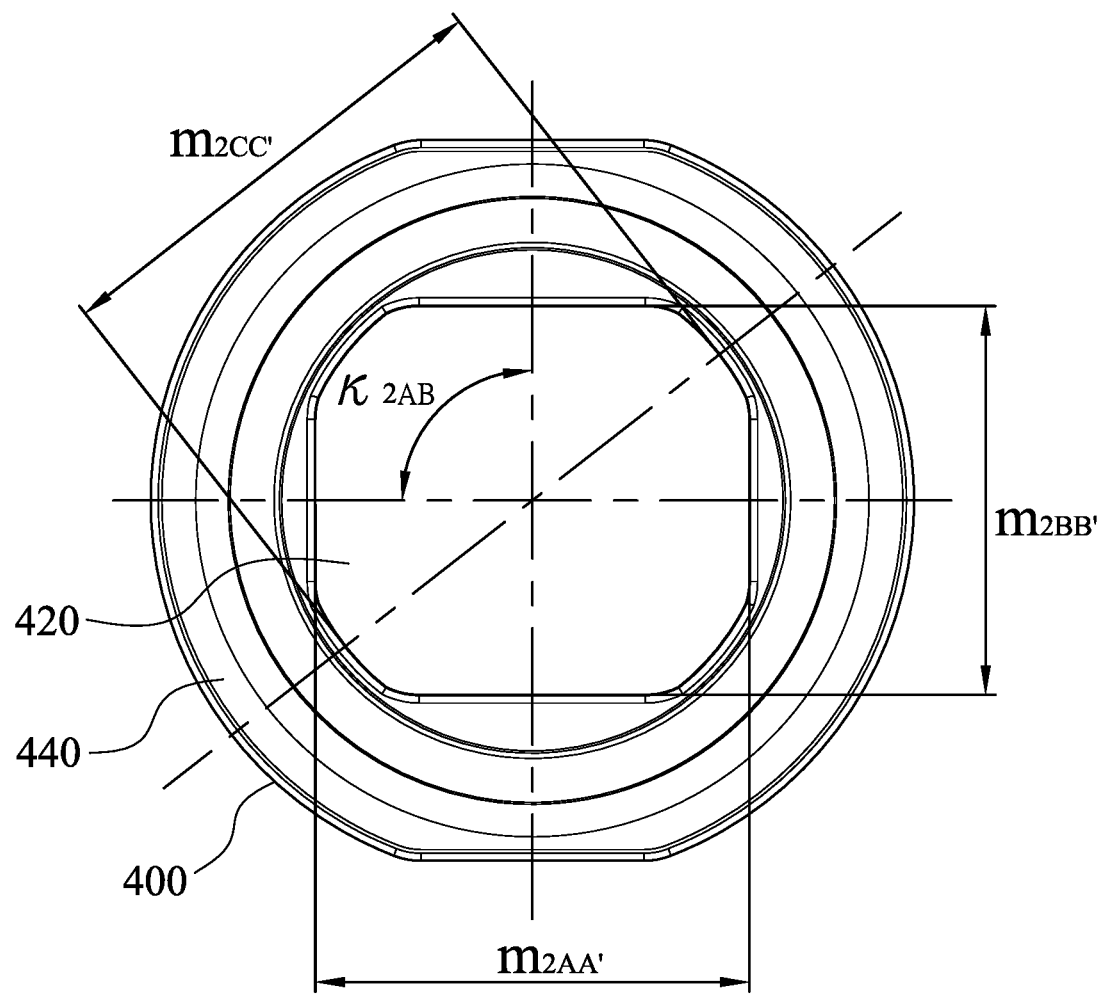
FIG. 10D shows a schematic view of the parameter $\kappa_{2AB}$ of the object side of the spacer of the imaging lens module according to the embodiment of FIG. 1.
Figure 10E:
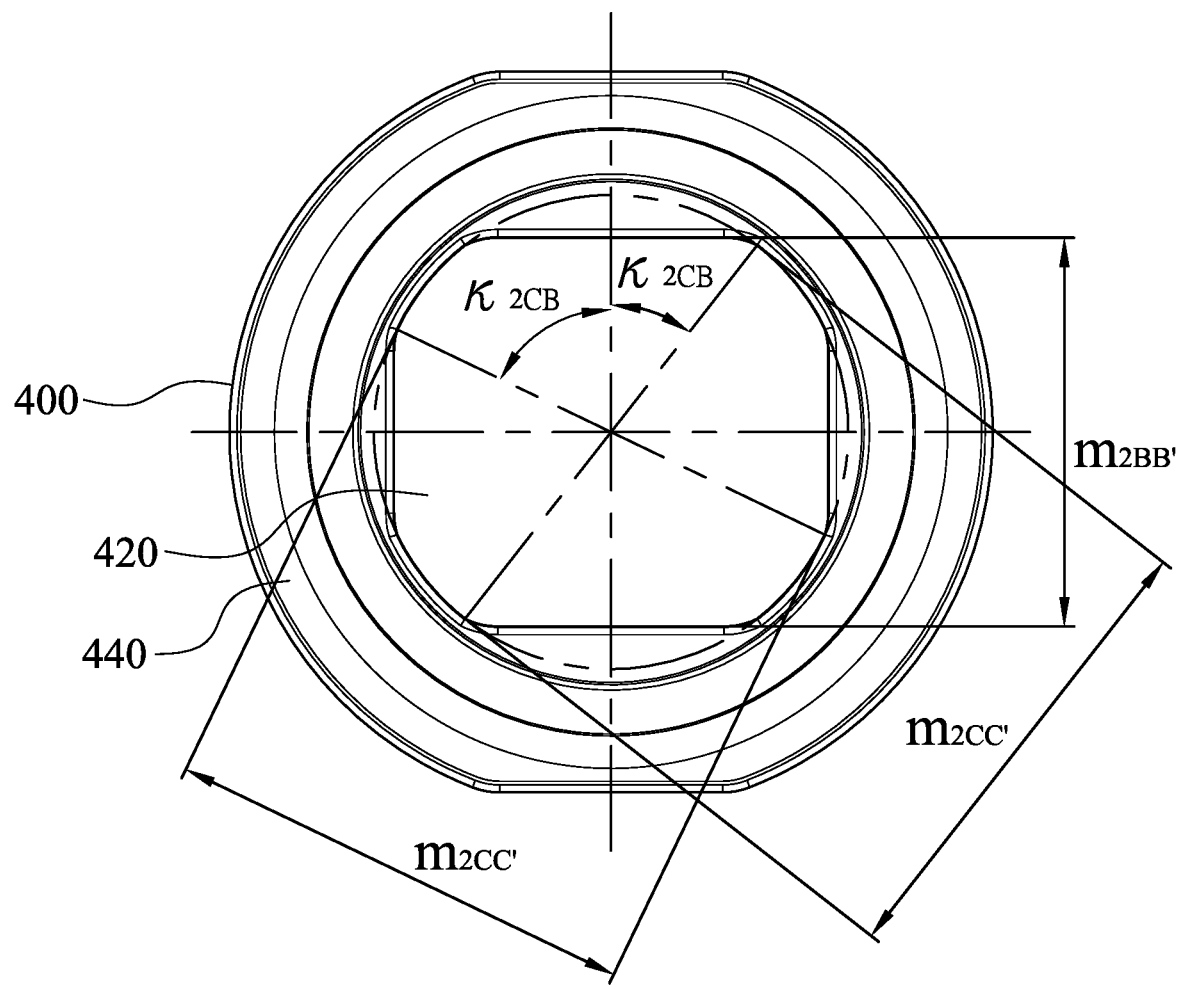
FIG. 10E shows a schematic view of the parameter $\kappa_{2CB}$ of the object side of the spacer of the imaging lens module according to the embodiment of FIG. 1.

FIG. 10D shows a schematic view of the parameter $\kappa_{2AB}$ of the object side of the spacer 400 of the imaging lens module according to the embodiment of FIG. 1. FIG. 10E shows a schematic view of the parameter $\kappa_{2CB}$ of the object side of the spacer 400 of the imaging lens module according to the embodiment of FIG. 1. In FIG. 100 and FIG. 10D, an angle between the line distance $m_{2AA'}$ of the object side of the spacer 400 and the minimum line distance $m_{2BB'}$ of the object side of the spacer 400 is $\kappa_{2AB}$, wherein the minimum value of the angle $\kappa_{2AB}$ of the object side of the spacer 400 is shown in FIG. 100, and the maximum value of the angle $\kappa_{2AB}$ of the object side of the spacer 400 is shown in FIG. 10D. In FIG. 10E, an angle between the maximum line distance $m_{2CC'}$ of the object side of the spacer 400 and the minimum line distance $m_{2BB'}$ of the object side of the spacer 400 is $\kappa_{2CB}$, wherein the minimum value and the maximum value of the angle $\kappa_{2CB}$ of the object side of the spacer 400 are shown in FIG. 10E.

In FIG. 4, a distance parallel to the optical axis between the non-circular opening hole 220 of the first optical component 200 and the non-circular opening hole 420 of the object side of the spacer 400 is t, a distance parallel to the optical axis between the non-circular opening hole 220 of the first optical component 200 and the circular opening hole 250 of the first optical component 200 is T, and the following condition is satisfied: $0.15 < t/T < 0.75$. Therefore, it is favorable for maintaining the structural strength and reducing the stray light of the imaging lens module.

Figure 11B:
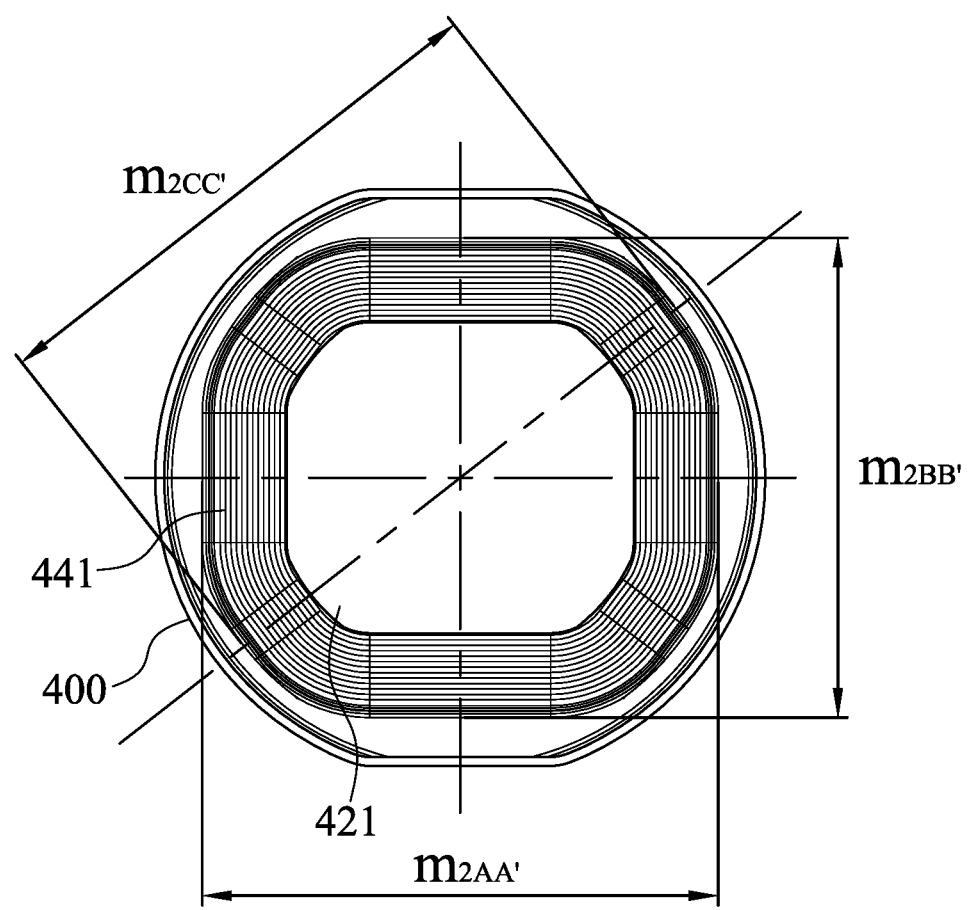
FIG. 11B shows a schematic view of the parameters $m_{2AA'}$, $m_{2BB'}$, and $m_{2CC'}$ of the image side of the spacer of the imaging lens module according to the embodiment of FIG. 1.
Figure 11C:
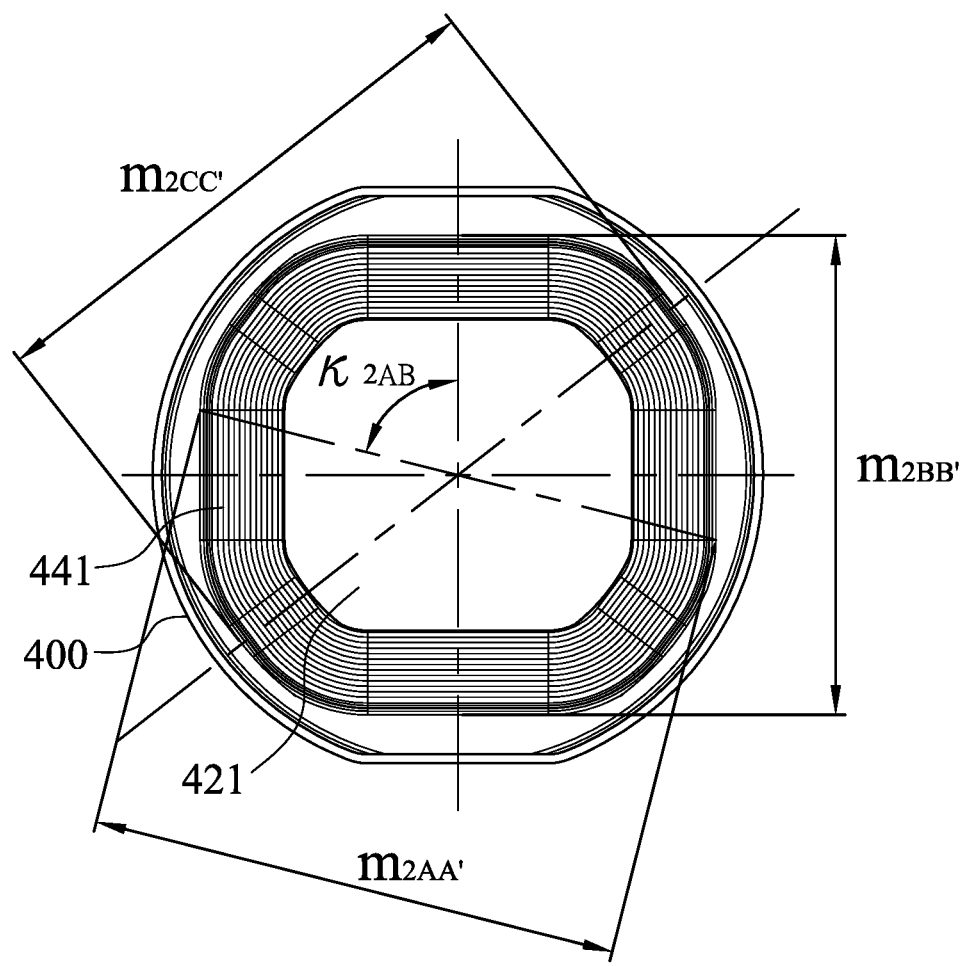
FIG. 11C shows a schematic view of the parameters $m_{2AA'}$ and $\kappa_{2AB}$ of the image side of the spacer of the imaging lens module according to the embodiment of FIG. 1.

FIG. 11B shows a schematic view of the parameters $m_{2AA'}$, $m_{2BB'}$ and $m_{2CC'}$ of the image side of the spacer 400 of the imaging lens module according to the embodiment of FIG. 1. FIG. 11C shows a schematic view of the parameters $m_{2AA'}$ and $\kappa_{2AB}$ of the image side of the spacer 400 of the imaging lens module according to the embodiment of FIG. 1. In FIG. 11B, a minimum line distance between two points of a peripheral edge of the non-circular opening hole 421 of the image side of the spacer 400 through a center of the non-circular opening hole 421 of the image side of the spacer 400 is $m_{2BB'}$, and a maximum line distance between two points of the peripheral edge of the non-circular opening hole 421 of the image side of the spacer 400 through the center of the non-circular opening hole 421 of the image side of the spacer 400 is $m_{2CC'}$. In FIG. 11B and FIG. 11C, a line distance between any two points of the peripheral edge of the non-circular opening hole 421 of the image side of the spacer 400 through the center of the non-circular opening hole 421 of the image side of the spacer 400 is $m_{2AA'}$, wherein the minimum value of the line distance $m_{2AA'}$ of the image side of the spacer 400 is shown in FIG. 11B, and the maximum value of the line distance $m_{2AA'}$ of the image side of the spacer 400 is shown in FIG. 11C. The following condition is satisfied: $0.50 < m_{2BB'}/m_{2CC'} < 0.95$. Therefore, it is favorable for maintaining the structural strength of the image side of the spacer 400 after volume shrinkage and reducing the stray light effectively.

Figure 11D:
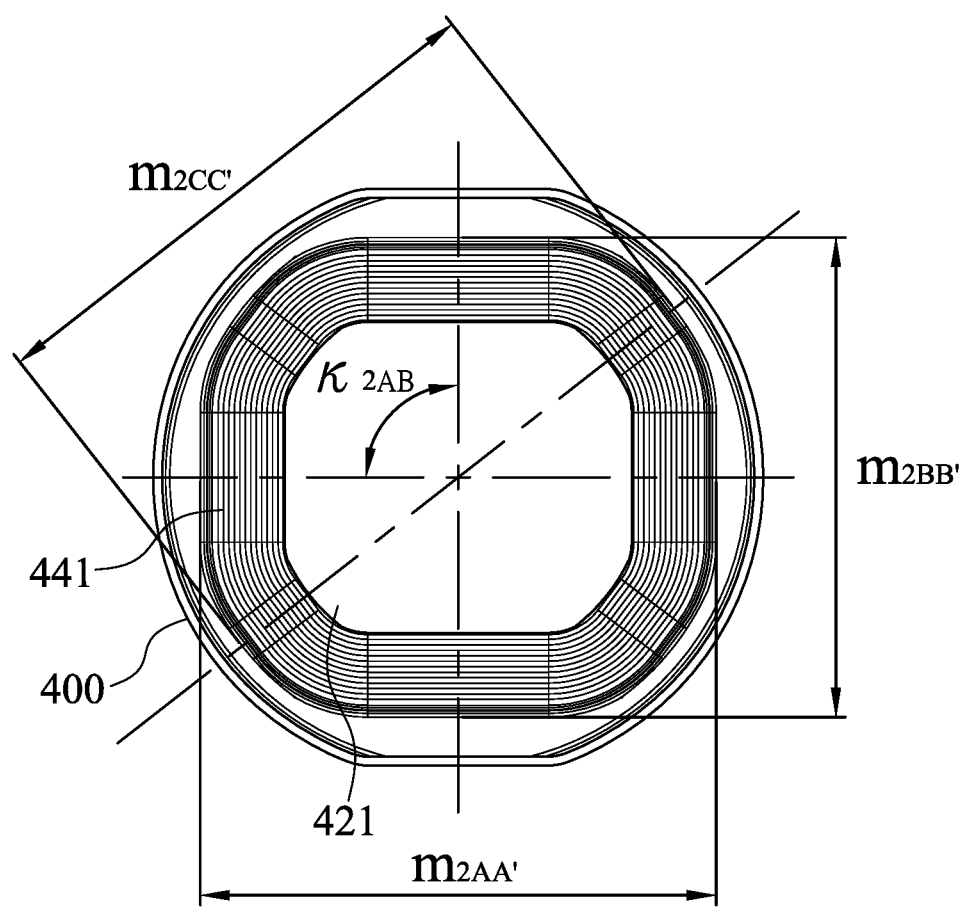
FIG. 11D shows a schematic view of the parameter $\kappa_{2AB}$ of the image side of the spacer of the imaging lens module according to the embodiment of FIG. 1.
Figure 11E:
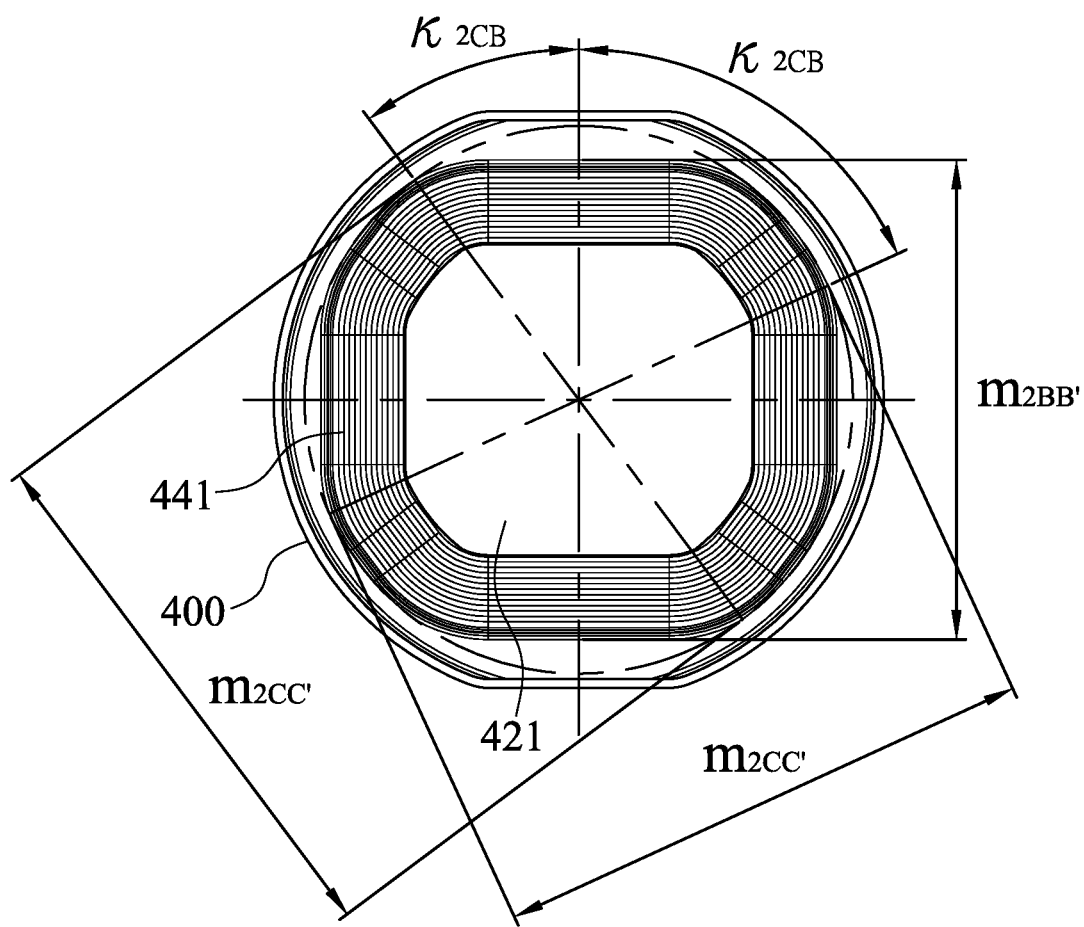
FIG. 11E shows a schematic view of the parameter $\kappa_{2CB}$ of the image side of the spacer of the imaging lens module according to the embodiment of FIG. 1.

FIG. 11D shows a schematic view of the parameter $\kappa_{2AB}$ of the image side of the spacer 400 of the imaging lens module according to the embodiment of FIG. 1. FIG. 11E shows a schematic view of the parameter $\kappa_{2CB}$ of the image side of the spacer 400 of the imaging lens module according to the embodiment of FIG. 1. In FIG. 11C and FIG. 11D, an angle between the line distance $m_{2AA'}$ of the image side of the spacer 400 and the minimum line distance $m_{2BB'}$ of the image side of the spacer 400 is $\kappa_{2AB}$, wherein the minimum value of the angle $\kappa_{2AB}$ of the image side of the spacer 400 is shown in FIG. 11C, and the maximum value of the angle $\kappa_{2AB}$ of the image side of the spacer 400 is shown in FIG. 11D. In FIG. 11E, an angle between the maximum line distance $m_{2CC'}$ of the image side of the spacer 400 and the minimum line distance $m_{2BB'}$ of the image side of the spacer 400 is $\kappa_{2CB}$, wherein the minimum value and the maximum value of the angle $\kappa_{2CB}$ of the image side of the spacer 400 are shown in FIG. 11E.

The data of the aforementioned parameters of the spacer 400 is listed in the following Table 3.

TABLE 3

| Data of the spacer 400 | | |
| --- | --- | --- |
|  | Object side | Image side |
| $\kappa_{2AB}$ (deg.) | 69-90 | 76-90 |
| $\kappa_{2CB}$ (deg.) | 38-64 | 37-65 |
| $m_{2AA'}$ (mm) | 2.9-3.1 | 4.31-4.44 |
| $m_{2BB'}$ (mm) | 2.60 | 4.01 |
| $m_{2CC'}$ (mm) | 3.17 | 4.58 |
| $\Omega_{2CC'}$ (mm) |  | 5.10 |
| $m_{2BB'}/m_{2CC'}$ | 0.82 | 0.88 |
| $m_{2CC'}/\Omega_{2CC'}$ | 0.62 | 0.90 |
| t/T | 0.522 | — |

Figure 12A:
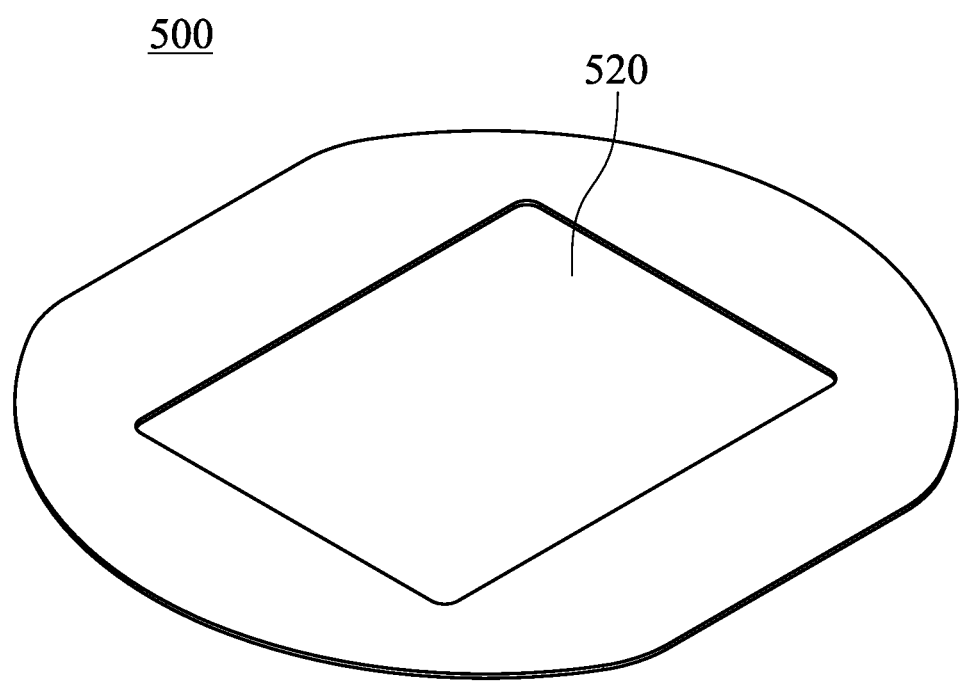
FIG. 12A shows a schematic view of the light blocking plate of the imaging lens module according to the embodiment of FIG. 1.

FIG. 12A shows a schematic view of the light blocking plate 500 of the imaging lens module according to the embodiment of FIG. 1. The light blocking plate 500 with an uniform thickness has an non-circular opening hole 520.

Figure 12B:
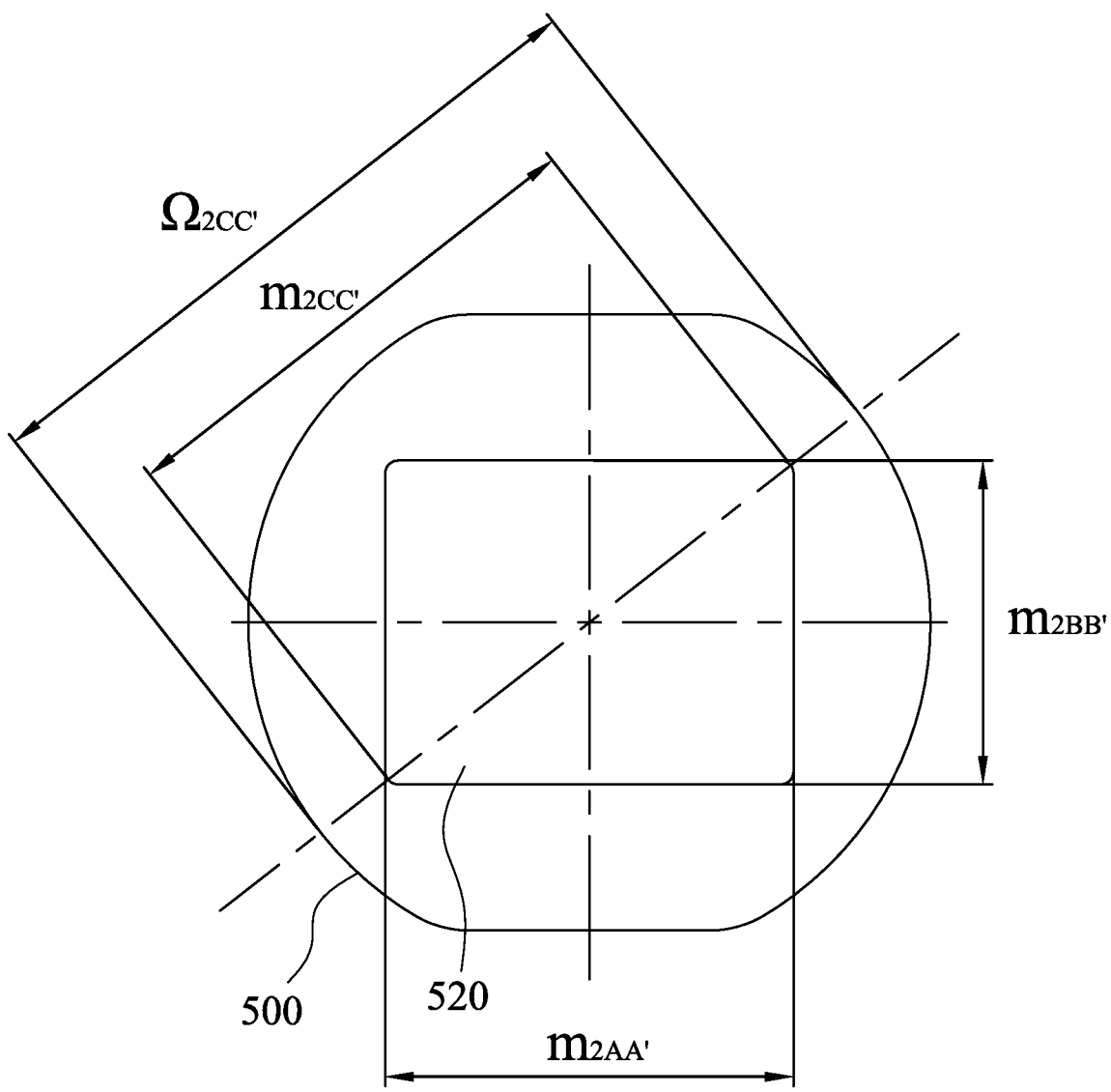
FIG. 12B shows a schematic view of the parameters $m_{2AA'}$, $m_{2BB'}$, and $m_{2CC'}$ of the light blocking plate of the imaging lens module according to the embodiment of FIG. 1.
Figure 12C:
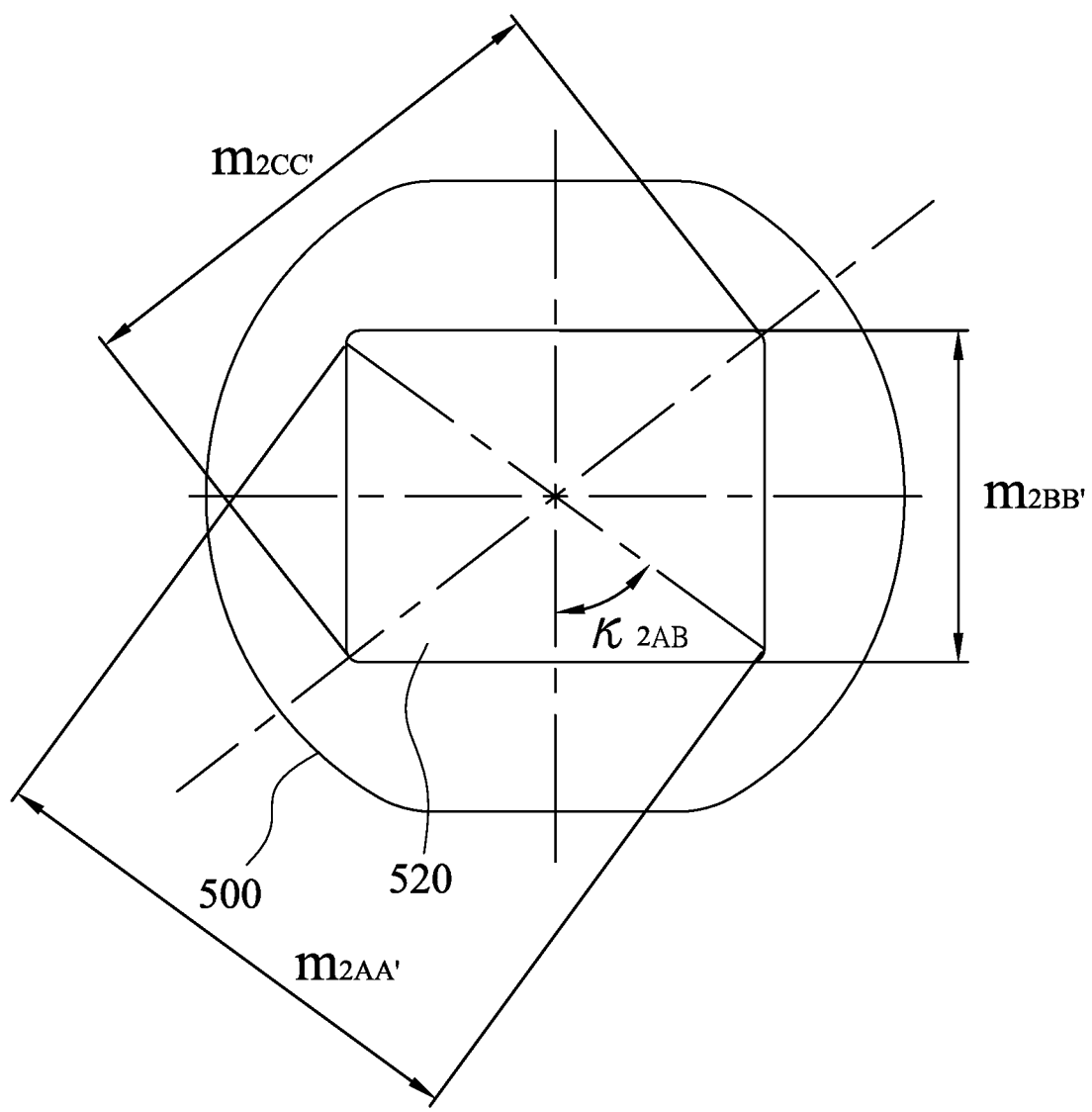
FIG. 12C shows a schematic view of the parameters $m_{2AA'}$ and $\kappa_{2AB}$ of the light blocking plate of the imaging lens module according to the embodiment of FIG. 1.

FIG. 12B shows a schematic view of the parameters $m_{2AA'}$, $m_{2BB'}$ and $m_{2CC'}$ of the light blocking plate 500 of the imaging lens module according to the embodiment of FIG. 1. FIG. 12C shows a schematic view of the parameters $m_{2AA'}$ and $\kappa_{2AB}$ of the light blocking plate 500 of the imaging lens module according to the embodiment of FIG. 1. In FIG. 12B, a maximum outer diameter of the light blocking plate 500 is $\Omega_{2CC'}$, a minimum line distance between two points of a peripheral edge of the non-circular opening hole 520 of the light blocking plate 500 through a center of the non-circular opening hole 520 of the light blocking plate 500 is $m_{2BB'}$, and a maximum line distance between two points of the peripheral edge of the non-circular opening hole 520 of the light blocking plate 500 through a center of the non-circular opening hole 520 of the light blocking plate 500 is $m_{2CC'}$. In FIG. 12B and FIG. 12C, a line distance between any two points of the peripheral edge of the non-circular opening hole 520 of the light blocking plate 500 through a center of the non-circular opening hole 520 of the light blocking plate 500 is $m_{2AA'}$, wherein the minimum value of the line distance $m_{2AA'}$ of the light blocking plate 500 is shown in FIG. 12B, and the maximum value of the line distance $m_{2AA'}$ of the light blocking plate 500 is shown in FIG. 12C. The following condition is satisfied: $0.50 < m_{2BB'}/m_{2CC'} < 0.95$. Therefore, it is favorable for maintaining the structural strength of the light blocking plate 500 after volume shrinkage and reducing the stray light effectively.

Figure 12D:
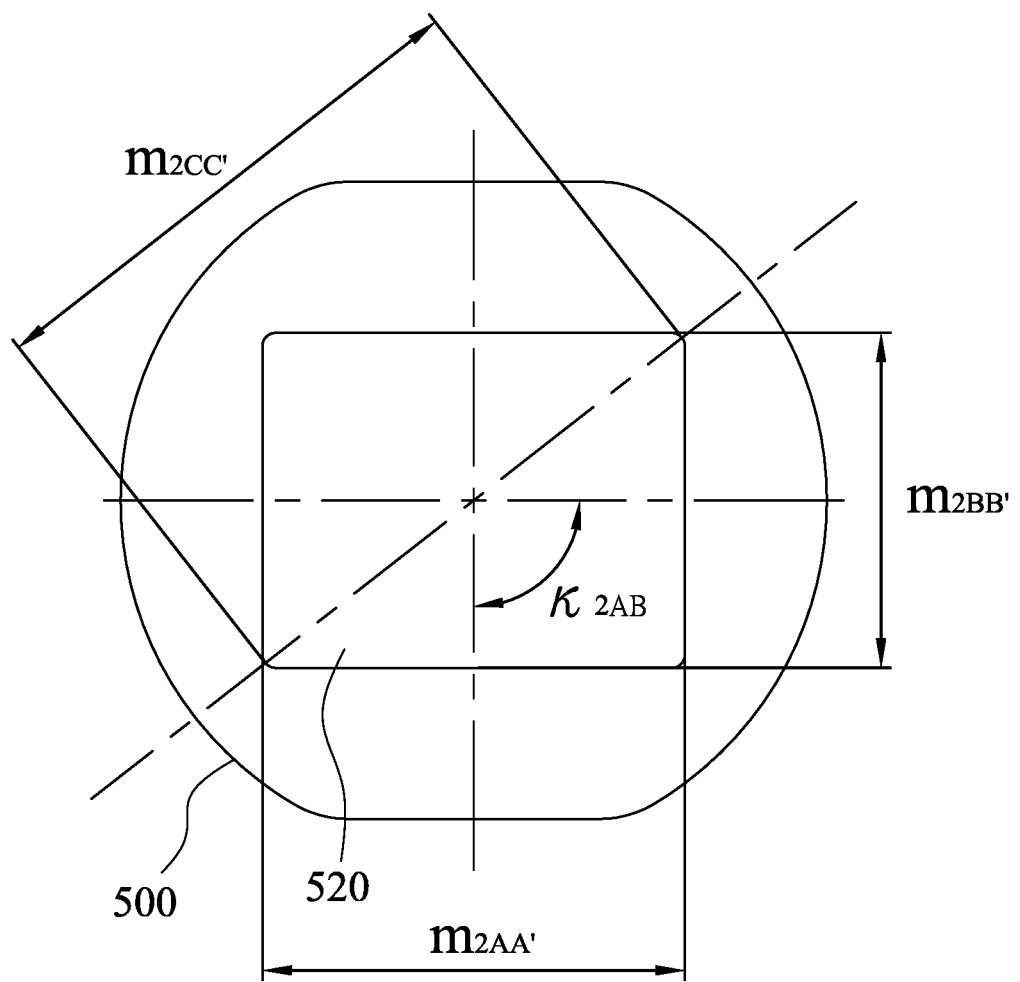
FIG. 12D shows a schematic view of the parameter $\kappa_{2AB}$ of the light blocking plate of the imaging lens module according to the embodiment of FIG. 1.
Figure 12E:
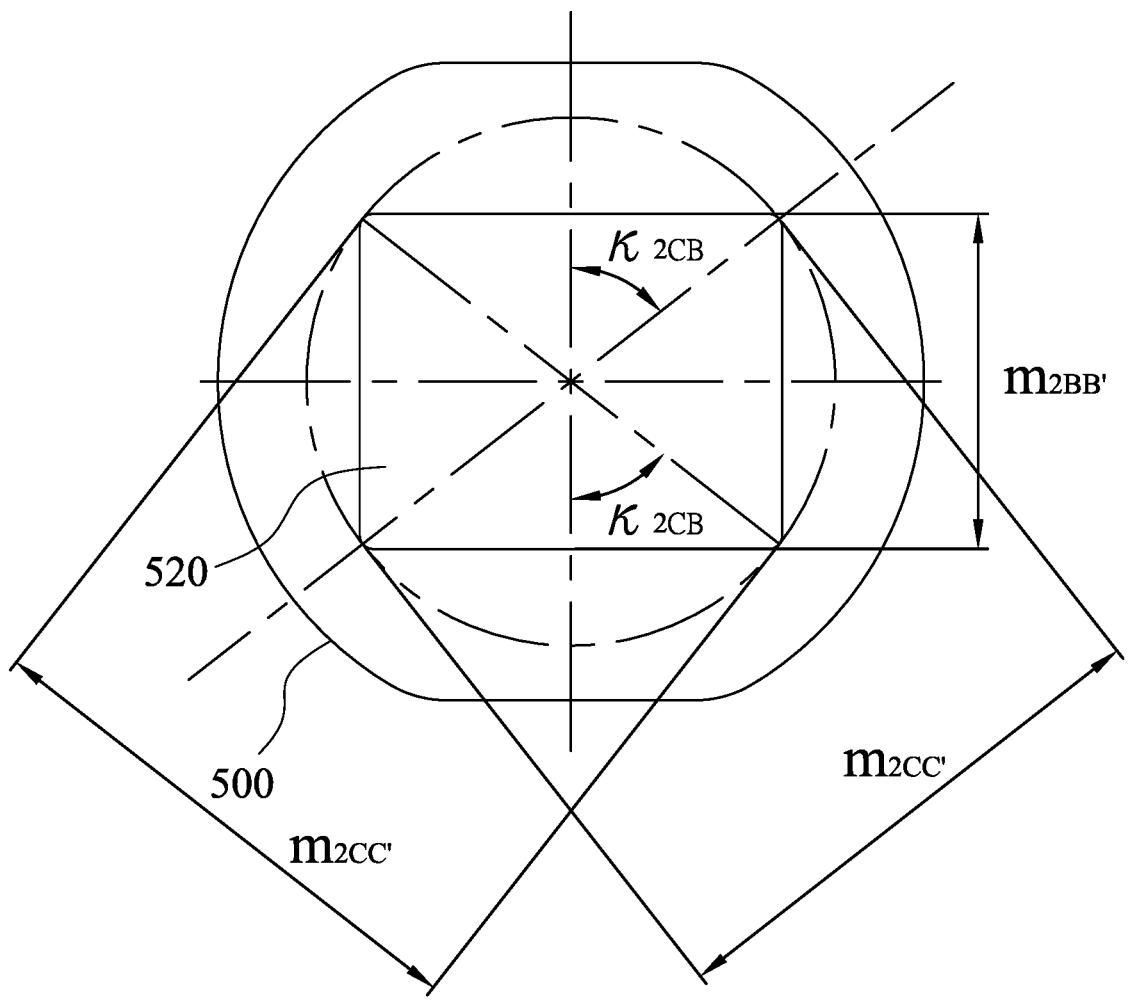
FIG. 12E shows a schematic view of the parameter $\kappa_{2CB}$ of the light blocking plate of the imaging lens module according to the embodiment of FIG. 1.

FIG. 12D shows a schematic view of the parameter $\kappa_{2AB}$ of the light blocking plate 500 of the imaging lens module according to the embodiment of FIG. 1. FIG. 12E shows a schematic view of the parameter $\kappa_{2CB}$ of the light blocking plate 500 of the imaging lens module according to the embodiment of FIG. 1. In FIG. 12C and FIG. 12D, an angle between the line distance $m_{2AA'}$ of the light blocking plate 500 and the minimum line distance $m_{2BB'}$ of the light blocking plate 500 is $\kappa_{2AB}$, wherein the minimum value of the angle $\kappa_{2AB}$ of the light blocking plate 500 is shown in FIG. 12C, and the maximum value of the angle $\kappa_{2AB}$ of the light blocking plate 500 is shown in FIG. 12D. In FIG. 12E, an angle between the maximum line distance $m_{2CC'}$ of the light blocking plate 500 and the minimum line distance $m_{2BB'}$ of the light blocking plate 500 is $\kappa_{2CB}$, wherein the minimum value and the maximum value of the angle $\kappa_{2CB}$ of the light blocking plate 500 are shown in FIG. 12E.

In FIG. 4, a distance parallel to the optical axis between the non-circular opening hole 220 of the first optical component 200 and the non-circular opening hole 520 of the light blocking plate 500 is t, a distance parallel to the optical axis between the non-circular opening hole 220 of the first optical component 200 and the circular opening hole 250 of the first optical component 200 is T, and the following condition is satisfied: $0.15 < t/T < 0.75$. Therefore, it is favorable for maintaining the structural strength and reducing the stray light of the imaging lens module.

The data of the aforementioned parameters of the light blocking plate 500 is listed in the following Table 4.

TABLE 4

| Data of the light blocking plate 500 | | | |
| --- | --- | --- | --- |
| $\kappa_{2AB}$ (deg.) | 54-90 | $\Omega_{2CC'}$ (mm) | 5.35 |
| $\kappa_{2CB}$ (deg.) | 52 | $m_{2BB'}/m_{2CC'}$ | 0.64 |
| $m_{2AA'}$ (mm) | 3.2-3.96 | $m_{2CC'}/\Omega_{2CC'}$ | 0.75 |
| $m_{2BB'}$ (mm) | 2.54 | t/T | 0.407 |
| $m_{2CC'}$ (mm) | 4.00 |  |  |

Figure 13A:
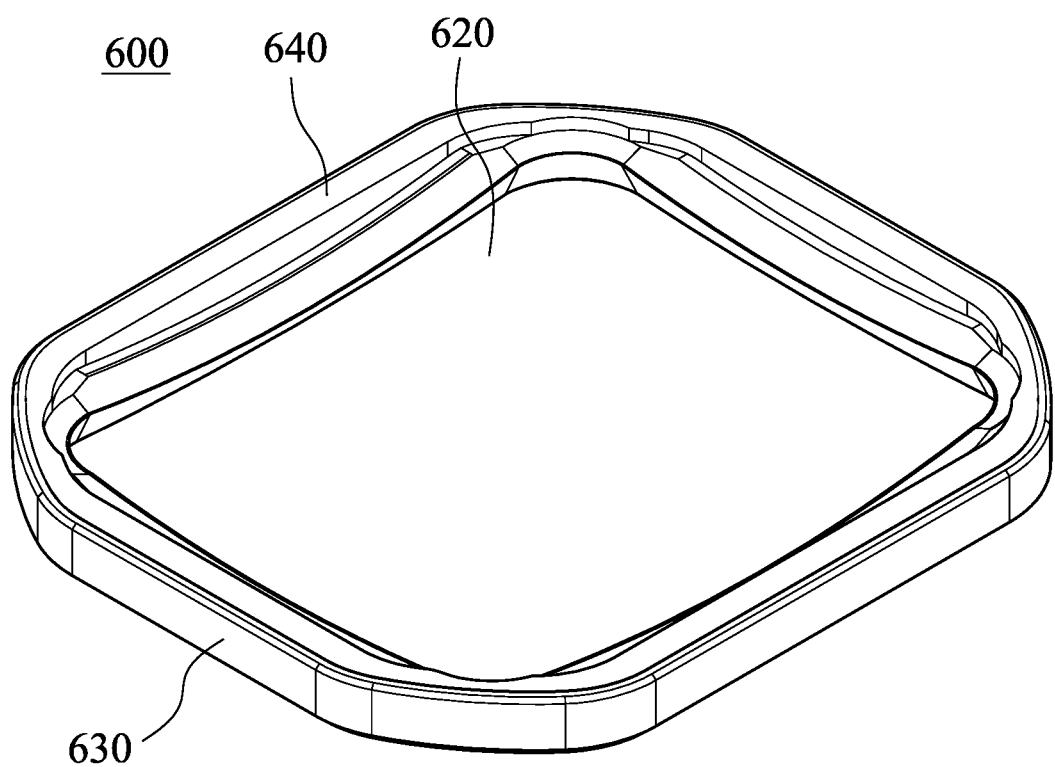
FIG. 13A shows a schematic view of the object side of the retainer of the imaging lens module according to the embodiment of FIG. 1.
Figure 14A:
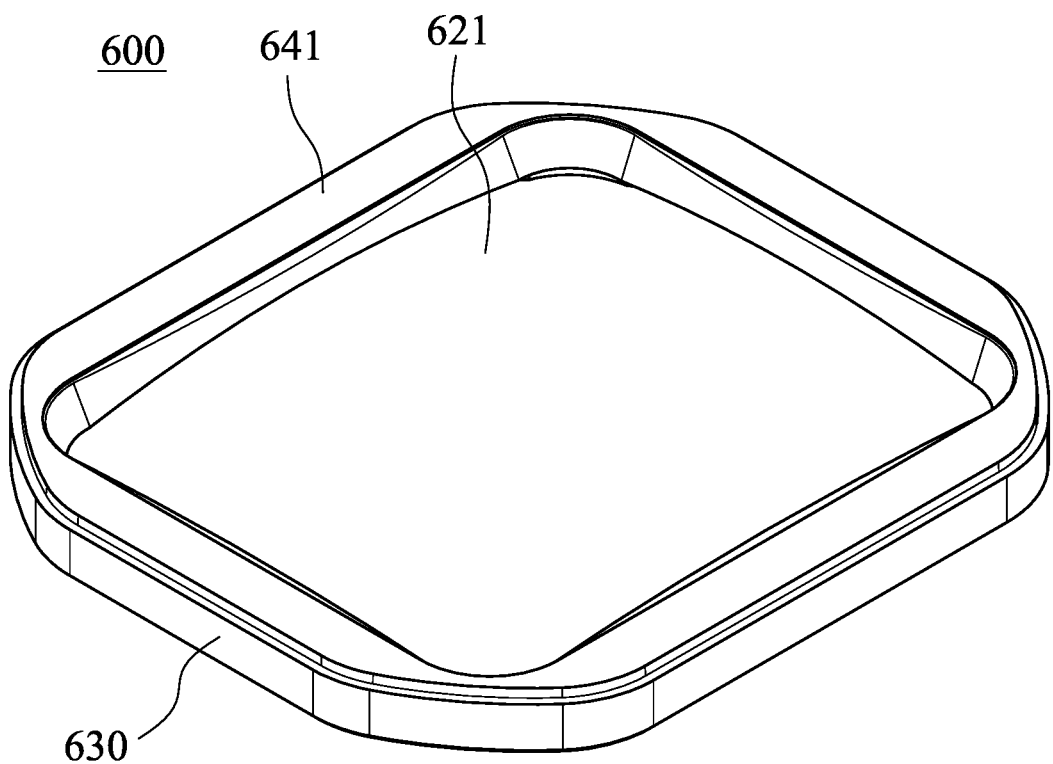
FIG. 14A shows a schematic view of the image side of the retainer of the imaging lens module according to the embodiment of FIG. 1.

FIG. 13A shows a schematic view of the object side of the retainer 600 of the imaging lens module according to the embodiment of FIG. 1. FIG. 14A shows a schematic view of the image side of the retainer 600 of the imaging lens module according to the embodiment of FIG. 1. The retainer 600 includes a side wall 630, an end wall 640 and an end wall 641. The side wall 630 is closed-shape, wherein each of the end wall 640 and the end wall 641 is connected to each of two ends of the side wall 630 separately. The end wall 640 having a non-circular opening hole 620 is disposed on the object side of the imaging lens module, and the end wall 641 having a non-circular opening hole 621 is disposed on the image side of the imaging lens module.

Figure 13B:
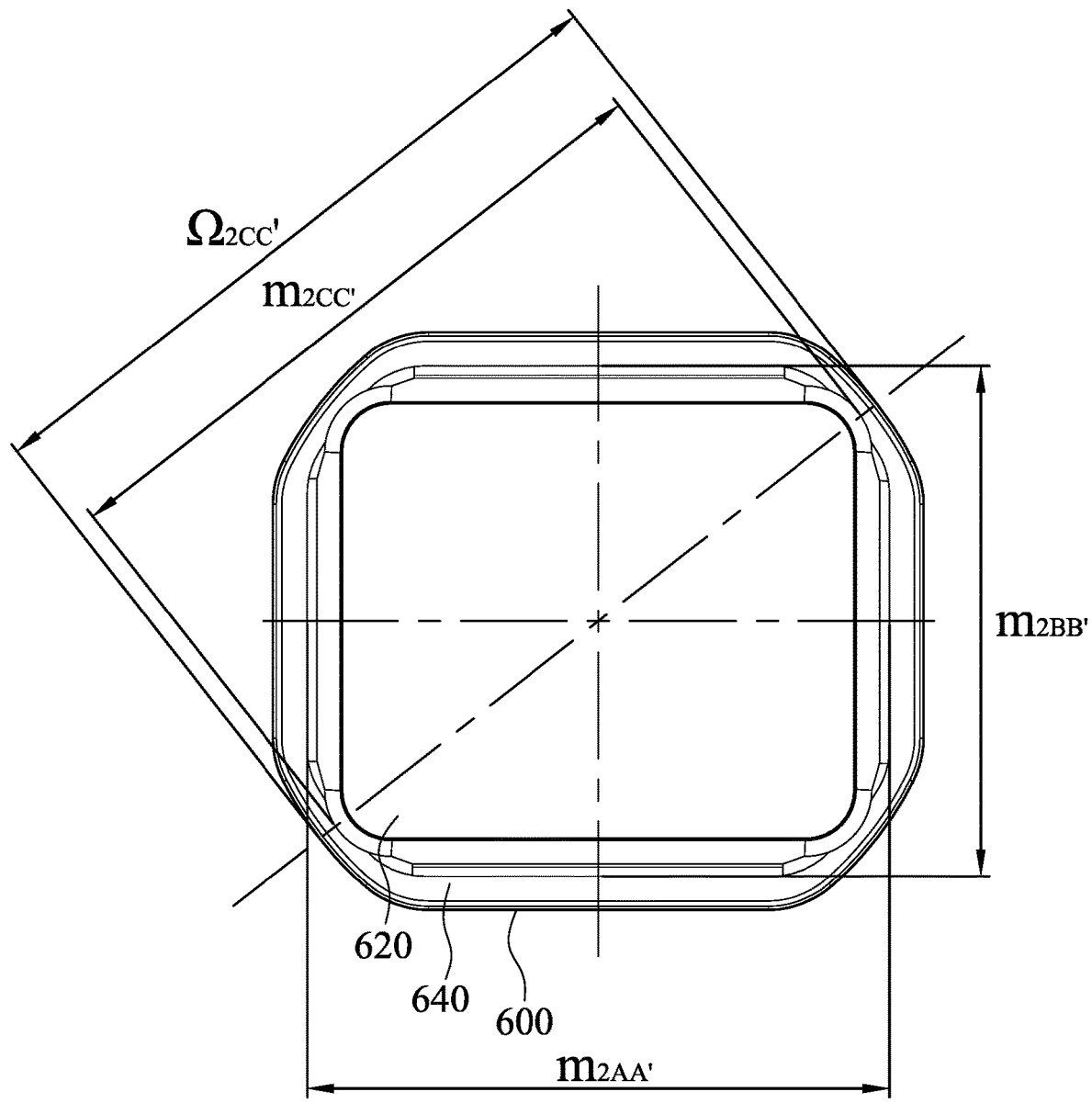
FIG. 13B shows a schematic view of the parameters $m_{2AA'}$, $m_{2BB'}$ and $m_{2CC'}$ of the object side and $\Omega_{2CC'}$ of the retainer of the imaging lens module according to the embodiment of FIG. 1.
Figure 13C:
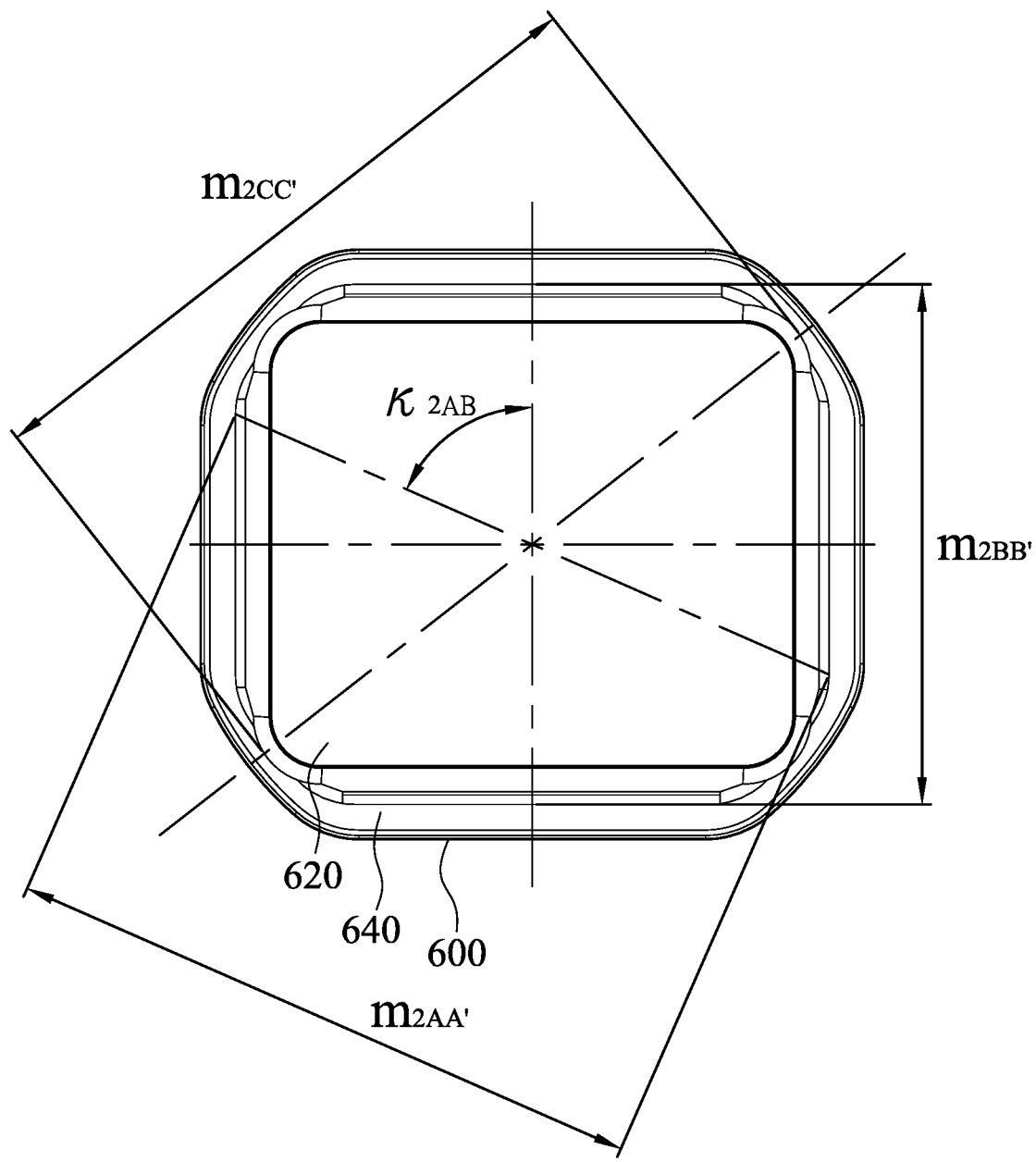
FIG. 13C shows a schematic view of the parameters $m_{2AA'}$ and $\kappa_{2AB}$ of the object side of the retainer of the imaging lens module according to the embodiment of FIG. 1.

FIG. 13B shows a schematic view of the parameters $m_{2AA'}$, $m_{2BB'}$ and $m_{2CC'}$ of the object side and $\Omega_{2CC'}$ of the retainer 600 of the imaging lens module according to the embodiment of FIG. 1. FIG. 13C shows a schematic view of the parameters $m_{2AA'}$ and $\kappa_{2AB}$ of the object side of the retainer 600 of the imaging lens module according to the embodiment of FIG. 1. In FIG. 13B, a maximum outer diameter of the retainer 600 is $\Omega_{2CC'}$, a minimum line distance between two points of a peripheral edge of the non-circular opening hole 620 of the object side of the retainer 600 through a center of the non-circular opening hole 620 of the object side of the retainer 600 is $m_{2BB'}$, and a maximum line distance between two points of the peripheral edge of the non-circular opening hole 620 of the object side of the retainer 600 through the center of the non-circular opening hole 620 of the object side of the retainer 600 is $m_{2CC'}$. In FIG. 13B and FIG. 13C, a line distance between any two points of the peripheral edge of the non-circular opening hole 620 of the object side of the retainer 600 through the center of the non-circular opening hole 620 of the object side of the retainer 600 is $m_{2AA'}$, wherein the minimum value of the line distance $m_{2AA'}$ of the object side of the retainer 600 is shown in FIG. 13B, and the maximum value of the line distance $m_{2AA'}$ of the object side of the retainer 600 is shown in FIG. 13C. The following condition is satisfied: $0.50 < m_{2BB'}/m_{2CC'} < 0.95$. Therefore, it is favorable for maintaining the structural strength of the object side of the retainer 600 after volume shrinkage and reducing the stray light effectively. Furthermore, the following condition is satisfied: $0.8 < m_{2CC'}/\Omega_{2CC'} < 0.98$. Therefore, it is favorable for reducing the stray light and maintaining the structural strength of the imaging lens module.

Figure 13D:
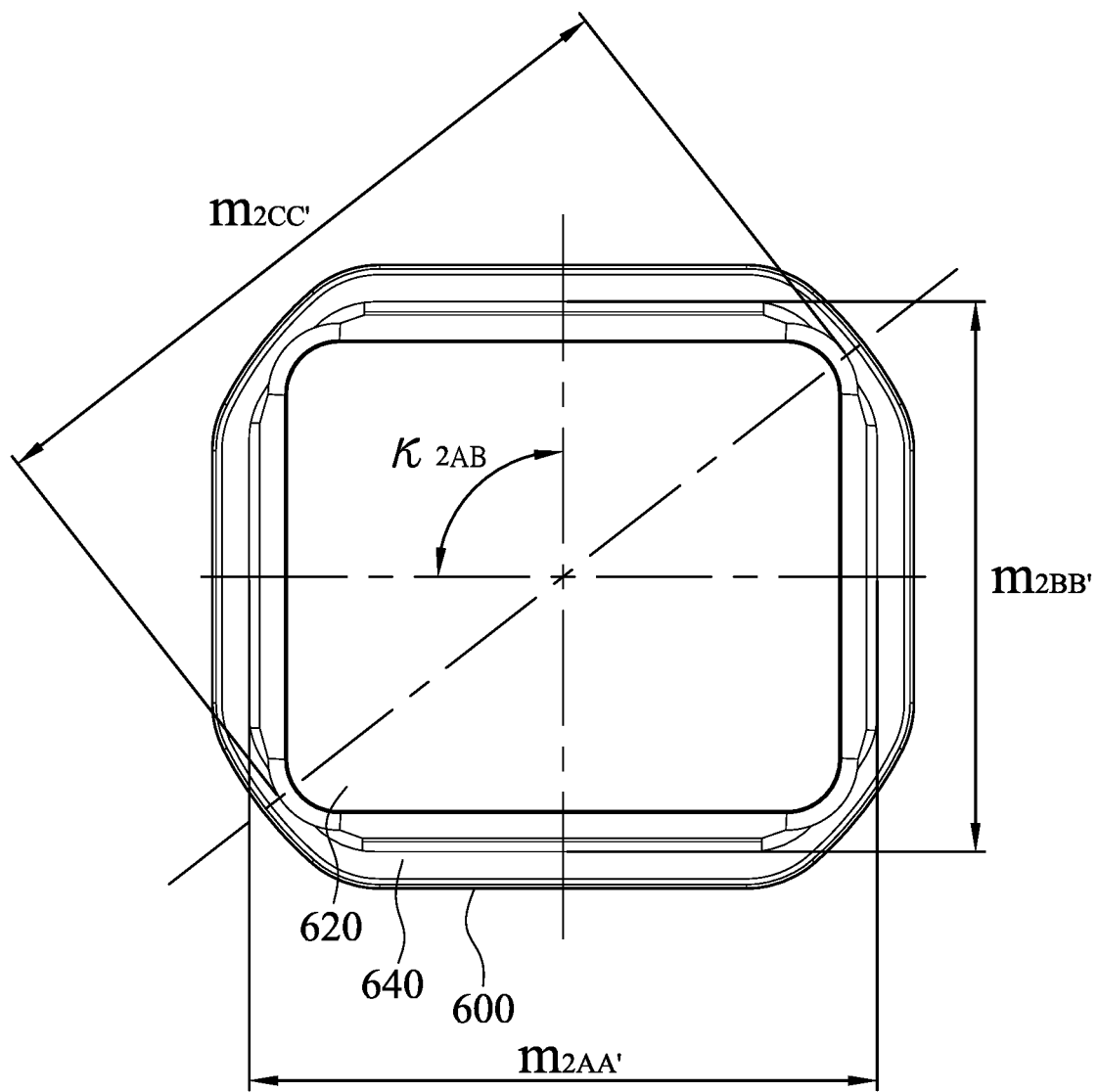
FIG. 13D shows a schematic view of the parameter $\kappa_{2AB}$ of the object side of the retainer of the imaging lens module according to the embodiment of FIG. 1.
Figure 13E:
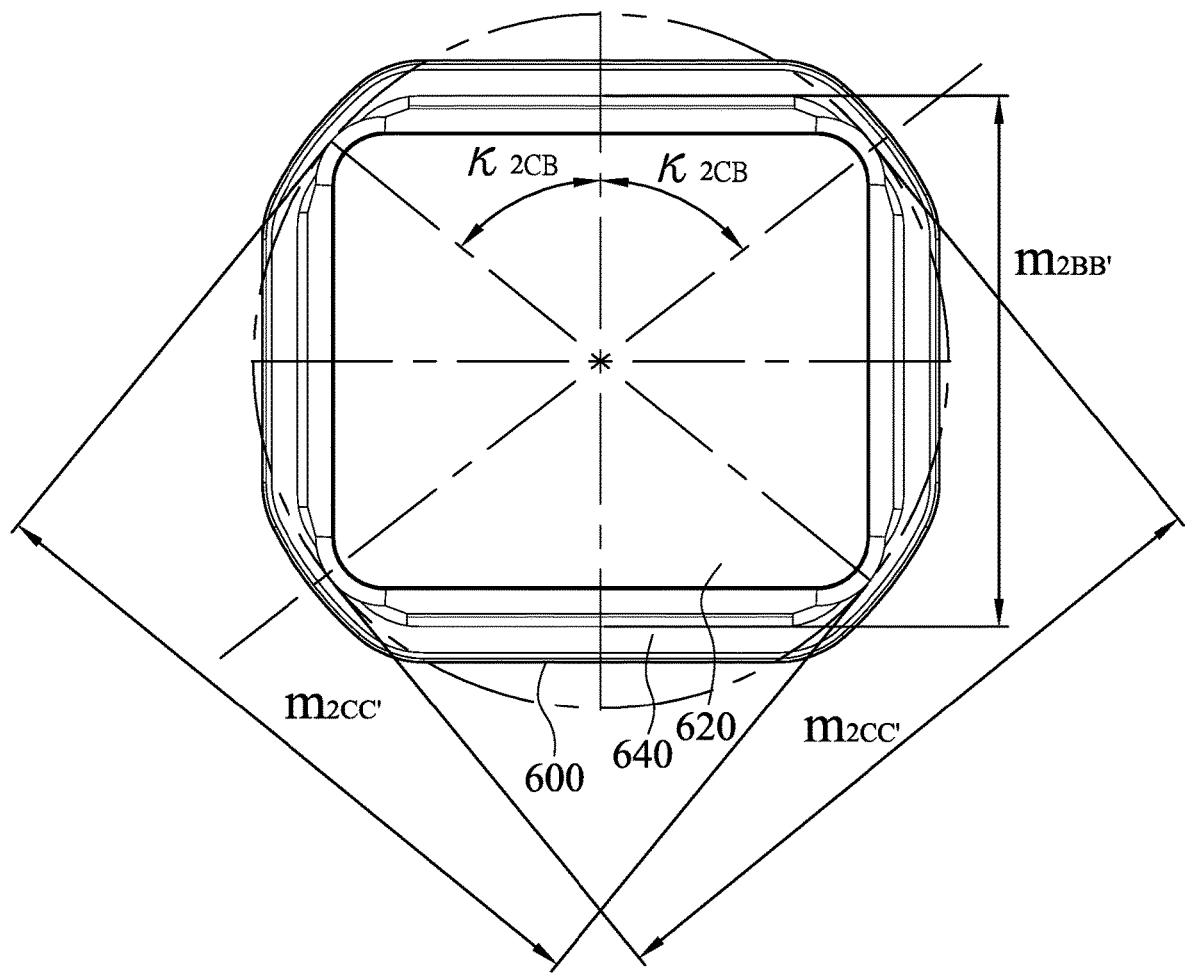
FIG. 13E shows a schematic view of the parameter $\kappa_{2CB}$ of the object side of the retainer of the imaging lens module according to the embodiment of FIG. 1.

FIG. 13D shows a schematic view of the parameter $\kappa_{2AB}$ of the object side of the retainer 600 of the imaging lens module according to the embodiment of FIG. 1. FIG. 13E shows a schematic view of the parameter $\kappa_{2CB}$ of the object side of the retainer 600 of the imaging lens module according to the embodiment of FIG. 1. In FIG. 13C and FIG. 13D, an angle between the line distance $m_{2AA'}$ of the object side of the retainer 600 and the minimum line distance $m_{2BB'}$ of the object side of the retainer 600 is $\kappa_{2AB}$, wherein the minimum value of the angle $\kappa_{2AB}$ of the object side of the retainer 600 is shown in FIG. 13C, and the maximum value of the angle $\kappa_{2AB}$ of the object side of the retainer 600 is shown in FIG. 13D. In FIG. 13E, an angle between the maximum line distance $m_{2CC'}$ of the object side of the retainer 600 and the minimum line distance $m_{2BB}$ of the object side of the retainer 600 is $\kappa_{2CB}$, wherein the minimum value and the maximum value of the angle $\kappa_{2CB}$ of the object side of the retainer 600 are shown in FIG. 13E.

Figure 14B:
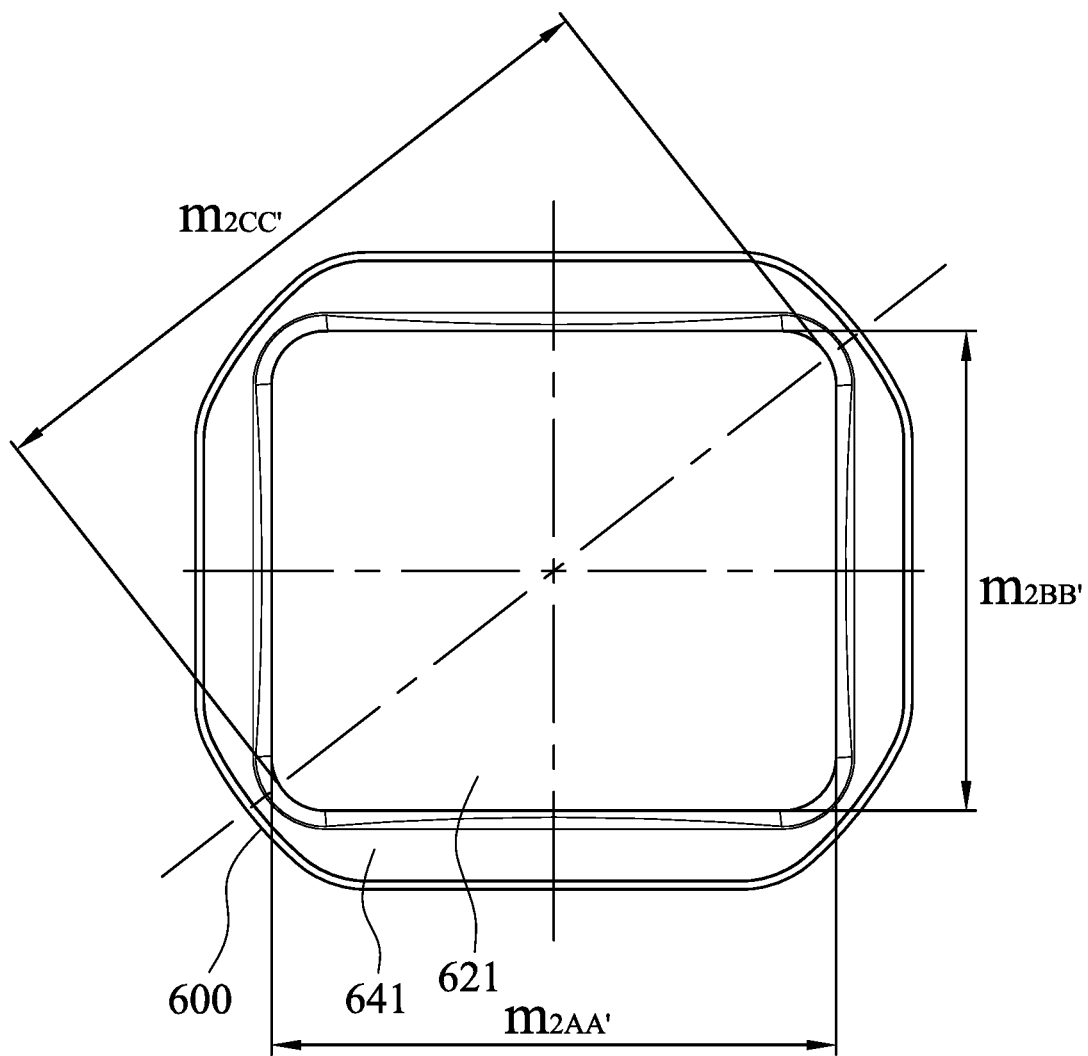
FIG. 14B shows a schematic view of the parameters $m_{2AA'}$, $m_{2BB'}$ and $m_{2CC'}$ of the image side of the retainer of the imaging lens module according to the embodiment of FIG. 1.
Figure 14C:
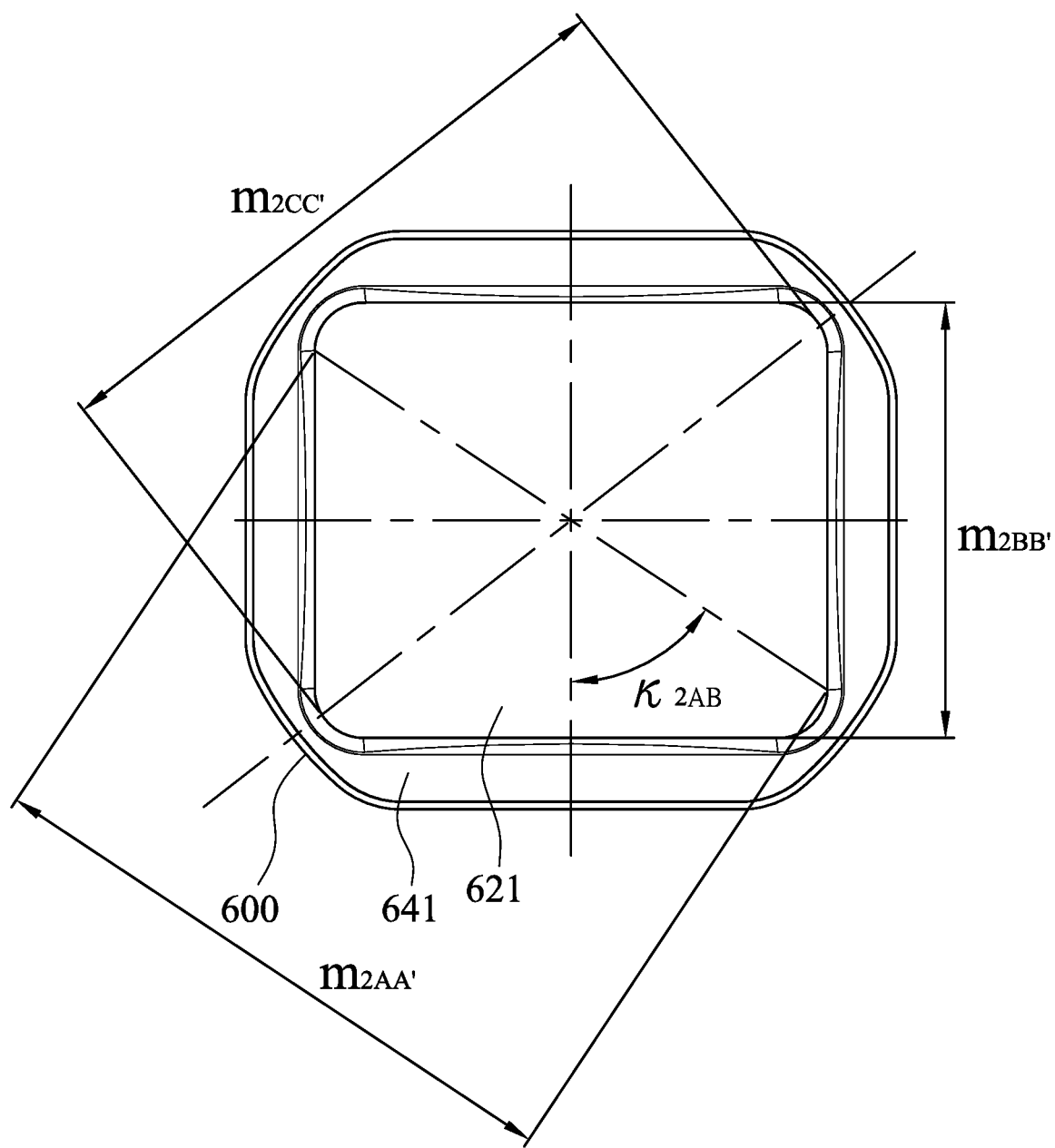
FIG. 14C shows a schematic view of the parameters $m_{2AA'}$ and $\kappa_{2AB}$ of the image side of the retainer of the imaging lens module according to the embodiment of FIG. 1.

FIG. 14B shows a schematic view of the parameters $m_{2AA'}$, $m_{2BB'}$ and $m_{2CC'}$ of the image side of the retainer 600 of the imaging lens module according to the embodiment of FIG. 1. FIG. 14C shows a schematic view of the parameters $m_{2AA'}$ and $\kappa_{2AB}$ of the image side of the retainer 600 of the imaging lens module according to the embodiment of FIG. 1. In FIG. 14B, a minimum line distance between two points of a peripheral edge of the non-circular opening hole 621 of the image side of the retainer 600 through a center of the non-circular opening hole 621 of the image side of the retainer 600 is $m_{2BB'}$, and a maximum line distance between two points of the peripheral edge of the non-circular opening hole 621 of the image side of the retainer 600 through the center of the non-circular opening hole 621 of the image side of the retainer 600 is $m_{2CC'}$. In FIG. 14B and FIG. 14C, a line distance between any two points of the peripheral edge of the non-circular opening hole 621 of the image side of the retainer 600 through the center of the non-circular opening hole 621 of the image side of the retainer 600 is $m_{2AA'}$, wherein the minimum value of the line distance $m_{2AA'}$ of the image side of the retainer 600 is shown in FIG. 14B, and the maximum value of the line distance $m_{2AA'}$ of the image side of the retainer 600 is shown in FIG. 14C. The following condition is satisfied: $0.50 < m_{2BB'}/m_{2CC'} < 0.95$. Therefore, it is favorable for maintaining the structural strength of the image side of the retainer 600 after volume shrinkage and reducing the stray light effectively. Furthermore, the following condition is satisfied: $0.8 < m_{2CC'}/\Omega_{2CC'} < 0.98$. Therefore, it is favorable for reducing the stray light and maintaining the structural strength of the imaging lens module.

Figure 14D:
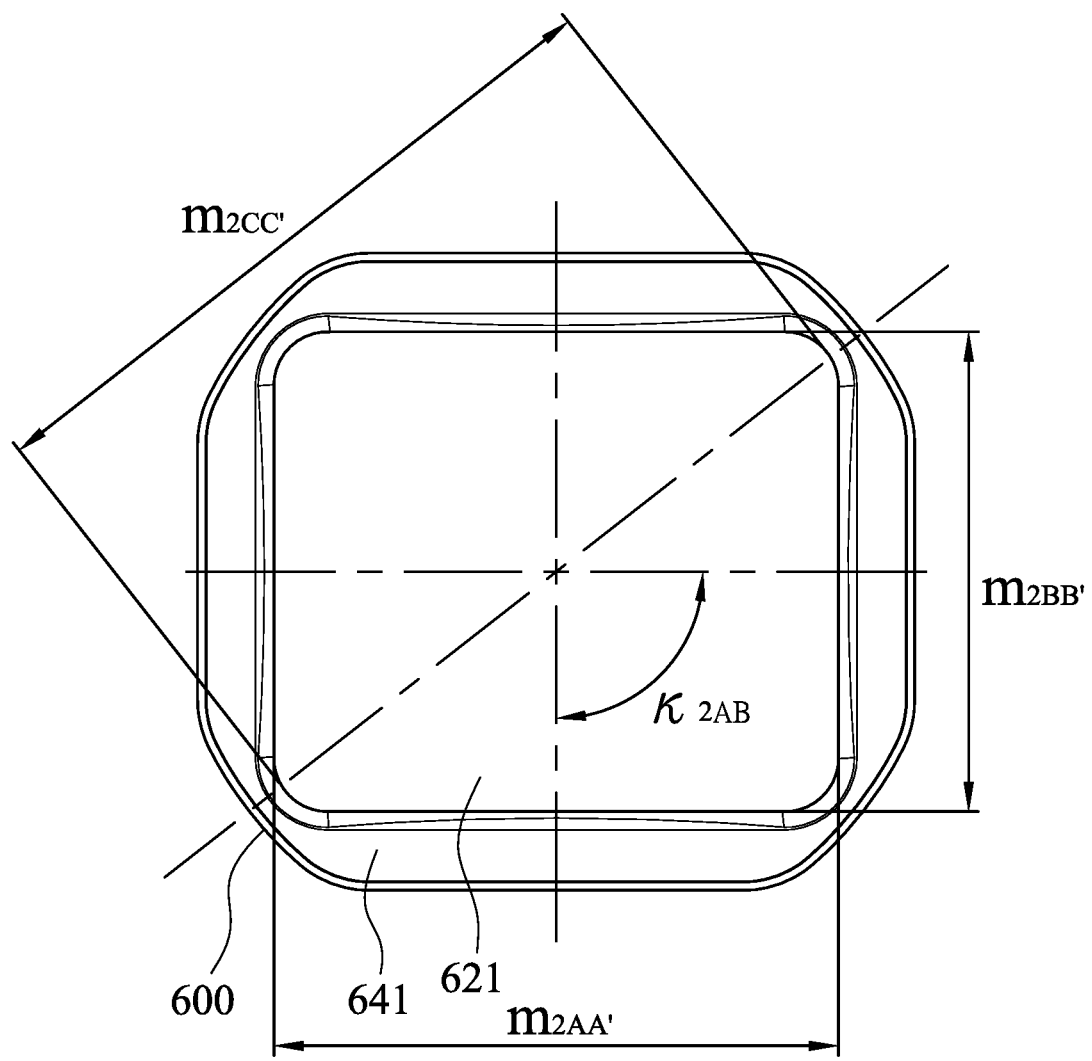
FIG. 14D shows a schematic view of the parameter $\kappa_{2AB}$ of the image side of the retainer of the imaging lens module according to the embodiment of FIG. 1.
Figure 14E:
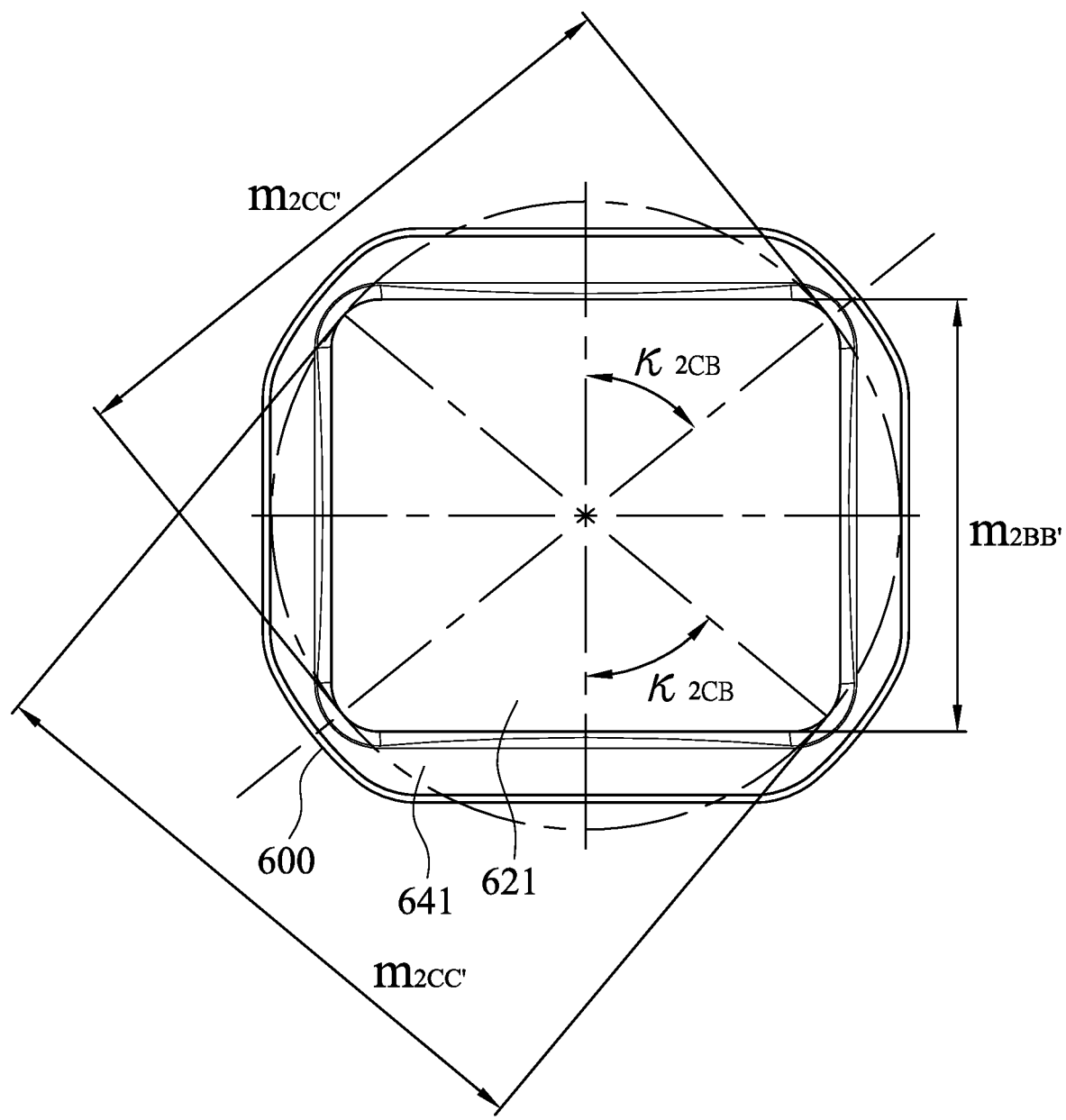
FIG. 14E shows a schematic view of the parameter $\kappa_{2CB}$ of the image side of the retainer of the imaging lens module according to the embodiment of FIG. 1.

FIG. 14D shows a schematic view of the parameter $\kappa_{2AB}$ of the image side of the retainer 600 of the imaging lens module according to the embodiment of FIG. 1. FIG. 14E shows a schematic view of the parameter $\kappa_{2CB}$ of the image side of the retainer 600 of the imaging lens module according to the embodiment of FIG. 1. In FIG. 14C and FIG. 14D, an angle between the line distance $m_{2AA'}$ of the image side of the retainer 600 and the minimum line distance $m_{2BB'}$ of the image side of the retainer 600 is $\kappa_{2AB}$, wherein the minimum value of the angle $\kappa_{2AB}$ of the image side of the retainer 600 is shown in FIG. 14C, and the maximum value of the angle $\kappa_{2AB}$ of the image side of the retainer 600 is shown in FIG. 14D. In FIG. 14E, an angle between the maximum line distance $m_{2CC'}$ of the image side of the retainer 600 and the minimum line distance $m_{2BB'}$ of the image side of the retainer 600 is $\kappa_{2CB}$, wherein the minimum value and the maximum value of the angle $\kappa_{2CB}$ of the image side of the retainer 600 are shown in FIG. 14E.

The data of the aforementioned parameters of the retainer 600 is listed in the following Table 5.

TABLE 5

Data of the retainer 600

|  | Object side | Image side |
|---|---|---|
| $\kappa_{2AB}$ (deg.) | 56-90 | 66-90 |
| $\kappa_{2CB}$ (deg.) | 51 | 51 |
| $m_{2AA'}$ (mm) | 4.28-5.13 | 4.86-5.31 |
| $m_{2BB'}$ (mm) | 3.64 | 4.26 |
| $m_{2CC'}$ (mm) | 5.28 | 5.57 |
| $\Omega_{2CC'}$ (mm) | 5.90 | |
| $m_{2BB'}/m_{2CC'}$ | 0.69 | 0.76 |
| $m_{2CC'}/\Omega_{2CC'}$ | 0.89 | 0.94 |
| t/T | 0.034 | — |

According to the present disclosure, a mobile terminal (not shown) is provided, wherein the mobile terminal has communication function and includes the aforementioned imaging lens module. Therefore, it is favorable for volume shrinkage, stray light effectively suppressed and stable quality. Preferably, the mobile terminal can further include but not limited to a control unit, a display, a storage unit, a random access memory unit (RAM) or a combination thereof. Furthermore, the mobile terminal can be 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

In summary, the imaging lens module of the present disclosure can have the advantages of volume shrinkage, stray light effectively suppressed and stable quality by the lens element with the non-circular effective optical portion and the optical component with the non-circular opening hole.

Although the present disclosure has been described in considerable detail with reference to the embodiment thereof, other embodiments are possible. Therefore, the spirit and scope of the appended claims should not be limited to the description of the embodiment contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An imaging lens module, comprising:
    an imaging lens assembly comprising at least one lens element;
    a first optical component, which is a barrel; and
    at least one second optical component having a non-circular opening hole;
    wherein the lens element comprises at least one effective optical portion, which is disposed on a center of the lens element;
    wherein the first optical component comprises a side wall being closed-shape and an end wall, and the end wall is connected to one end of the side wall and has a circular opening hole;
    wherein the second optical component and the imaging lens assembly are disposed in the first optical component, and the non-circular opening hole of the second optical component is corresponded to the circular opening hole of the first optical component;
    wherein a line distance between any two points of a peripheral edge of the non-circular opening hole of the second optical component through a center of the non-circular opening hole of the second optical component is $m_{2AA'}$, a minimum line distance between two points of the peripheral edge of the non-circular opening hole of the second optical component through the center of the non-circular opening hole of the second optical component is $m_{2BB'}$, a maximum line distance between two points of the peripheral edge of the non-circular opening hole of the second optical component through the center of the non-circular opening hole of the second optical component is $m_{2CC'}$, an angle between the line distance $m_{2AA'}$ and the minimum line distance $m_{2BB'}$ is $\kappa_{2AB}$, and the following conditions are satisfied:

$m_{2BB'} \leq m_{2AA'} < m_{2MCC'}$; and 54 degrees $\leq |\kappa_{2AB}| \leq 90$ degrees, wherein $|\kappa_{2AB}|$ is smaller than or equal to 90 degrees.

2. The imaging lens module of claim 1, wherein the lens element is made of plastic material, the effective optical portion is non-circular, a line distance between any two points of a peripheral edge of the effective optical portion of the lens element through the center of the lens element is $l_{AA'}$, a minimum line distance between two points of the peripheral edge of the effective optical portion of the lens element through the center of the lens element is $l_{BB'}$, a maximum line distance between two points of the peripheral edge of the effective optical portion of the lens element through the center of the lens element is $l_{CC'}$, an angle between the line distance $l_{AA'}$ of the lens element and the minimum line distance $l_{BB'}$ of the lens element is $\theta_{AB}$, an angle between the maximum line distance $l_{CC'}$ of the lens element and the minimum line distance $l_{BB'}$ of the lens element is $\theta_{CB}$, and the following conditions are satisfied:

$l_{BB'} \leq l_{AA'} < l_{CC'}$; and 50 degrees $< |\theta_{AB}| \leq 90$ degrees, wherein $|\theta_{AB}|$ and $|\theta_{CB}|$ are both smaller than or equal to 90 degrees.

3. The imaging lens module of claim 2, wherein the maximum line distance between two points of the peripheral edge of the effective optical portion of the lens element through the center of the lens element is $l_{CC'}$, a maximum outer diameter of the lens element is $\Gamma_{CC'}$, and the following condition is satisfied:

$0.6 < l_{CC'}/\Gamma_{CC'} < 1$.

4. The imaging lens module of claim 3, wherein the angle between the maximum line distance $l_{CC'}$ of the lens element and the minimum line distance $l_{BB'}$ of the lens element is $\theta_{CB}$, and the following condition is satisfied:

50 degrees $< |\theta_{CB}| < 75$ degrees.

5. The imaging lens module of claim 3, wherein the line distance between any two points of the peripheral edge of the effective optical portion of the lens element through the center of the lens element is $l_{AA'}$, the maximum line distance between two points of the peripheral edge of the effective optical portion of the lens element through the center of the lens element is $l_{CC'}$, and the following condition is satisfied:

$0.80 < l_{AA'}/l_{CC'} < 0.98$.

6. The imaging lens module of claim 3, wherein the maximum line distance between two points of the peripheral edge of the effective optical portion of the lens element through the center of the lens element is $l_{CC'}$, the maximum outer diameter of the lens element is $\delta_{CC'}$, and the following condition is satisfied:

$0.8 < l_{CC'}/\Gamma_{CC'} < 0.98$.

7. The imaging lens module of claim 1, wherein the minimum line distance between two points of the peripheral edge of the non-circular opening hole of the second optical component through the center of the non-circular opening hole of the second optical component is $m_{2BB'}$, the maximum line distance between two points of the peripheral edge of the non-circular opening hole of the second optical component through the center of the non-circular opening hole of the second optical component is $m_{2CC'}$, and the following condition is satisfied:

$0.50 < m_{2BB'}/m_{2CC'} < 0.95$.

8. The imaging lens module of claim 1, wherein the second optical component comprises:
    a side wall, which is closed-shape; and
    two end walls, wherein each of the end walls of the second optical component is connected to each of two ends of the side wall of the second optical component separately and has the non-circular opening hole.

9. The imaging lens module of claim 1, wherein the second optical component is a light blocking plate with an uniform thickness.

10. The imaging lens module of claim 2, wherein the lens element is a non-circular lens element, a maximum outer diameter of the lens element is $\Gamma_{CC'}$, a minimum outer diameter of the lens element is $\Gamma_{BB'}$, a lens outer diameter of the lens element is $\Gamma_{AA'}$, which excludes the maximum outer diameter $\Gamma_{CC'}$ of the lens element and the minimum outer diameter $\Gamma_{BB'}$ of the lens element, an angle between the lens outer diameter $\Gamma_{AA'}$ of the lens element and the minimum outer diameter $\Gamma_{BB'}$ of the lens element is $\alpha_{AB}$, an angle between the maximum outer diameter $\Gamma_{CC'}$ of the lens element and the minimum outer diameter $\Gamma_{BB'}$ of the lens element is $\alpha_{CB}$, and the following conditions are satisfied:

$\Gamma_{BB'} \leq \Gamma_{AA'} < \Gamma_{CC'}$; and $|\alpha_{AB}| > |\alpha_{CB}|$, wherein $|\alpha_{AB}|$ and $|\alpha_{CB}|$ are both smaller than or equal to 90 degrees.

11. The imaging lens module of claim 10, wherein the angle between the maximum outer diameter $\Gamma_{CC'}$ of the lens element and the minimum outer diameter $\Gamma_{BB'}$ of the lens element is $\alpha_{CB}$, and the following condition is satisfied:

35 degrees $< |\alpha_{CB}| <$ 65 degrees.

12. The imaging lens module of claim 10, wherein the minimum line distance between two points of the peripheral edge of the effective optical portion of the lens element through the center of the lens element is $l_{BB'}$, the minimum outer diameter of the lens element is $\Gamma_{BB'}$, and the following condition is satisfied:

$0.65 < l_{BB'}/\Gamma_{BB'} < 1.0$.

13. The imaging lens module of claim 1, further comprising:
an image surface;
wherein the second optical component is closer to the image surface than the imaging lens assembly to the image surface.

14. A mobile terminal, having communication function, comprising:
the imaging lens module of claim 1.

* * * * *